United States Patent
Glukhoy et al.

(10) Patent No.: US 10,730,239 B1
(45) Date of Patent: Aug. 4, 2020

(54) 3D PRINTING APPARATUS USING A BEAM OF AN ATMOSPHERIC PRESSURE INDUCTIVELY COUPLED PLASMA GENERATOR

(71) Applicants: Yuri Glukhoy, San Francisco, CA (US); Tatiana Kerzhner, San Francisco, CA (US); Anna Ryaboy, San Francisco, CA (US); Joshua Kerzhner, San Francisco, CA (US); Michael Ryaboy, San Francisco, CA (US); Andrew Kerzhner, San Francisco, CA (US); Kevin Kerzhner, San Francisco, CA (US)

(72) Inventors: Yuri Glukhoy, San Francisco, CA (US); Tatiana Kerzhner, San Francisco, CA (US); Anna Ryaboy, San Francisco, CA (US); Joshua Kerzhner, San Francisco, CA (US); Michael Ryaboy, San Francisco, CA (US); Andrew Kerzhner, San Francisco, CA (US); Kevin Kerzhner, San Francisco, CA (US)

( * ) Notice: Subject to any disclaimer, the term of this patent is extended or adjusted under 35 U.S.C. 154(b) by 0 days.

(21) Appl. No.: 16/679,253

(22) Filed: Nov. 10, 2019

(51) Int. Cl.
  *B33Y 10/00* (2015.01)
  *B29C 64/209* (2017.01)
  (Continued)

(52) U.S. Cl.
  CPC .......... *B29C 64/264* (2017.08); *B29C 64/209* (2017.08); *B29C 64/241* (2017.08);
  (Continued)

(58) Field of Classification Search
  CPC ... B29C 64/264; B29C 64/241; B29C 64/245; B29C 64/25; B29C 64/209; B33Y 30/00
  See application file for complete search history.

(56) References Cited

U.S. PATENT DOCUMENTS

| 9,486,878 B2 | 11/2016 | Buller et al. |
| 10,207,454 B2 | 2/2019 | Buller et al. |

(Continued)

FOREIGN PATENT DOCUMENTS

| CN | 105922572 | 9/2016 |
| WO | WO2017150574 A | 8/2017 |

OTHER PUBLICATIONS

Generator of CX-4000 model, product of Comdel, Inc., MA, USA.
(Continued)

*Primary Examiner* — Nahida Sultana

(57) ABSTRACT

A 3D printer apparatus for printing a refractory materials on the surfaces of workpieces in accordance with a given program is disclosed. The apparatus contains a first generator for generating a first atmospheric ICP beam, a second generator for generating a second atmospheric ICP beam, and a bouncing tube between the generators for breaking clusters of precursor nanoparticles into elementary charged nanoparticles that penetrate in a premelted state into a plasma discharge formed in the second generator under the inductive coupling with a saddle antenna, which encompasses the second generator. The outlet nozzle of the second generator emits the second beam onto an extractor plate that is a part of a plasma gun, which converts the second beam into a finely controlled focusing beam capable of printing a material even on the inner surfaces of deep small diameter gas holes of showerheads.

20 Claims, 31 Drawing Sheets

(51) Int. Cl.
  *B29C 64/159*    (2017.01)
  *B29C 64/264*    (2017.01)
  *B29C 64/25*     (2017.01)
  *B29C 64/245*    (2017.01)
  *B29C 64/241*    (2017.01)
  *B33Y 30/00*     (2015.01)

(52) U.S. Cl.
  CPC ............ *B29C 64/245* (2017.08); *B29C 64/25* (2017.08); *B33Y 30/00* (2014.12)

(56) References Cited

U.S. PATENT DOCUMENTS

| | | |
|---|---|---|
| 2009/0284421 A1 | 11/2009 | Glukhoy et al. |
| 2015/0042017 A1 | 2/2015 | Ramaswamy et al. |
| 2016/0375491 A1* | 12/2016 | Swaminathan ....... B29C 64/245 419/53 |
| 2017/0001253 A1* | 1/2017 | Stempfer ............... B23K 9/042 |
| 2017/0067154 A1 | 3/2017 | Grotjohn |
| 2017/0203364 A1 | 7/2017 | Ramaswamy et al. |
| 2017/0239722 A1* | 8/2017 | Goehlich ................ B29B 13/08 |
| 2017/0274589 A1* | 9/2017 | Wu ........................ B29C 64/153 |
| 2018/0162046 A1* | 6/2018 | Budge ................... B29C 64/153 |
| 2018/0369912 A1* | 12/2018 | Gold ......................... C23C 16/52 |

OTHER PUBLICATIONS

Matching network RF generator (Apex model, a product of Advanced Energy Industries, Inc., Fort Collins, CO, USA) with 13.56 MHz AC frequency.

Aluminum showerhead, 0040-82516 / SGD Lower Shower Head, HEA, 300MM EMAX/Applied Materials with 900 gas holes having a diameter of 0.5 mm and depth of 10 mm.

Extrapolation of Paschen curve data reported for the high-frequency breakdown of Ar (Brown S C 1993 Basic Data of Plasma Physics (New York: AIP Press) 336 p.).

Steigerwald Type Electron Gun with Wehnelt electrode (also known as Wehnelt cap, grid cap or simply Wehnelt) ( K. H. , Optik 5, 469 (1949)).

Steigerwald, Emission Optics of the Steigerwald Type Electron Gun, Chong-Yu Ruan, Manfred Fink Department of Physics, The University of Texas, Austin, Texas 78712.arXiv.physics/9905031v1 [physics.optics])).

* cited by examiner

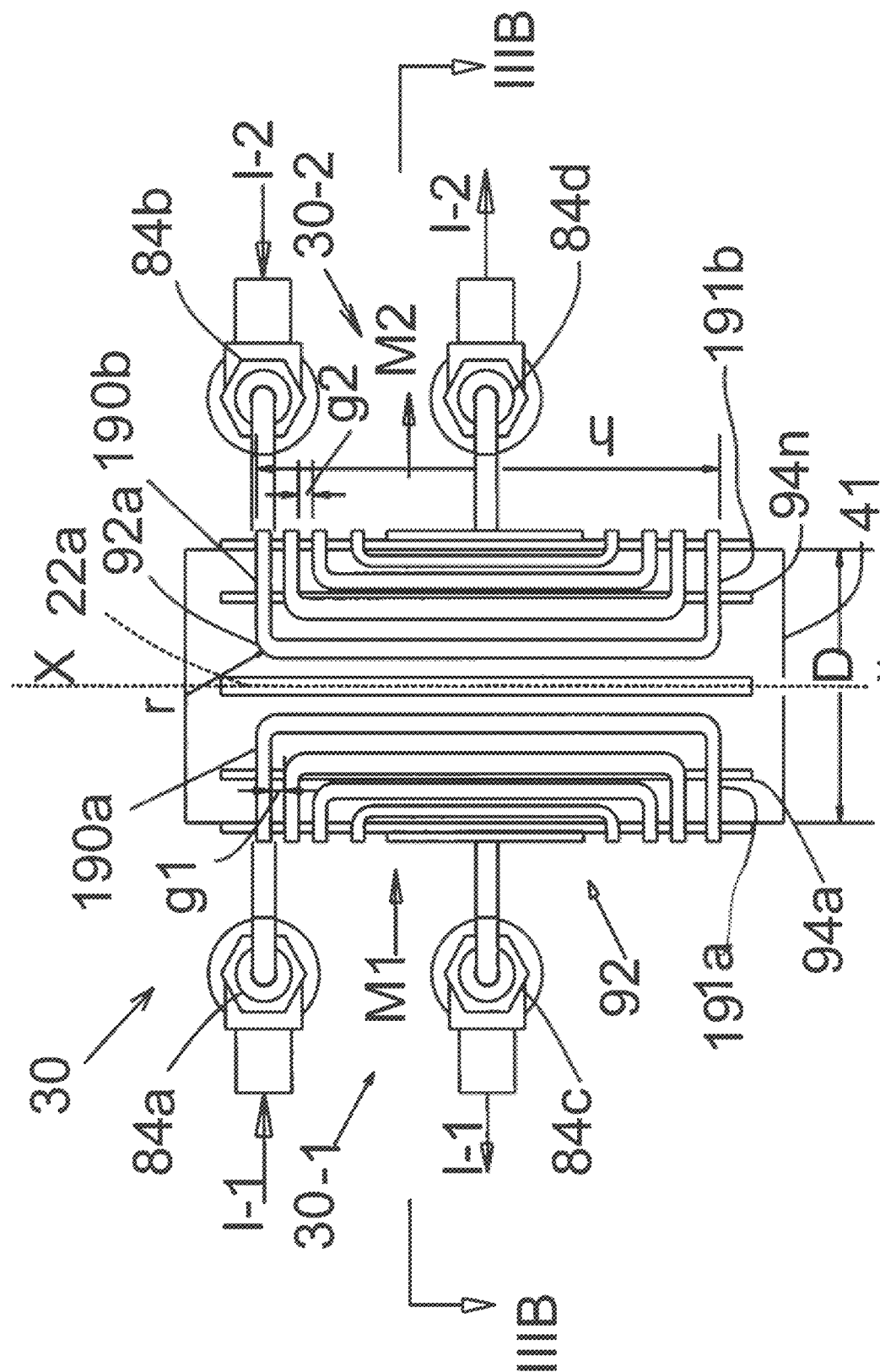

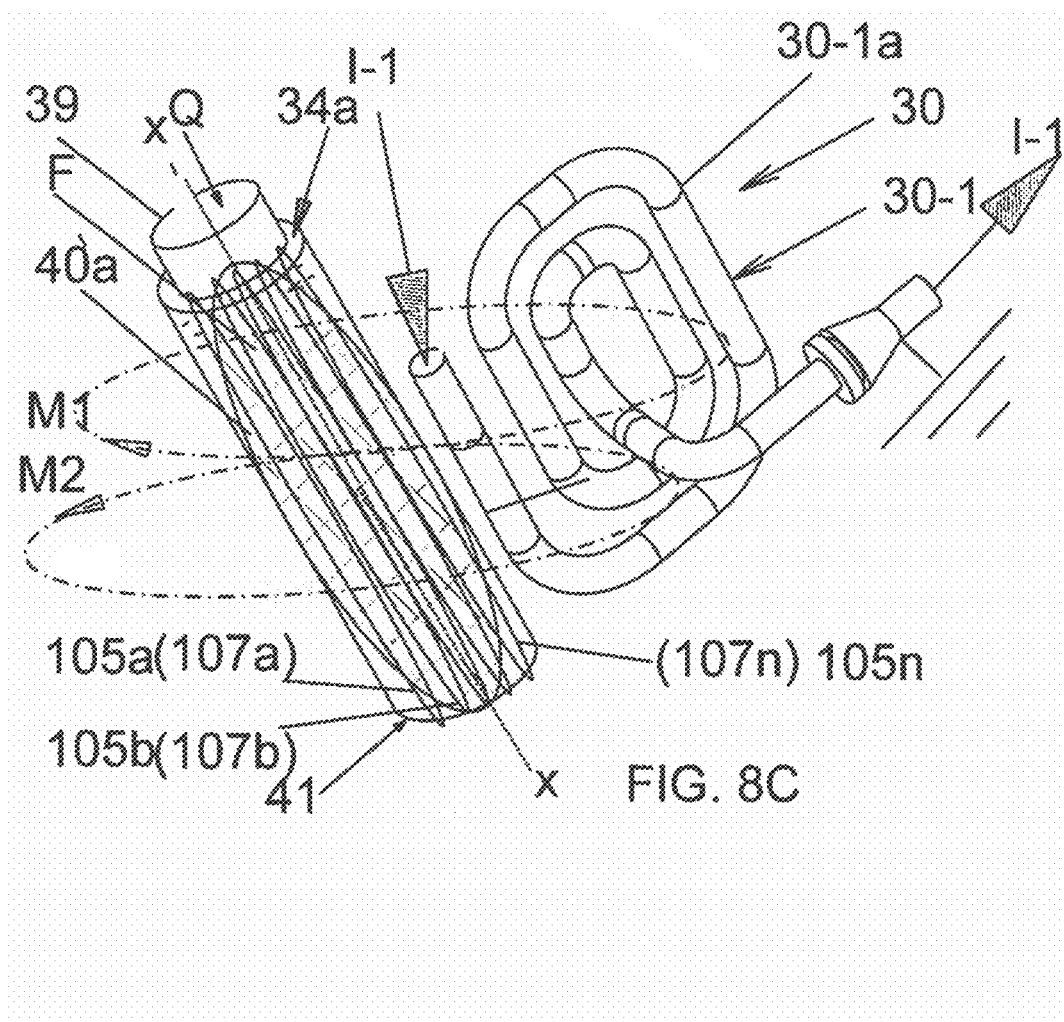

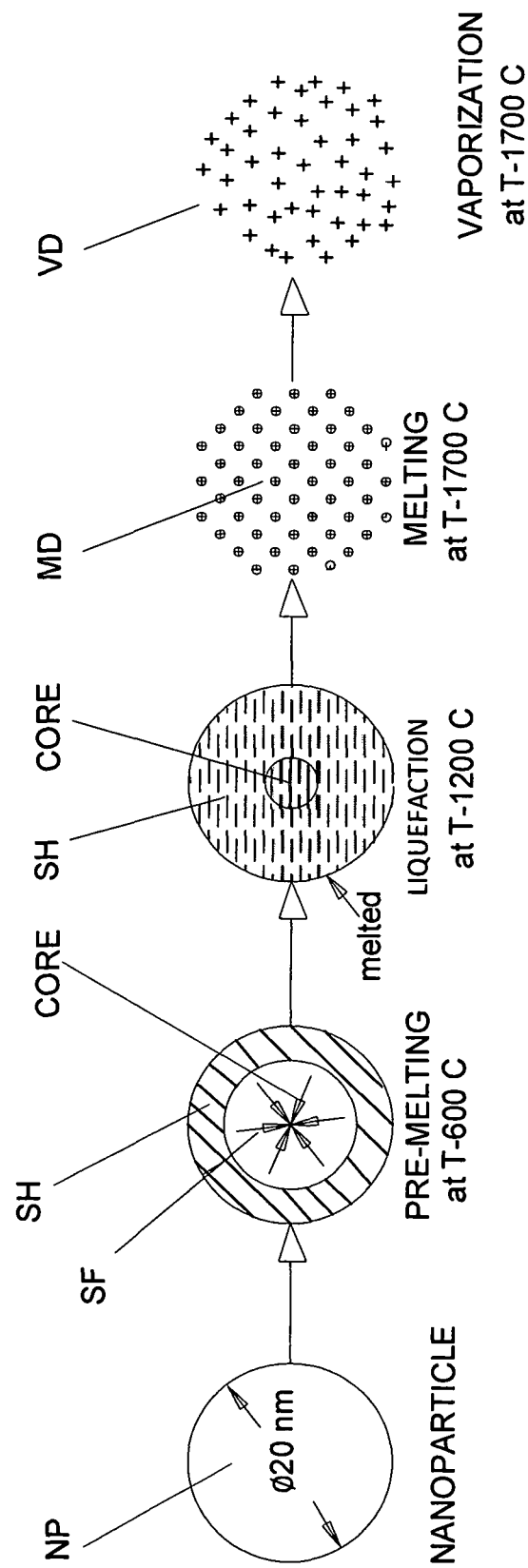

3D PRINTING APPARATUS USING A BEAM OF AN ATMOSPHERIC PRESSURE INDUCTIVELY COUPLED PLASMA GENERATOR

TECHNICAL FIELD

The present disclosure relates to the fields of additive manufacturing. More specifically, the present disclosure relates to a three-dimensional (hereinafter referred to as "3D") printing apparatus using a beam of an atmospheric pressure inductively coupled plasma generator with nanoparticles as a building material for 3D objects. The 3D printer of the invention also uses an atmospheric-pressure ICP generator of a plasma beam with appropriate devices for vaporizing, atomizing and forming the precursor particles into a beam focused onto an object being treated.

BACKGROUND OF THE INVENTION

Semiconductor industry demands fabrication of two types of 3D objects. One of them is an elevated-up large area 3D dielectric structure for electrostatic chucks. Having a plurality of fine hair-like modules, it grips large thin flat objects like a silicon wafer with the diameter of 450 mm. An electrostatic force applied to a grasped flexible wafer with a large area may bend the flat-surface shape turning it into a curved surface and break it. This is a problem of the 450 mm-wafer processing that hinders its commercialization. A 3D electrostatic chuck is described in the International Patent Publication WO2017150574A1 issued on Aug. 9, 2017 to Saito Shiki, et al. ("Bipolar electrostatic chuck module and production method therefor"). The modules having a fine hair structure can provide a graspable surface having any area. The electrostatic force like a Coulomb one generates a mechanism for attraction of a grasped object like a large wafer without damaging the object during attachment or detachment. Such a 3D architecture adds flexibility to the electrostatic chuck surface to accommodate fragility of a 450 mm wafer.

Another application of 3D printing for semiconductor industry is fabrication of showerheads with a plasma-chemical corrosion protection barrier. Such showerheads have a plurality of gas holes that are to be exposed to highly corrosive etching gases like CF4 and S2F6 that pass through the showerhead during etching and deposition processes. If flat surfaces can be protected from the plasma-chemical corrosion by DC plasma spraying with yttrium oxide ($Y_2O_3$), gas holes of showerheads with a diameter of 0.6 mm and a depth of 12 mm cannot be easily covered with such a protective layer and will be subject to plasma-chemical corrosion.

If $Y_2O_3$ nanoparticles are applicable in the semiconductor industry, the yttria-stabilized zirconia (YSZ) particles could be used for fabrication, e.g., of 3D low-temperature Solid Oxide Fuel Cells (SOFC), where electro-chemical properties and ion conductivity of such particles could play an important role. A challenge here is a 3D deposition of a thin-film impermeable electrolyte with a submicron thickness on the porous anode.

In spite of an advantage of refractory-material nanoparticles for the additive manufacturing, the instruments for implementation of such nanoparticles in a 3D manufacturing process have not been yet developed. Nowadays, no one can perform building of 3D objects from refractory-material nanopowders because all refractory precursors for such a process will request melting, vaporization, precise delivery to the object, distribution in patterns, and subsequent layer-by-layer sintering of a multiple-layer structure from an amorphous state to a crystalline state. For example, a laser that can provide a focused thermal energy for melting and consolidating a metal powder exposed to a laser beam and subsequent integration of the substance onto a 3D object does not possess energy sufficient to afford such a process if it uses a ceramic material. Besides, a laser cannot carry the building material and deliver it in the melted or vaporized substance for densification of the 3D objects. Therefore, such laser-made 3D objects usually have a porous structure.

Other systems like aerodynamic jets can carry nanoparticles in a mist, focus a jet flow, and deliver a compound for integration into a 3D buildup. However, real 3D objects cannot be produced without transferring to nanoparticles a thermal energy sufficient for their melting and thus for subsequent post-deposition thermal processes, especially for melting, consolidation, and sintering. If the process is still performed, the obtained 3D objects will suffer from such drawbacks as shrinking, low precision and low density.

Thus, a plasma beam may be the best candidate for 3D nano-printing. It can serve simultaneously as a source of a direct thermal energy transferred to the nanopowder for melting and vaporization, a carrier of the melted or vaporized nanoparticles, a fine distributor of the focused vapor and, finally, a creator of a scanning sintering spot that, after each deposited layer, provides transition of an amorphous structure into a nanocrystalline material.

3D printing apparatuses that utilize a plasma beam for forming 3D structures by printing a layer by layer from top to bottom are known in the art.

For example, Chinese Patent Application Publication CN105922672 (inventor: Yunfang Hua) published on Sep. 7, 2016, discloses a plasma 3D printing equipment and method. The equipment is comprised of a monitoring system, a plasma beam processing system, and a printing platform. The plasma beam processing system consists of a plasma generator provided with a nozzle, a printing distance adjusting device for adjusting a distance between a nozzle outlet and a horizontal printing table, a gas supply device, and a powder-feeding device. The monitoring system includes a position adjustment controller, a temperature detection unit, a distance detection unit, and a printing distance-adjusting controller. The temperature detection unit and the printing distance-adjusting controller form a temperature adjustment device. The method comprises the following steps: 1) acquisition of a 3D model of a workpiece to be printed, and hierarchical slicing processing; 2) scanning path filling; 3) printing path acquisition; and 4) printing layer-by-layer from the top to the bottom.

US Patent Application Publication No. 20150042017A published on Feb. 12, 2018 (Inventors: K. Ramaswamy, et al.) discloses a systems, apparatuses, and methods of three-dimensional plasma printing or processing. In one embodiment, a method includes introducing chemical precursors into one or more point plasma sources, generating plasma in the one or more point plasma sources from the chemical precursors with one or more power sources, and locally patterning an object disposed over a stage with the generated plasma by moving the stage with respect to the one or more point plasma sources. A "point plasma source" is a plasma source capable of dispensing or directing plasma to a local area of the stage or substrate supported by the stage, in contrast to plasma sources and chambers, which subject an entire substrate to plasma processing with a single chemistry at once. The one or more point plasma sources are coupled to or comprise a printing head, which enables creating chemistries at high electron temperatures while a substrate disposed on the stage is at a substantially lower temperature than the plasma. Thus, using different point plasma sources to perform three-dimensional processing and printing enables maintenance of two different temperatures: the chemistry for performing the processing or printing is at a very high temperature necessary to create the radical or ionized species, and other stage or sample held by the stage is at a lower temperature. Maintaining two different temperatures further enables processing and printing with a mixture of different elements and the creation of different types of alloys (e.g., metals, dielectrics, etc.).

U.S. Pat. No. 9,486,878 issued on Nov. 8, 2016 to B. Buller, et al. discloses 3D objects, 3D printing processes, as well as methods, apparatuses and systems for the production of 3D objects. Methods, apparatuses and systems of the present disclosure may reduce or eliminate the need for auxiliary supports. The present disclosure provides 3D objects printed utilizing the printing processes, methods, apparatuses and systems described herein. The energy beam can be an electromagnetic beam, electron beam, or plasma beam.

U.S. patent Ser. No. 10/207,454 issued on Feb. 19, 2019 to B. Buller, et al. discloses various apparatuses and systems for 3D printing. The disclosure provides 3D printing methods, apparatuses, software and systems for a step-and-repeat energy irradiation process; controlling material characteristics and/or deformation of the 3D object; reducing deformation in a printed 3D object; and planarizing a material bed. In some embodiments, the tiling energy flux emits an energy stream towards the target surface in a step-and-repeat type sequence to perform the tile-forming process. The tiling energy flux may comprise radiative heat, electromagnetic radiation, charge particle radiation (e.g., e-beam), or a plasma beam. The tiling energy source may comprise a heater (e.g., a radiator or lamp), an electromagnetic radiation generator (e.g., laser), a charge particle radiation generator (e.g., an electron gun), or a plasma generator.

US Patent Application Publication No. 20170203364A1 published on Jul. 20, 2017 (Inventors: K. Ramaswamy, et al.) discloses an additive manufacturing system that includes a platen, a feed material dispenser apparatus configured to deliver a feed material over the platen, a laser configured to produce a laser beam, a controller configured to direct the laser beam to locations specified by data stored in a computer-readable medium to cause the feed material to fuse, and a plasma source configured to produce ions that are directed to substantially the same location on the platen as the laser beam. The laser source and the plasma source may be integrated in a coaxial point laser and plasma source configured such that the laser beam and the ions emerge from the coaxial point laser and plasma source along a common axis. The coaxial point laser and plasma source may be configured such that the laser beam and the ions emerge in an overlapping region. A heat source is configured to apply heat to feed material on the platen from a side of the feed material farther from the plasma source. The feed material can be dry powders of metallic or ceramic particles, metallic or ceramic powders in a liquid suspension, or a slurry suspension of a material.

US Patent Application Publication No. 20170067154 published on Mar. 9, 2017 (Inventor: T. Grotjohn) discloses systems and methods for using microplasma in 3D printing to deposit materials, remove materials, or modify the properties of materials deposited on a given substrate surface. The resulting microplasma-based 3D printing enables the integration of different types of materials into the same 3D printed structure that is not possible with current technology. The disclosed systems and methods utilize microplasma in 3D printers to enable the integration of different types of materials, such as plastics, metals, ceramics, or glass, into the same part during the 3D printing process. Typically, the size of the plasma stream can range from 10 micrometers to 1 millimeter. Further, the distance from the exit point of the print head and the structure being printed can be used to control the size of the plasma stream. Specifically, the further the plasma stream travels from the exit point of the print head to the surface, the more the plasma stream expands in width. Moreover, the thickness of the deposited layer can be adjusted from just a few atomic layers to thicker layers if the microplasma is left to deposit at the same region for a long time, or if the microplasma is passed over the same region many times.

SUMMARY OF THE INVENTION

A 3-D printing apparatus of the present invention contains a plasma beam generator that operates under atmospheric pressure and provides a plasma beam serving as a carrier and a vaporizer of the injected nanoparticles. The apparatus is intended for various additive technology approaches in which material is deposited using a layer-by-layer coating to build up structures and features, e.g., dental articles and implants. According to one aspect of the invention, the focused plasma beam generator is also operative for application of coatings on the surfaces of the energy-generating articles, including those that have three-dimensional profiles, like, e. g, surfaces of honeycomb-type solid oxide fuel cells, especially for deposition of an impermeable yttria-stabilized zirconia (YSZ) electrolyte on the surface of permeable Ni—YSZ anodes. In addition, it can be used for an yttrium oxide ($Y_2O_3$) deposition of the plasma-chemical corrosion barrier films on the inner surfaces of gas holes of showerheads used in the PECVD processors in semiconductor industry. The generated plasma beam may also be used as a source of a direct thermal energy for subsequent thermal processes such as preheating of an object prior to deposition of a nanomaterial, consolidation of the deposited layers, crystallization of amorphous coatings, and annealing of the deposited material for achieving required physical and electrochemical properties.

The key part of the 3D printer is a plasma beam jet generator designed for conversion of nanoparticles such as YSZ or $Y_2O_3$ having a high temperature of vaporization into a focused vapor beam for the subsequent deposition of the particles into nanolayers.

Nowadays, the sol-gel nanotechnology provides industries with commercial nanoparticles having dimensions of 20 nm and lower. A decrease of nanoparticle diameters makes it possible to drastically increase the surface-energy density and enhance thermal characteristics such as a melting temperature and specific heat capacity, causing the so-called Melting Point Depression (MPD) phenomenon. Such a phenomenon gives an opportunity to reduce a RF power required for vaporization of refractory materials used in deposition processes.

The MPD phenomenon as a means for a "solid nanoparticle-liquid shell-vaporized droplet" is realized in the following two steps:
1) pre-melting the shells of nanoparticles at a relatively low temperature around 600° C.; and 2) vaporizing the nanoparticles by overheating the shells to facilitate subsequent consumption of cores by the liquidized shells using the overwhelming specific surface energy.

This two-stage pattern was chosen to perform treatment of the material in the 3D-printing method of the invention.

The plasma beam generator used in the apparatus of the invention contains a plasma beam generator encompassed by an antenna system. Ended by the nozzle with an orifice for a supersonic ejection of a plasma beam, the plasma beam generator produces an aerodynamically focused plasma jet that can be implemented in any 3D printer replacing a laser or any other aerodynamic jet generation device.

A distinguishing feature of the apparatus of the invention is a grounded orifice metal electrode called an extractor, which is a copper strip located below the lower outlet orifice of the plasma generator and which extracts and focuses the plasma jet onto an object, e.g., a substrate. The lower outlet orifice, the extractor, and the substrate form parts of a virtual self-biased plasma gun. Like any optical electron system, this gun is characterized by the focal length. However, being designed for different applications, this gun has two operation modes: short-focusing regime and long-focusing one.

The extractor is moveable in the Z-direction with respect to the tip of the lower outlet. This is needed for adjusting a gap between the bottom outlet orifice and the facing side of the extractor. In addition, being provided with two orifices having diameters, e.g., 1.4 mm and 4 mm, the extractor plate is movable in the X-direction to establish a short-focusing regime with the 1.5 mm opening, or a long-focusing one with the 4 mm opening.

The two conversions mentioned above are performed with participation of a workpiece-holding platform that is movable in the Z-direction for positioning the top surface of the workpiece in the focal plane of the plasma gun, as well as in the X-Y directions for scanning the workpiece and exposing different portions of the workpieces to the plasma beam generated by the plasma gun. The platform is also provided with a tilt mechanism for such operations as overlapping the pores of the porous Ni—YSZ anode 107a (FIG. 19) to deposit the thin impermeable YSZ electrolyte for the low-temperature Solid Oxide Fuel Cells, as well as a conformal deposition of the amorphous silicon films on the textured silicon wafer for fabrication of hetero-junction tandem (HJT) solar cells. The fifth degree of motion provided for the orientation of the workpiece relative to the plasma beam is a tilting motion of the workpiece-supporting platform.

BRIEF DESCRIPTION OF THE DRAWINGS

FIG. 7 is a side view of the antenna in the direction of arrow IV of FIG. 38.

FIG. 8C is a three-dimensional view illustrating formation of the bottom inductively coupled plasma (ICP) discharge in the bottom plasma-confinement tube of the plasma generator of FIG. 1.

FIG. 12 is a model view illustrating a conversion of a nanoparticle from a solid state to vaporization.

FIG. 18 is a view that illustrate conformal deposition of amorphous silicon layers for fabrication of the HJT solar cells.

DETAILED DESCRIPTION OF THE INVENTION

The present invention relates to the field of additive manufacturing. More specifically, the present invention relates to a 3D printing apparatus using nanoparticles as a building material for 3D objects and an atmospheric-pressure inductively coupled plasma (hereinafter ICP) generator of a plasma beam with appropriate devices for vaporizing, atomizing and forming precursor particles into a plasma beam focused onto an object being treated. The invention also relates to a method of 3D printing by using the 3D printing apparatus of the invention.

Figure 1:
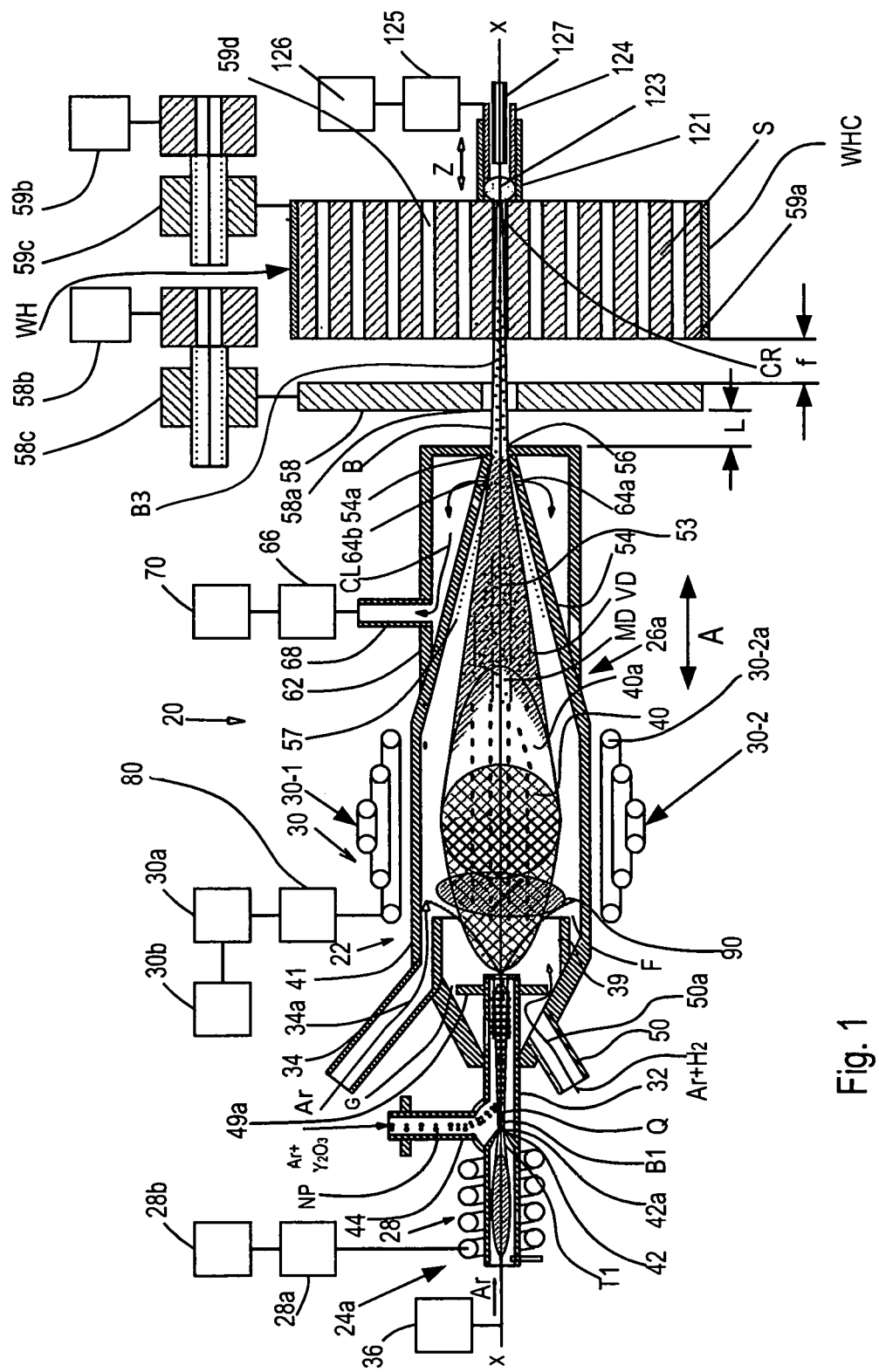
FIG. 1 is a longitudinal sectional view of an atmospheric-pressure ICP beam generator of the 3D printer of the invention.

FIG. 1 is a longitudinal sectional view of an atmospheric-pressure inductively coupled plasma-beam generator (hereinafter referred to as a "plasma generator" or "ICP generator") used in the 3D printer of the invention. As can be seen from FIG. 1, the plasma beam generator, which in an assembled form is designated by reference numeral 20, consists of two parts, i.e., a top plasma beam generator and a bottom plasma beam generator, an, antenna system 30 (hereinafter referred to as an "antenna"), and a focusing system 51.

Figure 2:
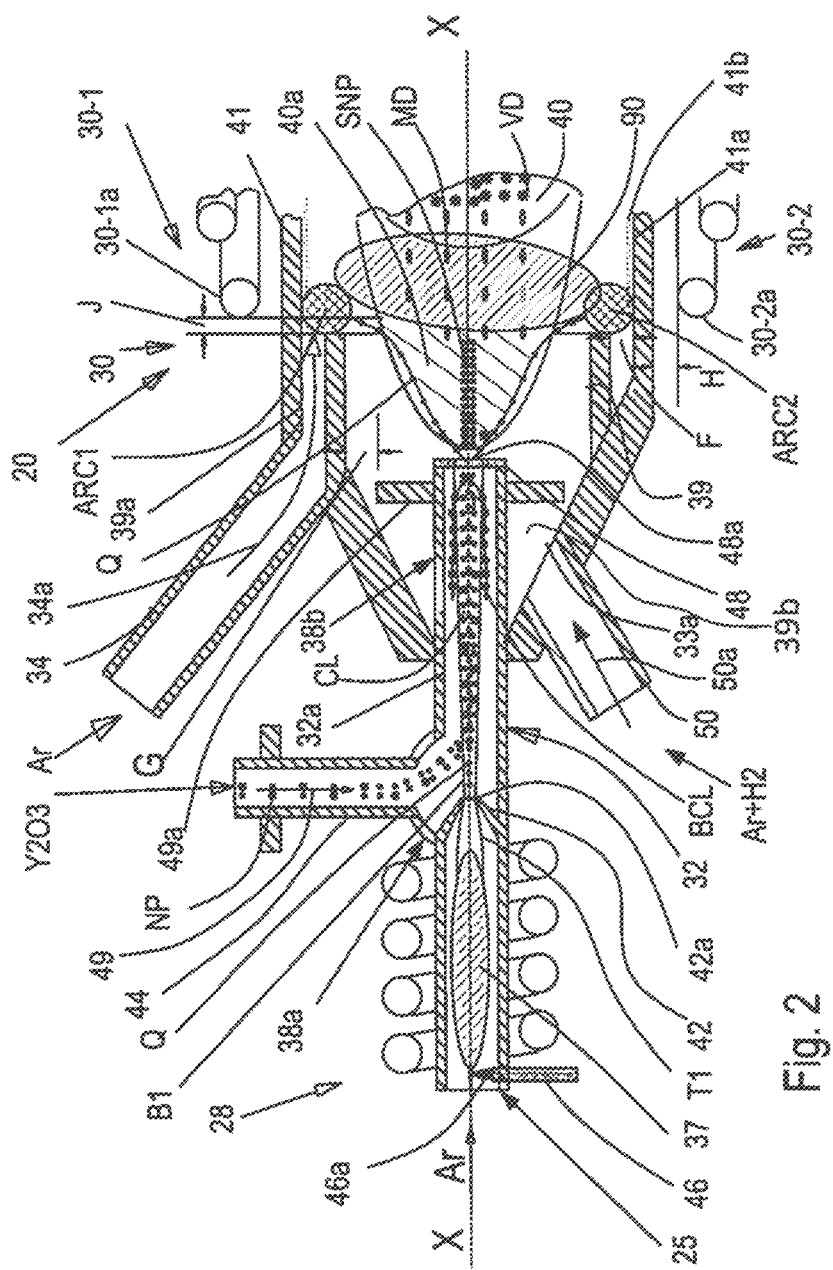
FIG. 2 is a longitudinal sectional view of the top part of the plasma beam generator of FIG. 1 shown on a larger scale.

FIG. 2 is a top portion of the two-stage plasma beam generator 20.

The two-stage plasma beam generator 20 has a tubular glass housing 22 that consists of two portions, i.e., a top portion 24a and a bottom portion 26a. Each portion functions as a confinement tube that serves as a plasma beam generator, i.e., a top confinement tube 28 and a bottom plasma-confinement tube, i.e., a bottom plasma-confinement tube 41, which is a part of a top-stage plasma beam generator 38a. The top confinement tube 25 is encompassed by a top inductor 28, and the bottom confinement tube 4, which is a part of a bottom-stage plasma beam generator 38d, is encompassed by a second coil inductor, which hereinafter is referred to as an antenna 30. The inductor 28 and antenna 30 are connected through matching networks 28a and 30a, respectively, to respective RF power generators 28b and 30b. However, the antenna 30 is connected to the RF generator 30b through a bridge, which is described later. The inductor 28, which is a top coil inductor, is connected to the RF generator 28b with 27.12 MHz AC frequency (e.g., a generator of CX-4000 model, product of Comdel, Inc., MA, USA). Antenna 30 is a "saddle-type antenna". The antenna 30, which is a saddle-type antenna, is connected through the matching network 30a to the RF generator 30b (e.g., Apex model, a product of Advanced Energy Industries, Inc., FORT COLLINS, Colo., USA) with 13.66 MHz AC frequency.

The top portion 24a and the bottom portion 26a of the tubular glass housing 22 communicate with each other through a communication tube called a "bouncing tube 32"

(FIG. 2) having a sheath gas supply port 34 between the top portion 24a and the bottom portion 26a. The bouncing tube 32 is intended for sorting the precursor nanoparticles and for admitting the precursor nanoparticles only of a size, which is smaller than a predetermined value into the plasma discharge, which occurs in a second housing 41.

The upper part of the top portion 24a of the plasma beam generator 20 is connected to a gas communication system 36 (FIG. 1) connected to a gas reservoir (not shown) through a mass flow controller (not shown) for supplying a pressurized first carrier gas (argon).

As shown in FIG. 2, the plasma beam generator 20 contains a top plasma-confinement tube 25 of the portion 24a, which is connected to a bouncing portion 38b of the bouncing tube 32 via an initial plasma-cleaving nozzle 42 having an opening 42a with a diameter of about 2-3 mm. The initial plasma-cleaving nozzle 42 is inserted into the bouncing tube 32 and, if necessary, can be secured therein.

The bouncing tube 32 has a lateral port 44 for supplying precursor nanoparticles NP, e.g., of YSZ, or $Y_2O_3$, with a carrier gas, e.g., argon. The precursor particles NP and the carrier gas (argon) are supplied from respective sources not shown in the drawing. Furthermore, the top confinement tube 26 of the portion 24a is provided with an igniter 46 in the form of a tungsten needle welded to the top portion of the top confinement tube 25 near its entrance into the plasma-confinement tube 25. This igniter 46 (FIG. 2) is connected to a Tesla transformer (not shown) and is intended for generating a spark 48a in the argon that fills the interior of the top portion 24a, which functions as a confinement portion of the top confinement tube 25 and thus for generating seed electrons (not shown) in the vicinity of a high electrical field induced by the inductor 28 that is wound around the top confinement tube 25 of the top portion 24a of the plasma beam generator 20. When the seed electrons enter the interior of the top confinement tube 25 of the confinement portion of the bouncing tube 32, the electrical field generated by the top inductor 28 generates a capacitively coupled plasma (CCP) discharge (not shown) inside the interior of the top confinement tube 25.

Further increase of the RF power applied to the inductor 28 generates RF electrical and magnetic fields where the first of them accelerates electrons of a capacitively coupled plasma (CCP) discharge inside the top confinement tube 25. The RF magnetic field causes transition of the CCP discharge to an inductively coupled plasma (ICP) discharge 37 (FIG. 2).

The RF power applied to the inductor 28 (e.g., around 350 W at an AC frequency of 27.12 MHz) is sufficient to generate and sustain a plasma torch T1 in the interior of the top confinement tube 25 where the atmospheric pressure inductively coupled plasma ICP discharge (AP-ICP) 37 takes place. The top confinement tube 28 may have an inner diameter in the range of 8 mm to 12 mm. In one practical example, for the aforementioned power and AC frequency, the top confinement tube 25 at the portion 24a of the bouncing tube had a diameter of 10 mm.

The AP-ICP (Atmospheric Pressure Inductively Coupled Plasma) discharge 37 generated in the interior of the top confinement tube 25 at the portion 24a of the bouncing tube 32 is able to consume the RF power from the top coil inductor 28 and increase its own plasma density, thus increasing the plasma current and, hence, the own RF magnetic field. As a result, the discharge 37 generated in the top confinement tube 25 generating its own magnetic field, which at the portion 24a acquires a property of self-pinching and is squeezed to form the aforementioned high temperature plasma torch T1 oriented in the axial direction of the bouncing tube 32. Moreover, the axial component of the RF magnetic field of the top coil inductor 28 functions as a magnetic lens. Under the effect of the additional magnetic force, the torch T1 is pinched and squeezed into a high temperature plasma filament, which propagates in the axial direction of the top confinement tube 25 through the bouncing tube 32 to the orifice 42a of the separation nozzle 42 into the bouncing tube 32. Such plasma filament is transformed by the nozzle 42 into a plasma beam B1 ejected through the orifice 42a and propagated along the axis of the bouncing tube 32.

The top-stage plasma beam generator 38a that generates the top ICP discharge 37 and the torch T1 should have an RF power that corresponds to the diameter of the top confinement tube 25. For example, in one practical embodiment, the RF power value of around 350 W was optimal for the top confinement tube 25 having the inner diameter of 10 mm. The power exceeding 350 W may cause overheating of the top confinement tube 25. On other hand, a limiting density of the torch T1 is undesirable since the nozzle 32 will not be able to fulfill the cooling function and will prevent penetration of high-temperature components of the plasma torch 37 into the bouncing portion 38b of the bouncing tube 32. The high-temperature components are cooled by the nozzle 42 under the effect of an aerodynamic expansion. However, the aerodynamic-expansion cooling is very limited and cannot afford a high plasma density of the torch T1. Its duty is to bring the temperature of the beam in the bouncing tube 32 to some critical value that can heat nanoparticles bouncing in this tube up to temperature around 600° C. Such a value is chosen for pre-melting of the shells of nanoparticles made of $Y_2O_3$ or YSZ. Thus, an extra RF power applied to the inductor would cause a premature total melting or even vaporization of the bouncing nanoparticles NP, and may cause deposition of the particles onto the inner wall of the bouncing tube 32.

In addition to pre-melting, the bouncing tube 32 is designed to fulfill other functions, such as:
1) aerodynamic selection of nanoparticles NP from clusters CL according to their size and the related aerodynamic resistance using the preselected pressure gradients developed in the bouncing tube from one side due to the natural divergence of the plasma beam T1 and from the opposite side by the backpressure of the bottom discharge 40a;
2) de-aggregation of the bouncing clusters CL by exposing them, during their multiple passes along the bouncing tube 28, to bombarding negative species Q of the plasma beam T1 with subsequent multiple charging;
3) supplying the bottom plasma-confinement tube 41 with charged species Q injected into this tube together with the selected nanoparticles SNP, which move in the axial direction; the charged species Q, which move toward the high electrical field area developed in the peripheral part of the bottom confinement tube, serve as seed electrons for initiating a breakdown in the vicinity of the top high voltage turns of the bottom antenna 30; such a breakdown triggers the CCP discharge 90 in the bottom plasma-confinement tube 41 that, in turn, initiates the bottom plasma discharge 40a (FIG. 1); such seed species Q have a duty to restore the bottom discharge 40a in the case of its exhaustion, if the feeding rate of the selected nanoparticles SNP exceeds some critical value above which the RF power cannot sustain the discharge.

In order to avoid deposition of the particles onto the inner wall 32a of the bouncing tube 32 prior to vaporization of the particles NP from the bottom plasma discharge 40a, it is necessary to protect the particles from complete melting. This is achieved by cooling the high temperature plasma torch 37 by aerodynamic expansion when it passes through the top quartz nozzle 42 that separates the portion 24a of the top confinement tube 25 from the bouncing tube 32, so that the nozzle 42 passes only a low temperature component of the plasma torch that includes the charged Q spices and neutral (not shown) species generated by the bulk top plasma discharge 37.

The bottom portion 26a of the plasma generator 20 contains the bottom-stage plasma beam generator 38d, which contains the bottom plasma-confinement tube 41 that accommodates an intermediate housing, hereinafter referred to as an intermediate portion 39 made from glass, ceramic, quartz, or a similar RF-transparent material. The intermediate housing 39 that has an interior 39b (FIG. 2) sealingly embraces the bouncing tube 32 and is encompassed by the first end of the second housing, i.e., by the bottom confinement tube 4, with a first gap F.

The bouncing tube 32 of the top portion 24a is immersed into the top of the intermediate portion 39, e.g., to the depth of about 8-10 mm. The intermediate portion 39 is intended for receiving the charged species Q from the bouncing portion beam 32c for launching the bottom bulk plasma discharge 40a, as well as the selected nanoparticles SNP for converting them initially into the melting droplets MD, and then into a vapor droplets VD in the plasma ball 40.

At this stage, the supply of charged or seed species Q from the top plasma torch 37 into the bottom portion 26a through the intermediate portion 39 for launching the bottom bulk-plasma discharge 40a should be adjusted in order to stabilize the plasma-sustaining process and make it steady.

This means that if for some reasons, such as, e.g., overloading of the plasma discharge with nanoparticles SNP or mismatching with the RF power source, etc., the bottom plasma discharge 40a may not be further sustained, the sustaining of the bottom plasma discharge 40a in the bottom plasma-confinement tube 41 will still continue to exist because of the continuous supply of the seed species Q for immediate restoration of the bottom discharge 40a after the matching network returns the RF power back to the launching threshold.

It is understood that only nanoparticles NP of the size not exceeding a predetermined value and that were manufactured by the sol-gel technology, certified, and passed the process of separation in the so-called Nano-Delivery System should be purchased for use in the plasma beam generator of the invention. Only such thoroughly selected nanoparticles SNP are permitted for use and for entering the intermediate portion 39 and further the bottom plasma-confinement tube 41 where the bottom bulk-plasma discharge 40a takes place. A criterion used for such a selection is an aerodynamic resistance of the moving nanoparticle NP with a size of 20 nm and less pushed by the carrier gas 49 against the backpressure of the bottom plasma discharge 40a. A development of the backpressure will be considered later in the description of the operation of the plasma beam generator 20.

However, since the clusters, which are in reality conglomerates of nanoparticles tied together by Van der Waals forces, have a larger cross section and characterized by aerodynamic resistance higher than the single nanoparticles, they will be rejected by the backpressure. The flow of the rejected clusters BCL remains in the bouncing tube 32. Being constantly exposed to the stream of the charged species Q, they undergo the bombardment and charging by these species. Due to multiple charging, the nanoparticles NP tied by the Van der Waals forces into clusters acquire electrical forces to de-aggregate for restoration into sol-gel type nanoparticles of the original size that provides a permitted aerodynamic resistance to the flow. in FIG. 3, C13 shows a cluster as an aggregation of the charged nanoparticles NP, and C14 shows a cloud of nanoparticles NP liberated from the Van der Waals forces and having vectors of velocity directed by the carrier gas 49 against the backpressure from the bottom bulk plasma discharge 40*a*.

The bouncing tube 32, which incorporates a function of disaggregation of clusters, develops two pressure components such as a front pressure provided by the top beam B1 propagated from the nozzle 42 in the direction of axis X of the tube and the backpressure acting in the opposite direction from the bottom bulk-plasma discharge 40*a*.

Each pressure component has a pressure gradient in the axial direction of the bouncing tube 32. The natural pressure gradient is caused by natural pressure dissipation due to divergence of the top plasma beam B1 generated by the top plasma torch T1. This pressure gradient also depends on the diameter of the orifice 42*a* of the separation nozzle 42. The gradient of the backpressure from the side of the bottom plasma-confinement tube 41 depends on the pressure drop caused by dissipation of the backpressure developed by the bottom plasma discharge 40*a*. At the stage of design of the plasma beam generator 20, the superposition of the component pressure gradients will create a virtual pressure valley of the type shown in FIG. 3. This figure is a longitudinal model view illustrating a cluster bouncing process in the bouncing portion of the bouncing tube used in the atmospheric-pressure ICP generator of the invention. In this drawing, the curve μl designates a profile of the resulting pressure in the bouncing tube 32 provided by the beam B1 and the backpressure of the discharge 40*a* from the opposite side. Reference numerals CL1, CL2, etc., show the integrated clusters, and reference numerals C13 and C14 show clusters disintegrated into nanoparticles. It can be seen that the lowest resulting pressure is provided exactly in the vicinity of the area into which the nanoparticles are injected and pushed by the carrier gas into the bottom torch from the port 44 (FIGS. 1 and 2).

The aforementioned bouncing process occurs exactly under predetermined pressure conditions, which are described above. This process occurs due to special features of the plasma beam generator provided at a design stage. Such features are the inner diameter of the outlet orifice 48*a* of a throttling insert 48 at the end of the bouncing tube 32 (which in one example was about 3-4 mm) and adjustment of the backpressure acting from the interior of the intermediate portion 39 against the front pressure, which, in turn, is adjusted by the outlet orifice 42*a* of the top separation nozzle 42. Nanoparticles SNP that are supposed to be injected into the bottom plasma-confinement tube 41 are also selected by maintaining the balance between both pressures to accommodate the aerodynamic resistance only of these nanoparticles.

Thus, the nanoparticles are continuously ejected from the bouncing tube 32 without premature deposition onto the inner wall of the intermediate portion 39. At the same time, the inner diameter at the outlet of the bouncing tube 32 should not obstruct penetration of backpressure developed by the high temperature bulk-plasma discharge 40*a* into the bouncing tube 32 in order to maintain the bouncing process for disaggregation of the clusters, which are repelled, by the high backpressure.

Therefore, as shown in FIG. 2, the outlet of the bouncing tube 32 is provided with the replaceable throttle insert 48 having the orifice 48*a* of a predetermined diameter needed for balancing the bouncing process. For one embodiment, it was experimentally found that the most optimal diameter for the orifice 48*a* of the replaceable throttle insert 48 is in the range of 2 mm to 3 mm. Although the nanoparticles NP are injected from the port 44 normally strictly in the axial direction of the bouncing tube 32, during bouncing and breaking of the clusters CL apart, on their way to the outlet of the bouncing tube, the particles may re-group according to their aerodynamic resistance into the axial flows oscillating between the nozzle 42 and the throttle insert 48.

It can be seen from FIG. 1 that the bouncing tube 32 is provided with a restricting or guarding ring (which is a quartz ring) 49*a* on its end with an outer diameter that is less than the inner diameter of the intermediate portion 39. This ring forms an annular gap G, i.e., a discharge-gas flow restricting gap between the edge of the ring guarding and the inner wall 39*a* of the intermediate portion 39 for passing a discharge gas (e.g., $Ar+H_2$) flow 50*a*, which is fed into the interior compartment 33*a* of the intermediate portion 39 through a discharge gas inlet port 50.

The plasma generator 20 is also provided with a sheath gas supply insert 34 fixedly attached to the glassware which supplies a sheath gas (e.g., Ar) 34*a*, into a gap F formed between the outer wall of the intermediate portion 39 and the inner wall of the bottom plasma-confinement tube 41. The sheath gas 34*a* propagates along the inner wall 41*a* of the bottom plasma-confinement tube 41, neutralizes the negatively charged sheath layer 41*b* formed on the peripheral portion of the plasma discharge 40*a* approaching the inner wall 41*a* and at the same time performs cooling of the inner walls 41*a* of the bottom plasma-confinement tube 41, thus protecting the bottom plasma-confinement tube 41 from overheating and destruction. Neutralization of the sheath layer 41*b* by the sheath gas 34*a* improves the transparency of the walls of the bottom plasma-confinement tube 41 for the electromagnetic field generated by the saddle antenna 30.

Although only one discharge-gas inlet port 50 and only one sheath-gas supply port 34 are shown in FIG. 1, the actual structure of the two-stage plasma beam generator 20 may contain two or more such ports for the sheath gas 34*a*, as well as for the discharge gas 60*a* (FIGS. 1 and 2). It is important, however, to arrange these ports in offset positions with respect to each other and at an angle to the longitudinal axis X-X of the plasma-beam generator 20 for creating non-intersecting gas flows injected in the opposite directions. Thus, the offset discharge-gas flows 50*a* and sheath-gas flows 34*a* generate vortices of the respective gases in communication with a compartment 34*b* between the intermediate portion 39 and the bottom plasma-confinement tube 41, as well as between the space 33*a* (see FIG. 2) and the intermediate portion 39 separated by the quartz ring 48.

The swirling mode of the sheath gas flow 34*a* facilitates generation of the AP-ICP discharge developing a breakdown pressure in the area of a strong RF electric field in a vicinity of the top high-voltage turns 30-1*a* and 30-2*a* of the saddle antenna 30, in other words, with the outermost turns. Such a pressure is needed for initiation of the gas breakdown for launching the CCP discharge 90.

The sheath gas 34*a* passes through the area of a strong RF electric field developed near the top high-voltage turns 30-1*a* and 30-2*a* (FIG. 2) of the saddle antenna 30, and this facilitates generation of the CCP discharge 90, which creates a pressure needed for the electrical breakdown of this gas.

The swirling sheath gas flow 34*a* carrying the charged species along the CCP discharge 90 pushes the discharge down along the inner wall 41*a* of the confinement tube 41 to the area of the dense RF magnetic field generated by the wires of the turns 30-1*a* and 30-2*a* of the antenna branches 30-1 and 30-2. As a result, the CCP discharge 90 is converted into the ICP discharge 40*a*, which is located in a plane perpendicular to the axis X-X of the generator 20, where the dense RF magnetic field is generated. Thus, besides many other functions such as cooling and neutralization of the sheath layer, the sheath gas also facilitates generation of the ICP discharge 40*a* on the periphery of the bottom plasma-confinement tube 41.

Figure 4:
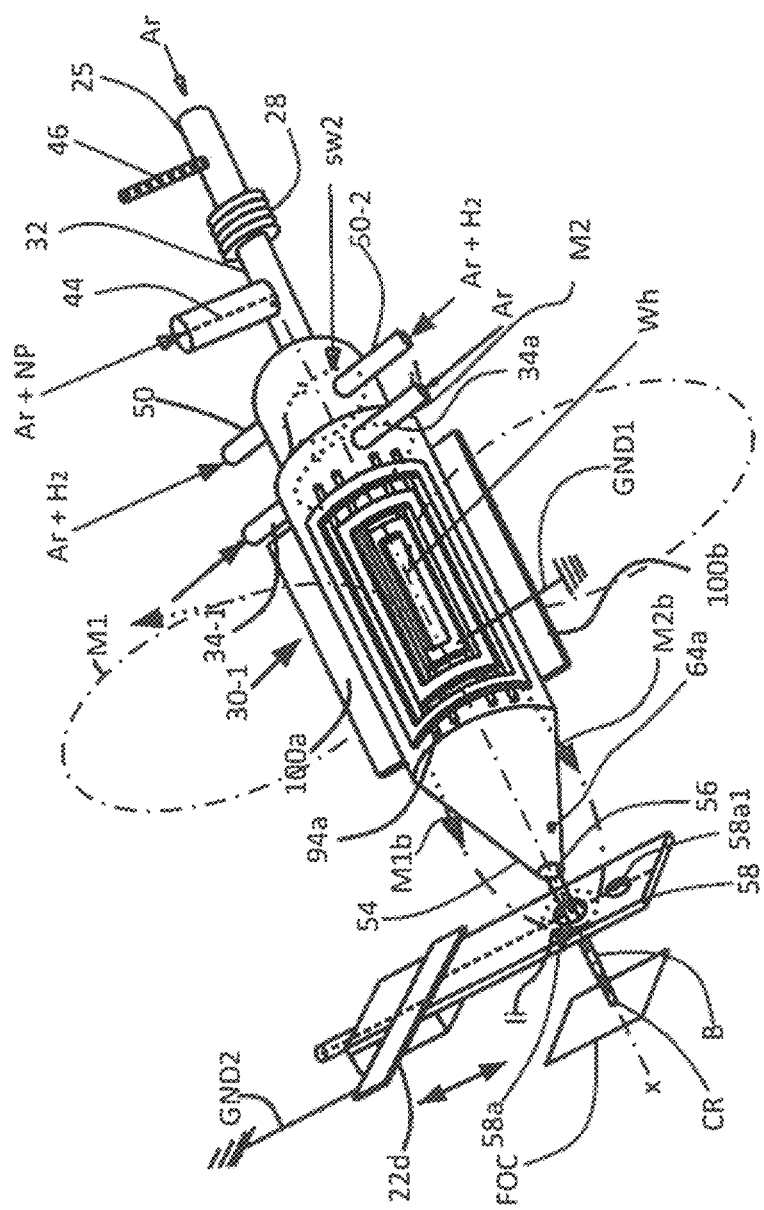
FIG. 4 is a three-dimensional view of the apparatus of the invention without the jacket and the extractor motion system.

FIG. 4 is a three-dimensional view of the apparatus of the invention 20 without the jacket 62 and the mechanism 58*c* (FIG. 1). This drawing shows gas injection pipes, i.e., a pair of oppositely located and tangentially connected pipes 34-1, 34-2 for injection of argon (shear gas 34*a*) into the interior of the bottom plasma-confinement tube 41 and a pair of pipes 50-1, 50-2 tangentially connected to the intermediate portion 39 for injection of argon with hydrogen (discharge gas 50*a*) into the interior of the intermediate portion. The tangential supply of gases from diametrically opposite sides creates vortices shown by the arrowed elliptical lines SW1 and SW2. This swirling penetrates the gaps G and F (FIG. 1).

After percolation through the gap F (FIG. 2), the vortex of the discharge gas 60*a* will further participate in the swirling process during generation of the ICP discharge 40*a* in the bottom plasma-confinement tube 41. In this connection, the vortex of the discharge gas 50*a* will help to expel the initially cold discharge gas from the axis X-X in order to prevent cooling of the central high temperature vaporization area of the bottom discharge 40*a* near the axis X-X. This action also contributes to uniformity of the discharge gas distribution in a cross-section of the bottom plasma-confinement tube 41, as well as to uniformity of distribution of plasma density over the entire volume of the ICP discharge 40*a*.

Besides the maintenance of the gap F, the guarding ring 49*a* offsets the swirling discharge gas flow from the flow of the nanoparticles NP to prevent the flow disruption and cooling of the pre-melted shells before the flow of SNP enters the high temperature area of the discharge 40*a* for conversion into the flow of the melted droplets MD.

An important factor for sustaining the ICP discharge 40*a* is a ratio of the flow rate of the sheath gas 34*a* to the flow rate of the discharge gas 60*a* controlled by the respective mass flowmeters (not shown). This ratio should be in the range of 2 to 2.5. Another important factor for generation of the vortex and swirling that provide uniformity of the ICP discharge 40*a* and distribution of the high temperature area is values of the gaps G and F (FIG. 2).

Thus, the following gaseous components are delivered into the interior of the bottom plasma-confinement tube 41 for launching the bottom discharge 40*a*:
- the discharge gas 50*a* (Ar+Ha) fed through the port 50;
- the precursor nanoparticles, e.g., of yttria stabilized zirconia (YSZ) or $Y_2O_3$, or other metal oxides, with a carrier gas, e.g., argon supplied through the ports 44; and
- the sheath gas 34*a*, e.g., Ar supplied through the sheath-gas-supply inlet insert 34.

The gap F between the outer diameter of the intermediate portion 39 and the inner diameter of the bottom plasma-confinement tube 41 should have a predetermined value, which is important also for matching the geometric and electrical parameters of the below-described saddle antenna 30 with the generation of the bottom plasma discharge 40*a* in the bottom plasma-confinement tube 41.

The lower end of the bottom plasma-confinement tube 41 is connected to a tapered nozzle 54, which ends with a tip 54*a* having a beam-pass opening depicted as a lower nozzle outlet orifice 56. The lower nozzle outlet orifice 56 may have a diameter in the range of 0.6 mm to 3 mm, e.g., 1.8 mm. The convergence angle of the nozzle may be selected, e.g., in the range of 30 to 60°, e.g., 55°. The converging shape of the nozzle 54 narrows the plasma torch 53 generated in the bottom plasma-confinement tube 41 as a result of processes described below in the section entitled "Operation of the Plasma Beam Generator," and redirects the vectors of flows pushing the plasma species to the throat of the bottom outlet nozzle with acceleration of the high-temperature plasma stream towards the lower outlet orifice 56.

Reference number 57 designates a sheath layer situated in a vicinity of the inner wall of the tapered nozzle 54, especially inside the tip 54*a* and the orifice 56.

Located below the lower outlet orifice 56 (FIG. 1) is a grounded strip-like copper electrode, which is a copper strip that constitutes a plasma beam extractor 58 with an opening 58*a* that extracts and focuses a plasma beam B onto an object S.

The plasma beam extractor 58 is moveable with respect to the tip of the lower outlet orifice 56 by a mechanism that includes a drive motor 58*b*. WH designates a workpiece holder chuck that holds the workpiece S (FIG. 1). Reference numeral 59*c* conventionally designates a drive mechanism of the workpiece holder chuck WHC. The motion in the X direction is needed for adjusting a gap L between the orifice 56 and the facing top surface 58*a* of the extractor 58, and thus for focusing the beam on the object. An example of a workpiece holder WH is an end effector of an industrial robot arm having six-degrees of freedom, which is disclosed in U.S. Pat. No. 8,243,730 issued on Aug. 14, 2012 to M. Nichols, et al. The end effector that holds a workpiece S has driven mechanisms that provides the workpiece with at least five degrees of freedom such as linear motions in the directions of X, Y, Z axes and two rotations such as rotation around the Z axes and tilting in the Z-X or Z-Y plane. The end effector of the aforementioned Patent provides such motions. The structure of the workpiece holder WH is beyond the scope of the present invention.

More specifically, the object S can be moved in the X-Y plane by a mechanism, such as a drive motor 59*b* installed on the workpiece holder WH (FIG. 1). Distance Lf between the extractor 58 and the top surface S9*a* of the object S can be adjusted in order to align the surface 59*a* with the focal plane (not shown) where the focused plasma beam B has a minimal cross section CR (crossover). Process of the 3D printing can be realized by depositing a material onto a 3D objects in a layer-by-layer manner. Such a deposition or elevation of the object requests continues lowering of the object S in order to keep a fresh elevated surface in the focal plane where the crossover CP is located.

In the semiconductor industry, 3D printers are used, e.g., for protecting surfaces of 3D objects that participate in wafer processing operations, e.g., from corrosion that may be caused by plasma-chemical reactions. Coating, e.g., with $Y_2O_3$, forms a corrosion protective barrier against such deteriorating action. 3D objects which are subject to the effect of plasma-chemical reactions are, e.g., showerheads having gas holes with an aspect ratio of 1:20 (a ratio of a hole diameter to the hole length). In order to increase the service time of showerheads, the inner walls of the gas holes should be coated with a protective barrier layer by treating them with a plasma beam B that carries a vaporized flow of $Y_2O_3$. An object S shown in FIG. 1 represents an aluminum showerhead, such as, e.g., 0040-82516/SGD LOWER SHOWER HEAD, HEA, 300 MM EMAX/APPLIED MATERIALS with 900 gas holes having a diameter of 0.5 mm and depth of 10 mm. The showerhead S should be constantly lifted to expose the entire inner surface of each hole from the inlet to outlet to the crossover CR.

Reference numeral 62 designates a jacket, which is fit onto the lower end of the bottom plasma-confinement tube 41 and welded to the upper and lower ends of the tube 41 without blocking the lower outlet orifice 56.

The lower end of the tapered nozzle 54 may have pressure release openings 64a and 64b, which connect the interior of the bottom plasma-confinement tube 41 with the cavity of the jacket 62. Although two such openings 64a and 64b are shown, it is understood that more than two openings can be used provided they are arranged uniformly to prevent violation of the uniformity of flow. In case of an excess pressure inside the bottom plasma-confinement tube 41, the excess pressure is released through a check valve 66 installed in an exhaust port 68. Simultaneously, some clusters CL, which are percolated into the confinement tube 41 and eluded de-aggregation in the bouncing tube 32, may penetrate into the high temperature area of the ICP discharge 40a without melting and vaporization and may be accumulated behind the orifice 56 threatening to clog it. Such clogging may cause explosion of the highly pressurized confinement tube 41. However, the openings 64a and 64b can provide release of the clusters CL, preventing their propagation through the orifice and contamination of the plasma beam B. A filter 70 that is able to prevent admission of nanoparticles to the environment is installed in the exhaust port 68 after the check valve 66 (FIG. 1).

Figure 5:
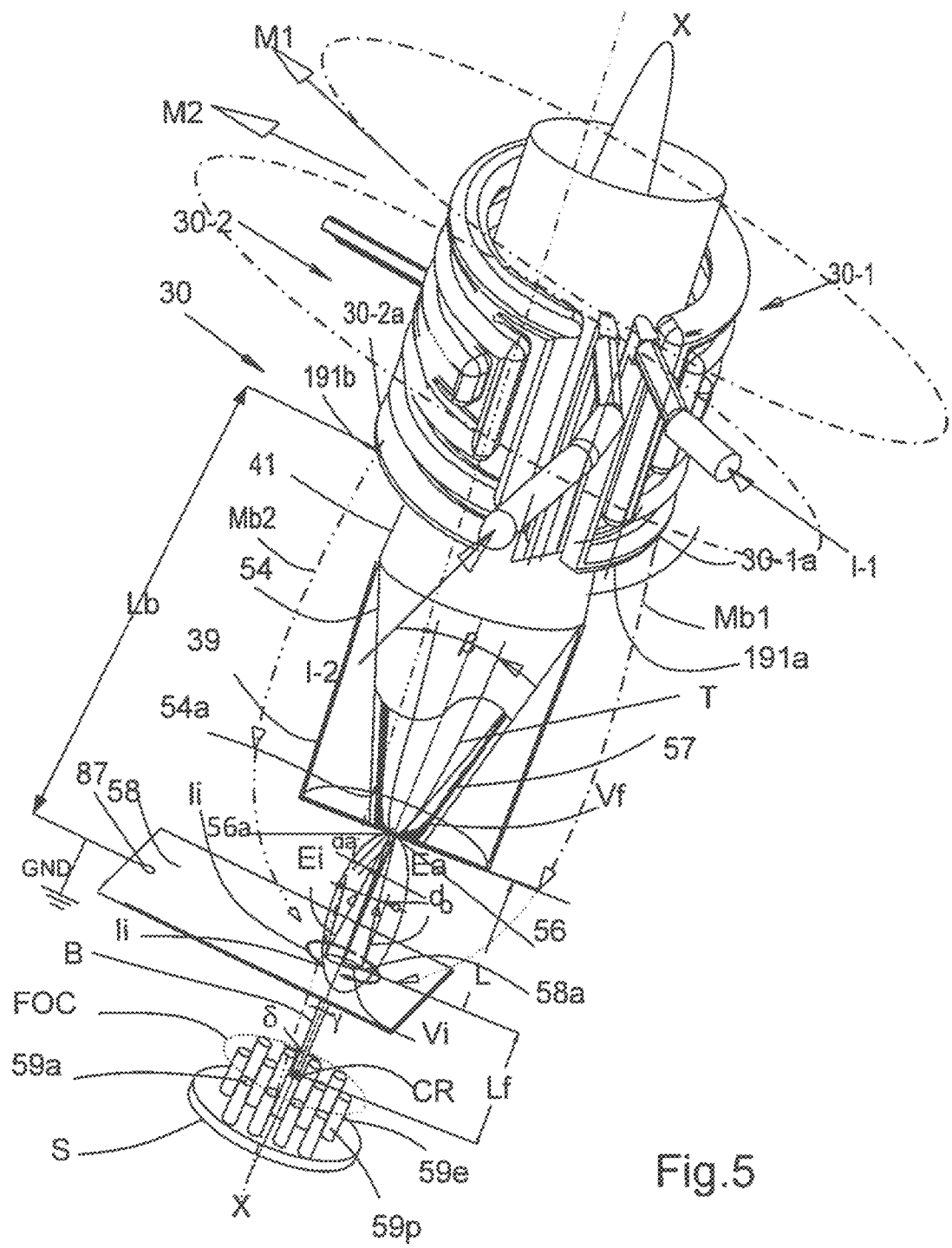
FIG. 5 is a three-dimensional view illustrating the bottom-stage plasma beam generator that includes the saddle antenna with the two branches, bottom plasma-confinement tube, nozzle, grounded extractor, and arrangement of these components with respect to each other and the object being treated.

FIG. 5 is a three-dimensional view illustrating the bottom-stage plasma beam generator 38d that includes the saddle antenna 30 with the two branches 30-1 and 30-2, bottom plasma-confinement tube 41, tapered nozzle 54 with the tip 54a, grounded extractor 58, and arrangement of these components with respect to each other and the object being treated.

The object S is depicted here as a 3D object such as a chuck with pins 69p that should be treated using the plasma beam B carrying a vapor of $Y_2O_3$ or another metal oxide material. If the object S depicted in FIG. 1 is shown as a showerhead with the gas holes, in FIG. 5 the object is shown as an electrostatic chuck with ceramic hairs 9e, which should be grown by treating with the plasma beam and gradually lowered during the process. The lowering movements is provided by the workpiece holder WH (FIG. 1) and is aimed to align the surface being treated or coated with the focal plane FOC where the beam has a CR crossover. Such an alignment will provide high resolution during the ceramic hair buildup operation on an electrostatic chuck, or the like. In case of showerheads, the alignment of the treated surfaces with FOC will ensure a formation of a pore-less and uniform corrosion barrier coating on the inner surfaced of the gas holes from their inlets to outlets.

The outer electromagnetic field of the antenna 30 and, especially the electromagnetic fields Mb1 and Mb2 irradiated by the bottom portions of the high voltage turns 30-1a and 30-2a, interfere with grounded extractor 58, which is exposed to these portions of the turns. While the top portions of the high voltage turns in the branches 30-1 and 30-2 irradiate RF electric fields that cause breakdown in the gases and initiate the CCP discharge 90 in the confinement tube 41, the bottom portions of the turns irradiate the surface of the extractor 58 that faces the high voltage portions 191a and 191b of the antenna turns 30-1a and 30-2a lowermost relative to the extractor 58 with electromagnetic fields Mb1 and Mb2 that induce the induction current Ii in the extractor 58.

The current Ii provides a drop of potential Vi near the edges of the opening 58a. The phenomenon that takes place near the gap L between the orifice 56 of the nozzle 54 and the opening 58a of the extractor 58 is shown in FIG. 11.

Figure 11:
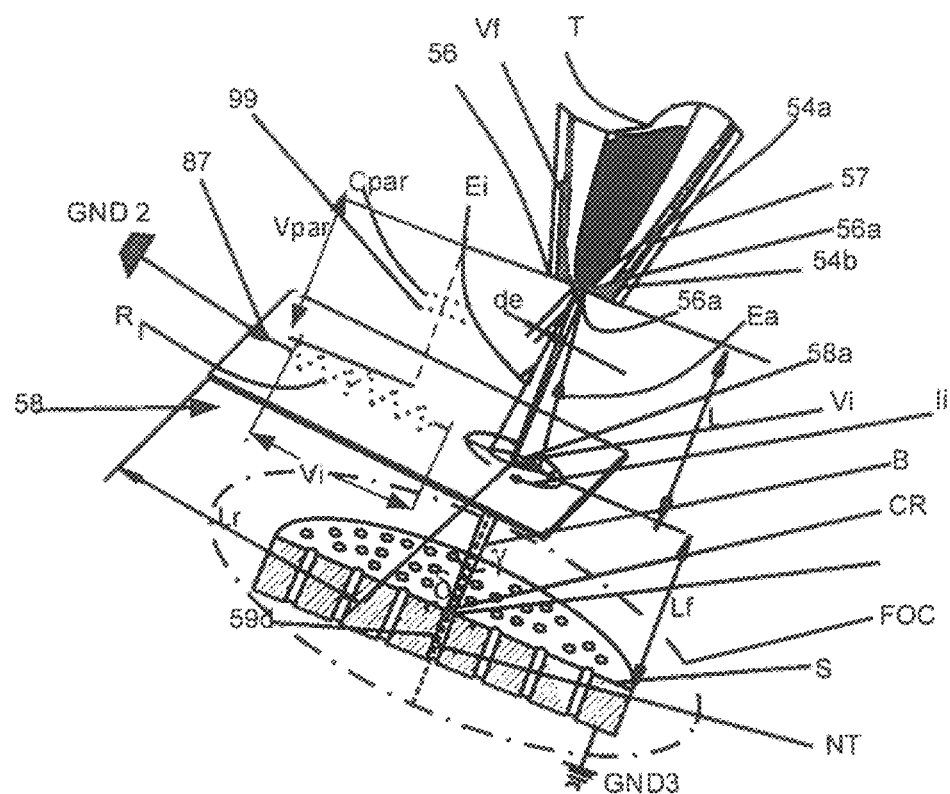
FIG. 11 is a view illustrating a self-biased plasma gun W that includes a nozzle orifice, an extractor with openings and a sheath layer on the inner surface of the nozzle tip in the area behind the orifice.

FIG. 11 is a view illustrating a self-biased plasma gun W that includes the orifice 56, the extractor 58 with the opening 58a, and the sheath layer 57 on the inner surface 54b of the tip 54a in the area behind the orifice 56.

The sheath layer 57 participates in a capacitive coupling with the grounded extractor 58, especially with the opening 58a in the extractor. Since this layer consists of the electrons saturating the boundary area near the inner wall of the nozzle and has a conical shape, according to the conical shape of the inner wall of the nozzle, it will be hereinafter referred to as a "frozen electron cone". Saturated electrons of this cone 57 provide a negative floating potential Vf. Although, such a potential blocks propagation of the plasma torch 53 through the orifice 56, it provides coupling with the grounded extractor 58, especially with the edges of the opening 58a. Such a coupling is provided through a parasitic capacitor $C_{par}$ that creates a bias resistance between the frozen electron cone 57 and the extractor 58 with a voltage drop of $V_{par}$ (FIG. 11). Such a drop, in turn, creates an electrostatic field $E_a$ between the "frozen electron cone" 57 and the extractor 58. This field penetrates the orifice 56 and lowers the floating potential $V_i$ up to breaching the frozen electron cone 57 and opening a virtual hole in this cone layer called a sheath's aperture 56a (FIG. 11).

On the other hand, the bottom high-voltage wires 191a and 191b of the outer turns 30-1a and 30-1b of the antenna branches 30-1 and 30-2, respectively, also participate in the focusing process by generating the above mentioned RF magnetic fields Mb1 and Mb2 (See FIG. 5).

These fields, in turn, generate an induction current Ii in the surface of the extractor 88, which is exposed to the fields Mb1 and Mb2. Thus, the edges of the opening 58a of the extractor 58 are maintained under the potential designated as potential Vi (FIG. 5). The induction current Ii that is induced by the electromagnetic fields Mb1 and Mb 2, in turn, produces the aforementioned high-voltage RF potential $V_i$. This potential $V_i$, which is accumulated near the sharp edges of the opening 58a, provides an electrical field $E_i$ of a high strength, e.g., around of 1 kV/m, which is directed into the orifice 56 of the tip 54a (FIG. 1). Due to the precise alignment of the orifice 56 with the opening 58a of the extractor 58, such an electric field $E_i$ is combined with the electric field $E_a$ generated by the voltage drop of $V_{par}$. Both of them penetrate orifice 56, as well as the area inside of the tip 54a, thus reducing the floating potential $V_f$ of the frozen electrons up to some level of the controlled potential, and this action de-blocks the plasma beam B. The strength of the electric field $E_a$ that percolates into the interior of the tip 54a depends on the distance between the orifice 56 and extractor 58, a diameter of the opening 58a, and the length $L_r$ between the opening 58a and the ground terminal 87 of the extractor 58. In this portion, the extractor has resistivity and serves as a virtual loading resistor $R_i$ (the resistor is shown virtually).

As mentioned above, the extractor 58, which has a shape of a platform (FIG. 1), is moveable relative to the orifice 56 of the nozzle 54. The motion of the extractor 58 is shown by the two-directional arrow A in FIG. 1.

The extractor is intended for extracting the second plasma beam B from the nozzle outlet orifice and for generating the second plasma beam into a focusing plasma beam B3, which is focused onto the workpiece.

The virtual sheath aperture 56*a* with the diameter $d_0$ is responsible for the size of the plasma beam crossover CR commensurable to the minimal deposition spot on the object S. Focusing of the plasma beam B is provided by controlling the distance L between the orifice 56 and the extractor 58. This distance L is adjusted by precise motions of the extractor 58 relative to the orifice 56. Alignment of the extractor opening 58*a* with the orifice 56 in the plane perpendicular to the direction of the focusing plasma beam B is carried out by moving the extractor 58 in the X-Y plane (FIG. 1).

The mechanism described above provides the plasma beam B with a minimal diameter of the crossover (spot) CR as well as the optimal size of the deposition spot. This spot CR can be considered a focal point of the beam B at the focal distance Lf where the object S should be located. The diameter of the crossover CR for the 3D coating should be around 0.1 mm especially when the beam B is used for application of an $Y_2O_3$ coating onto the inner surface of the gas holes of the showerhead with an aspect ratio of the holes equal to 1:20 (FIG. 1).

Description of the Two-Branch Saddle Antenna

An important and unique component of the plasma generator 20 (FIG. 1) is the saddle antenna, a part of which is shown in FIG. 1, wherein it is designated by reference numeral 30 and which functions as a bottom inductor (FIG. 1).

Figure 6:
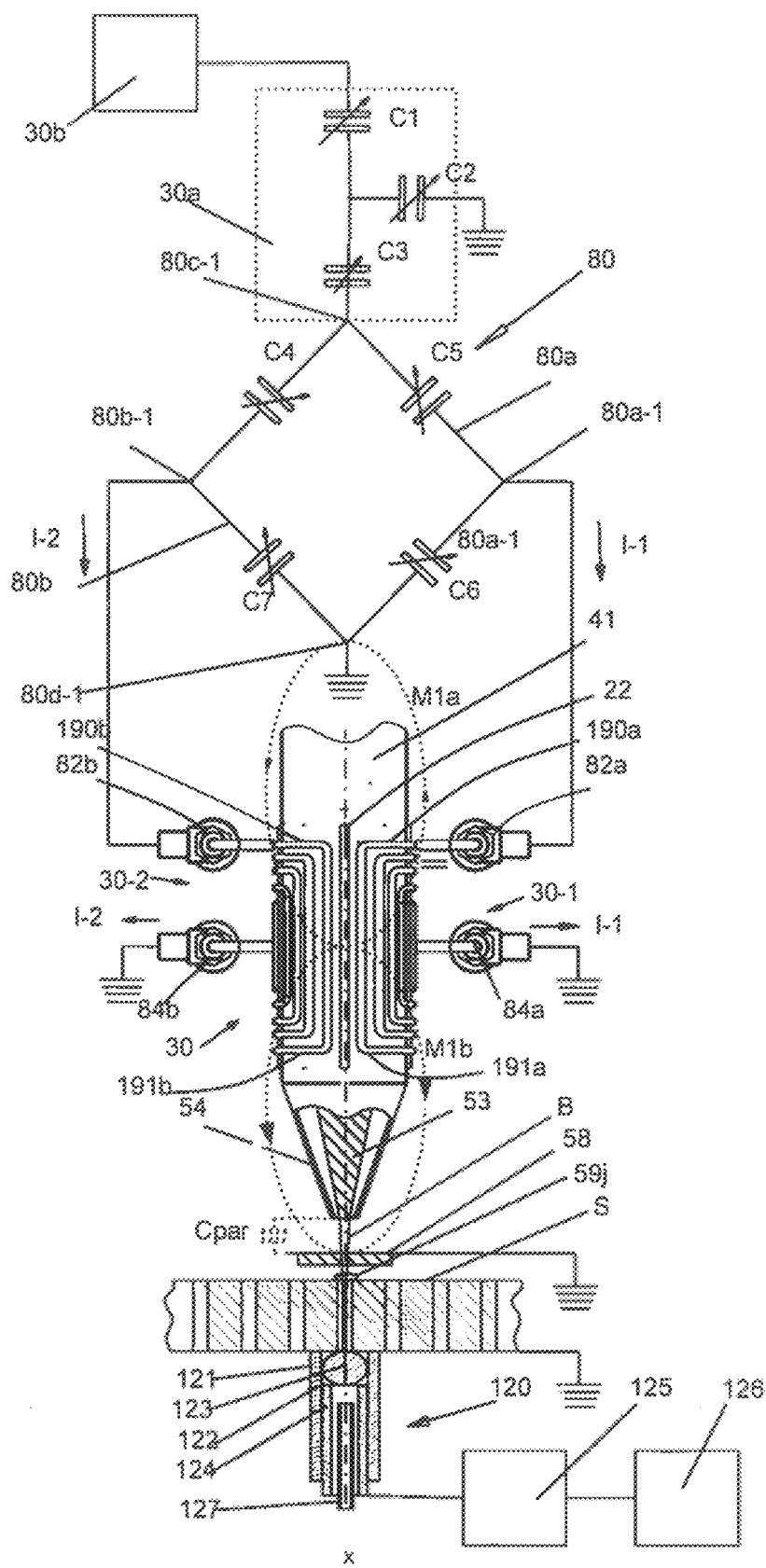
FIG. 6 is an electric diagram of the antenna, which is shown in a transversal cross-section along line 3B-3B of FIG. 7.
Figure 8A:
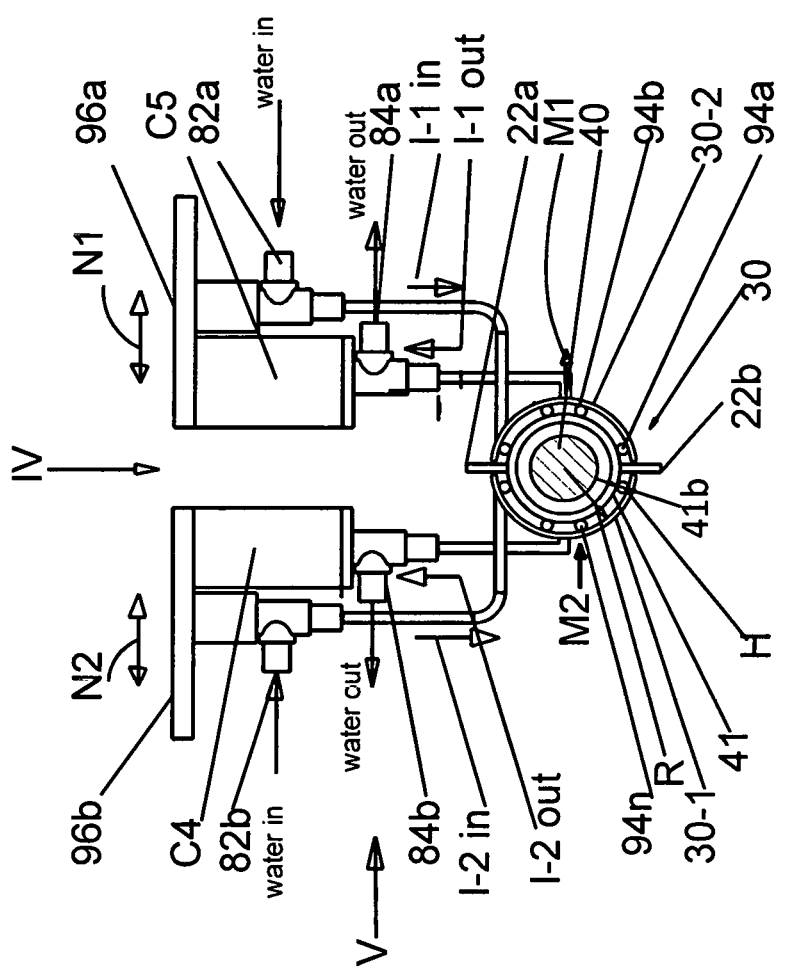
FIG. 8A is a bottom view of the antenna of the atmospheric-pressure ICP beam generator of the invention.

FIG. 6 is an electric diagram of the antenna 30, which is shown in a transversal cross-section along line IIIB-IIIB of FIG. 7, where FIG. 7 is a side view of the antenna in the direction of arrow IV of FIG. 3B. FIG. 8A is a bottom view of the atmospheric-pressure ICP generator of the invention.

Figure 8B:
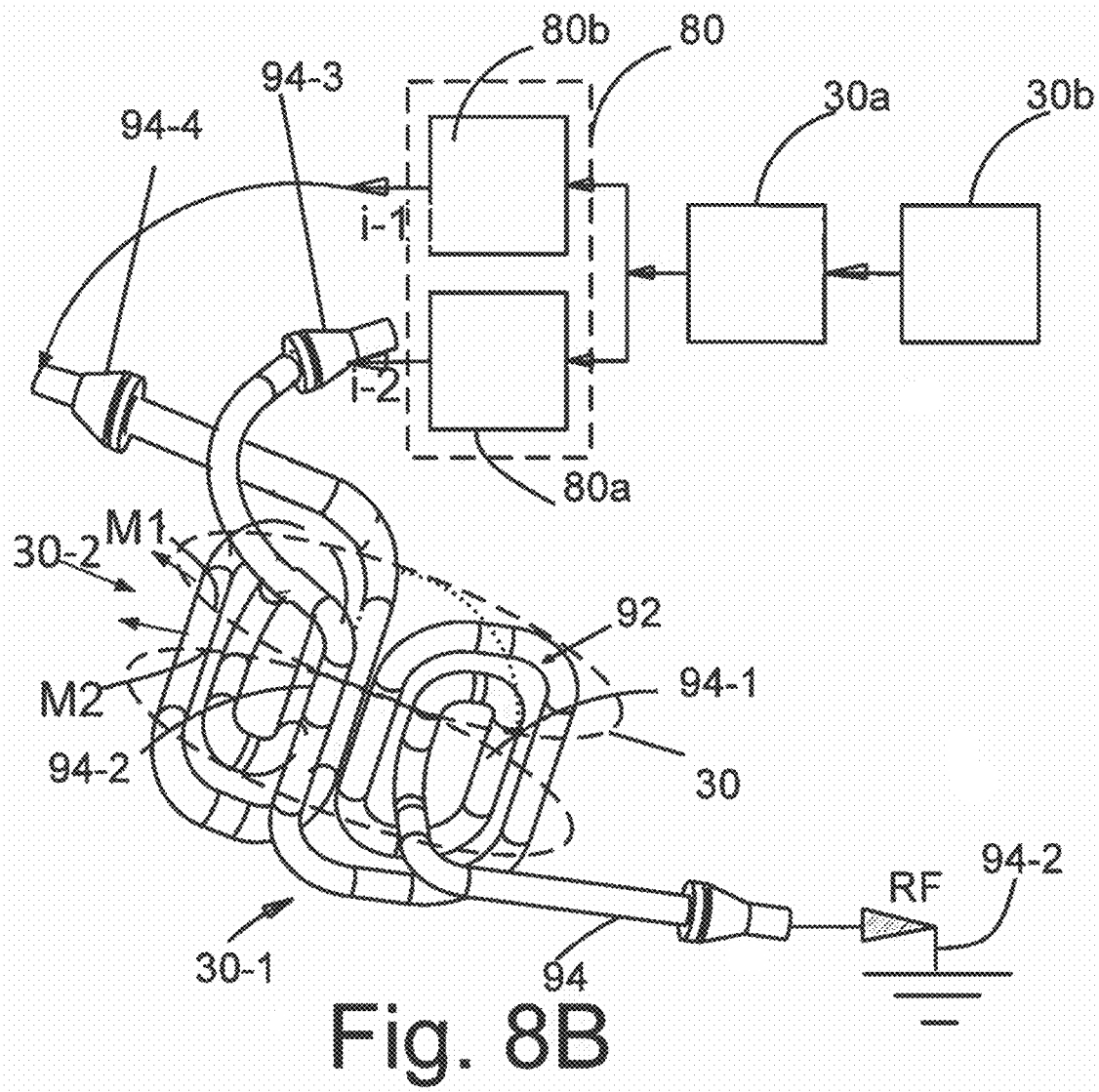
FIG. 8B is a simplified three-dimensional view of branches of the saddle antenna with turns that include an inner turn connected to the ground through the ground terminal, and a high voltage outer turn connected to arms of a bridge circuit.
Figure 9:
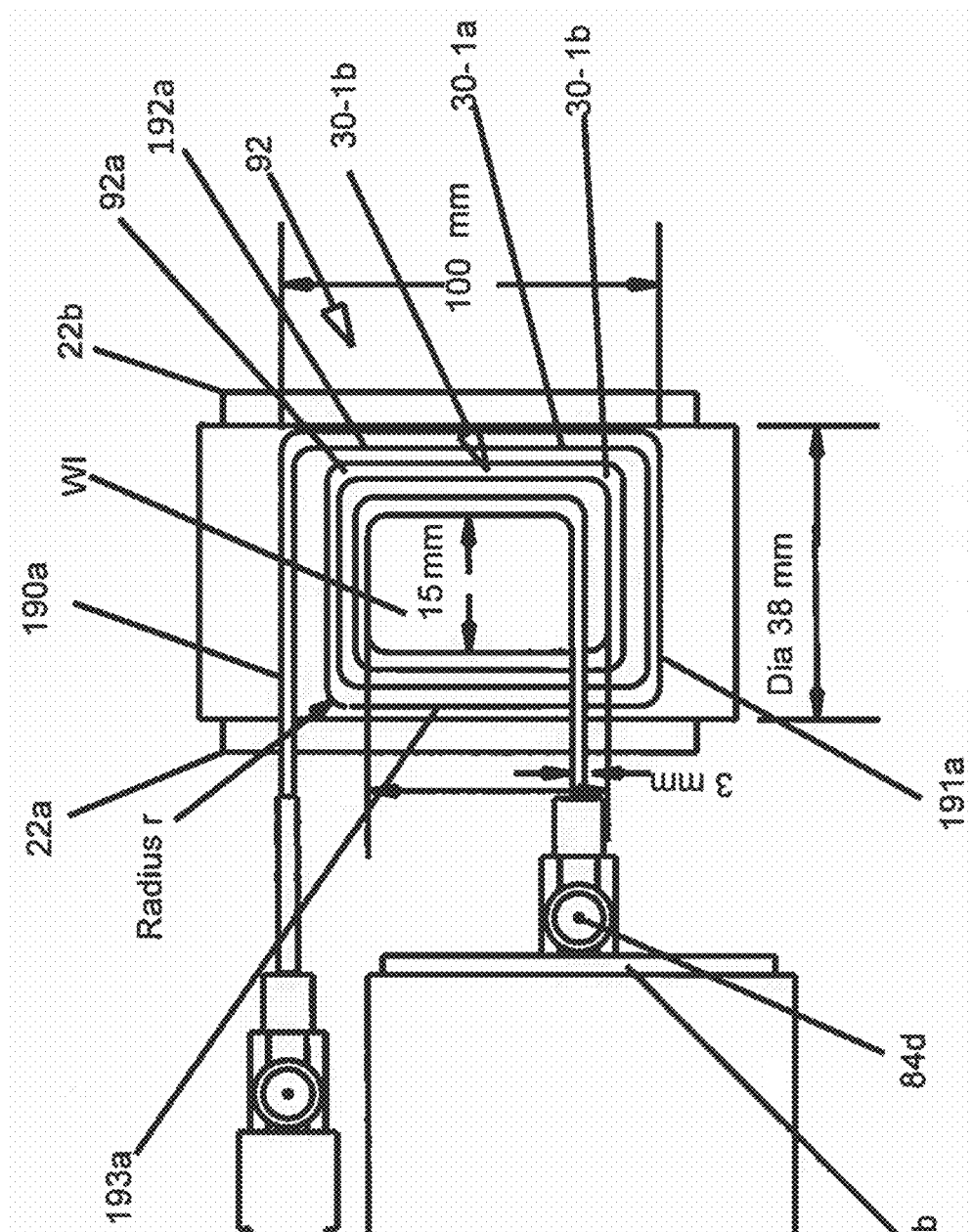
FIG. 9 is a view of the rectangular coil of a single branch of the saddle antenna.

FIG. 8B is a simplified three-dimensional view of branches 30-1 and 30-2 of the saddle antenna 30 with turns that include an inner turn 94-1 connected to the ground through the ground terminal 94-3, and a high voltage outer turn 94-2 connected to arms 80*a* and 80*b* of a bridge circuit 80. FIG. 9 is a view of the rectangular coil of a single branch of the saddle antenna. The bridge circuit 80 is intended for reducing/eliminating a potential drop between the first branch and the second branch and the second discharge.

Figure 10:
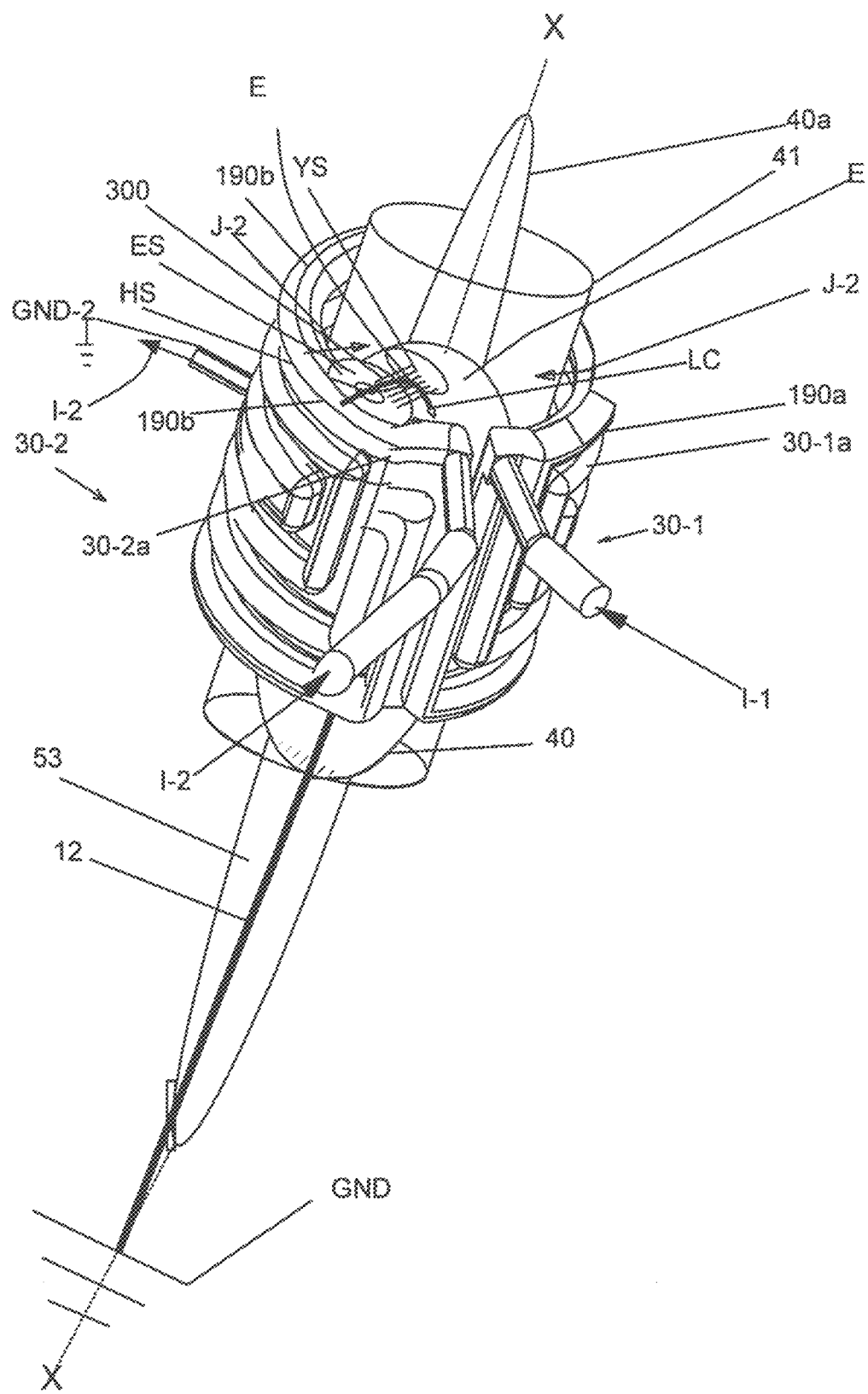
FIG. 10 is a three-dimensional view of the apparatus of the invention illustrating generation of a hot spot HS).

The saddle antenna 30 is designed to generate and sustain the high-temperature plasma torch 53 (see FIG. 10, which is a three-dimensional view of the apparatus of the invention illustrating the generation of hot spot HS). While the coil inductor 28 (FIGS. 1 and 2) is designed to generate the filament-like plasma torch 37 facilitated by the axial component of the RF magnetic field with the property of the magnetic lens for squeezing the plasma discharge 37, the saddle antenna 30, in opposite, generates the transversal RF magnetic field in order to eliminate this axial component of the RF magnetic field and exclude the effect of the magnetic lens. In other words, the RF transversal magnetic field, which is free from the axial component, generates the broad high temperature inductively coupled plasma (ICP) discharge 40*a* (FIG. 1) with a high plasma density distributed quasi uniformly radially from the axis of the beam generator to the inner walls of the bottom plasma-confinement tube 41.

The nanoparticles are captured in the high-temperature area provided by this discharge to be melted and converted into vapor. So, their possibility to miss this area and approach the cold inner wall of the bottom confinement tube for conversion into dust and contamination of the deposition is minimized.

Besides the generation of the plasma discharge 40*a* at atmospheric pressure, the antenna 30 should provide some other functions, which are the following:
1. Igniting a CCP discharge. The mean free path of the charged species injected into the bottom plasma-confinement tube 41 is relatively low. If the top discharge 37 were initiated by a Tesla, which generates seed electrons, there would be not enough energy for the charged species to initiate (FIG. 2) near the gap F to enable the CCP discharge 90.
1. Powering the extractor 58 for focusing the plasma beam B and for extracting the plasma beam B from the orifice 56 (FIG. 1) with a power sufficient for such an extraction.

Thus, the top high-voltage wires 190*a* and 190*b* (FIG. 7) of the outer turns 30-1*a* and 30-1*b* of the antenna branches 30-1 and 30-2, respectively, are designed to provide the RF electric field to launch a capacitively coupling plasma (CCP) discharge 90 (FIG. 1), from which the ICP discharge 40*a* is originated. Furthermore, the bottom high-voltage wires 191*a* and 191*b* of the outer turns 30-1*a* and 30-1*b* of the branches 30-1*a* and 30-2, respectively, are designed to induce the RF magnetic fields Mb1 and Mb2 and generate the inductive current Ii in the surface of coupling with the copper extractor 58 positioned beneath the antenna branches 30-1 and 30-2 (FIG. 5).

The inductive current Ii operating near the edges of the opening 58*a* of the extractor 58 produces a high potential $V_i$ (FIG. 5) on the edges of the opening. As a result, the axial electric field $E_t$ facilitates the extraction of the plasma beam B from the orifice 56 of the plasma gun W and reinforces its focusing properties.

As can be seen from FIG. 7, the saddle antenna 30 consists of the two branches 30-1 and 30-2, which are connected in parallel and encompass the bottom confinement tube 40*b* (FIG. 8A). High voltage terminals 94-3 and 94-4 connect the branches 30-1 and 30-2 with the RF generator 30*b* via the matching network 30*a* and shoulders 80*a* and 80*b* of the bridge circuit 80 (FIG. 6).

A conventional matching network 30*a* produced by Comdel Corporation, (GLOUCESTER, Mass., USA), is suitable for connecting the RF generator 30*b* of the invention to the saddle antenna 30. However, for feeding two branches 30-1 and 30-2 of the antenna 30, the output terminal of the matching unit 30*a* should be split and provided with the bridge 80 having two shoulders 80*a* and 80*b*. The bridge is intended for equalization of both RF currents I-1 and I-2 (FIG. 5) in the branches. Such an equalization is required for achieving a low total plasma impedance that will allow reducing losses, e.g., the reflected RF power, and at the same time to improve efficiency of the antenna. The highest efficiency is achieved when the reflected RF power is close to zero with conversion of the entire applied RF power into the transversal RF magnetic field, which, in turn, will be totally consumed by the plasma discharge 40*a* (FIG. 1) and converted into the high-temperature and high-pressure plasma ball 40. Furthermore, parallel connection of the branches 30-1 and 30-2 (FIG. 7) allows to reduce the total impedance of the antenna and the RF reflected power and align the torch 53 (FIGS. 1 and 3B) with the axis of the bottom plasma-confinement tube 41 as well as with the nozzle 54 and orifice 56. As mentioned above, the bridge circuit 80 has two shoulders 80a, 80b and four terminals 82a, 82b, 84a, and 84b (see FIG. 6, which is an electrical diagram of the saddle antenna 30). The matching unit 30a consists of three variable capacitors C1, C2, C3 and is connected to the RF generator 30b. The opposite terminals 84a and 84b of the bridge 80 are grounded. Both middle terminals of the bridge, i.e., the terminals 80a-1 and 80b-1, are connected to both high voltage terminals 82a and 82b of the branches 30-1 and 30-2, respectively. Equalization of the RF currents I-1 and I-2 in the both branches is provided by four variable capacitors C4, C5, and C6, C7 joined to the high-voltage and the ground terminals of the matching device 30a, respectively. Such an equalization of the currents also provides the following additional effects:

(1) eliminating the hot spots HS (which will be described later) due to mutual neutralization of parasitic capacitive couplings between the plasma ball 40 and the high voltage portions 190a and 190b of the outer turns 30-1a and 30-1b of the two branches 30-1 and 30-2 of the antenna 30, respectively (FIG. 7); and (2) reducing the total saddle antenna impedance and, thus, increasing efficiency of conversion of the RF power into the plasma torch 53.

It can be seen from FIG. 8B that the winding of the saddle antenna 30 is made from an electrically conductive metal, e.g., from a commercial copper tube 94, for example, of 3 mm in diameter. In other words, each saddle antenna branch is formed by a plurality of turns of a hollow winding through which a cooling medium is passed for cooling.

In order to prevent breakdown between the neighboring turns of the aforementioned winding 92 through the surface of the glass outer wall of the bottom plasma-confinement tube 41, the substantially rectangular winding 92 should be bent into an with radius r (FIG. 9) of curvature exceeding a radius of the outer wall of the confinement tube 41 for enveloping the curved glass surface of the confinement tube 41 with a gap H (FIG. 2), which should be in the range of 0.25 mm to 0.3 mm.

In fact, the term "rectangular winding" relates to a development of a semi-cylindrical antenna branch onto a plane and is used for conveniences of illustration of the turns in the drawings. In the rectangular winding shown in FIG. 9, one side of the rectangular shape corresponds to the antenna height and the other side corresponds to the diameter of the semi-cylindrical shape. For providing uniformity of plasma density in the plasma discharge, a ratio between the diameter and the antenna height should be within a range of 0.3 to 0.4.

A problem associated with all devices using coil inductors for generating ICP torches is a parasitic capacitive-coupling interaction between the coil and the plasma torch. Such coupling is caused by high electron density of the torch that can be compared with electron density of a graphite electrode immersed into the plasma beam generator. Such a parasitic coupling affects the performance of the device. In order to avoid such a phenomenon, Tekna. Inc, (Sherbrooke, Quebec, Canada), the world leader in induction plasma technology, reduces the working frequency of their ICP torches in five more times up to 2 MHz that forced to increase the RF power up to 60 kW.

The above problem is solved by the present invention, wherein the saddle antenna 30 is designed especially for reducing the RF power and operating at frequencies of 13.56 MHz and 27.12 MHz.

An important requirement for the antenna 30 of the invention is to keep the gap H (FIG. 1) between the turns 92 enveloping the confinement tube 41 and its outer wall as uniform as possible (FIG. 2). Otherwise, the axial plasma beam will be misaligned with the axis X-X of the total plasma beam system and miss the orifice in the nozzle.

This is another advantage of the antenna 30 consisting of two branches 30-1 and 30-2 and allowing to approach wiring to the outer wall of the confinement tube 41 and control the gap H between the turns of the winding and the outer wall of the confinement tube 41 (FIG. 2).

The gap H between the antenna wires and the glass surface of the confinement tube 41 is an important factor since this gap protects the antenna wire from breakdown through the outer wall of the confinement tube 41. The wiring 92 of the branches 30-1 and 30-2 are not ideally uniform in diameter and not always may leave a reliable clearance between the inner surfaces of the winding and the outer surface of the bottom plasma-confinement tube 41. A narrow cavity formed by the air gap H possesses low electrical resistance, and a corona discharge can appear in this air gap. The corona discharge is provoked by high voltage of the turns 30-1a and 30-2a of the antenna branches 30-1 and 30-2. This problem could not be solved just by reducing the gap H between the wiring and the outer surface of the bottom plasma-confinement tube up to zero, practically without any clearance. However, in spite of the small loss tangent for quartz at a high frequency, the glass (quartz) surface of the confinement tube 41, nevertheless, has some conductivity. Therefore, a direct contact of the confinement tube 41 with the turns 30-1a and 30-2a of the winding 92 may cause a breakdown between the neighboring turns through the glass surface. Therefore, an array of spacers 94a, 94b, . . . 94n made from electrically insulating materials and shown in FIG. 8A is placed between the antenna wires and the surface of the confinement tube 41. Such spacers provide the guaranteed clearance of 0.26 mm that prevents both the corona discharge and breakdown between the turns. The spacers 94a, 94b, . . . 94n are pieces of glass rods which are uniformly circumferentially arranged in the aforementioned gap H between the outer wall of the glass confinement tube 41 and the innermost turn 94-1 (FIG. 8A) of the winding 92. To secure in place, the spacers 94a, 984b, . . . 94n may be welded to the outer wall of the confinement tube 41.

The corners 92a (FIG. 9) (only one is shown) of the of the turns of wiring 92, which is substantially rectangular in a plan view, especially the turns on the high-voltage side, are rounded with a certain radius r, which for the copper tube of a 3 mm diameter should be around 5 mm. The rounding is needed for smoothening an electric field generated in the vicinity of these corners. Otherwise, sharp corners would develop an electric field of high strength, which will create turbulences in the plasma and complicate generation of the plasma torch and compliance with the interface.

The outer high-voltage turns 30-1a and 30-2a (FIG. 2) of the windings 92 (FIG. 4) are connected to the high-voltage terminals 82a and 82b of the matching network 30a, while the innermost turns 94-2c and 94-2d are connected to the terminals 84a and 84b, which are grounded (FIG. 6).

As can be seen from FIG. 8A, the grounded terminals 84a and 84b are maintained on water-cooled grounded copper platforms 96a and 96b, which are moveable in the directions shown by arrows N1 and N2. Movability of the platforms is used to approach the branches to the spacers for a guaranteed clearance or for a quick removal thereof from the plasma beam generator for repair of glassware, if necessary.

For a plasma beam generator 20 having a diameter of 20 mm, an optimal number of turns made from a copper tube having a 3 mm diameter is five.

It has been experimentally found by the applicants that this number is also optimal for a larger plasma beam generator with diameters up to 100 mm operating on frequencies of 13.86 MHz or 27.12 MHz for matching impedances of the antenna and plasma. However, the ratio of the gap h of the saddle antenna 30 to the diameter D of the plasma beam generator should be around 4 to 4.5. Thus, for generation of the plasma torch 3, the saddle antenna 30 should provide the RF electric field with a strength stuffiest for accelerating the seed electrons to provide electrical breakdown of the gas and for generating a CCP discharge achievable by using at least two outer high-voltage turns. On the other hand, the saddle antenna 30 should provide an RF magnetic field with a high density in order to sustain the inductively coupled plasma (ICP) torch 53. For the inductors with the aforementioned parameters, an optimal distance chosen to prevent breakdown between the outer high-voltage turns is 3 mm. An increase of this distance over 3 mm will reduce the density of the RF magnetic field generated by these turns and will demand a compensation, e.g., by increasing the RF power applied to the branches 30-1 and 30-2 for sustaining the high-temperature plasma torch 53. The high RF current in the antenna's turns can overheat the antenna wiring 92 and, hence, the confinement tube 41. In the antenna 30 of the invention, the distance between the neighboring turns is varied. Thus, the high RF magnetic density should be achieved by reducing a distance between the inner turns.

The distance between the inner turns of the antenna should be around 2 mm. If the diameter of the plasma beam generator is increased up to 100 mm, then in order to provide the RF magnetic field of high density, tubular wiring should be replaced with a coolable rectangular copper tubing having, e.g., a (6×3 mm) cross-section. To prevent corrosion, the copper turns can be electroplated with silver.

FIG. 9 illustrates a simplified distribution of three turns of one branch 30-1 of the antenna 30. Since the antenna generates the high temperature plasma ball 40 inside the confinement tube 41 (FIG. 1), the wall of this tube can be overheated exactly at the portion of the tube 41 enveloped by the antenna 30. Therefore, the turns of the branch should be distributed with the density of the winding to provide the high density of the RF magnetic field, but to leave some window W1 for cooling by air. For the plasma beam generator with a diameter of the confinement tube of about 20 mm, the width of the inner turn should be about 8 mm. Such an arrangement of the turns provides compressed cooling air with access to the surface of the bottom plasma-confinement tube 41.

In FIG. 8B, arrows show directions of RF currents I-1 and I-2 generated by the RF power generator 30b (FIG. 1) and applied to the both branches 30-1 and 30-2 of the antenna 30, accordingly.

Each branch 30-1 and 30-2 of the saddle antenna 30 generates its own elementary RF electromagnetic field (instant magnetic lines M1 and M2 of these fields are shown in FIG. 8B). The elementary RF magnetic fields are combined into a common RF magnetic field (not shown), which is directed radially to the axis X-X (FIG. 1) of the plasma beam generator 20 and propagates through the entire volume from the inner part of this volume to the periphery and then to the outside through the wall of the plasma beam generator 20.

Although partition of the transversal (saddle) antenna 30 into two branches 30-1 and 30-2 provides a sufficient drop of a total impedance and reduces the capacitive coupling between the antenna and the plasma torch, the electric fields (not shown) of the branches 30-1 and 30-2 may interfere with each other, especially where the phases of the RF currents are shifted. Mismatching of the currents generated in the neighboring high-voltage outer turns of two branches 30-1 and 30-2 of the saddle antenna 30 may lead to occurrence of opposite phases in the electromagnetic fields generated by the top and bottom RF inductors, and this, in turn, may initiate a high-voltage breakdown between the turns 30-1a and 30-1b of both branches. Therefore, the neighboring turns of both branches are separated by second spacers, i.e., glass ribs 22a and 22b (see FIGS. 4a and 8) secured to the outer wall of the confinement tube 41 of the plasma beam generator 20.

A distance between the turns is increased from 2 mm for the inner turns to 4 mm for the outer turns where voltage is higher and a probability of electrical breakdown is greater (FIG. 7). In other words, the distance between the inner turns is at least 2 mm and the distance between the outer turns is at least 4 mm.

In conclusion, the following differences have to be emphasized between saddle antenna of the present invention designed for use in atmospheric plasma beam generator and the saddle antenna for operation at low pressure (US Patent Application Publication No. 20090284421, Y, Glukhoy, T. Kerzner, and A. Ryaboy; RF Antenna Assembly Having an Antenna with Transversal Magnetic Field for Generation of Inductively Coupled Plasma; Published Nov. 19, 2009). More specifically, in the saddle antenna 30 of the present invention, the top high-voltage wires 190a and 190b (FIG. 7) of the antenna wiring play a predetermined role in the formation of the atmospheric ICP discharge 40a. In particular: 1) the top horizontal portions of high-voltage wires 190a and 190b launch the CCP discharge 90; and 2) the bottom horizontal portions of high-voltage horizontal wires 191a and 191b induce an inductive currents Ii in the extractor 58 (FIG. 11).

The difference between the saddle antenna 30 of the invention that operates under atmospheric pressure and the saddle antenna of US Patent Application Publication No. 20090284421, Y, Glukhoy, et al. that operates at low pressure is that in the latter case a distance between the antenna turns is constant while in the antenna herein described, this distance is variable. This is because in the antenna of the present invention the turns of antenna have different functions. More specifically, the ICP discharge at a low pressure is launched through the CCP discharge but at a low RF power due to a long mean free path of the electrons in the gases at a low pressure. According to the Paschen's law, the breakdown voltage that occurs in the RF magnetic field generated by the RF antenna wiring at a low pressure initiates a CCP discharge that occurs in the center of the plasma beam generator and propagates from the center to the periphery, i.e., in a radially outward direction. However, in case of operation under atmospheric pressure, the mean free path of the electrons is shorter than at a low pressure. Therefore, launching of a CCP discharge in the atmosphere with a very short free passage of electrons demands a higher voltage potential for ionization of the gas molecules. For this reason, under atmospheric condition, the wires 190a and 190b (FIG. 7) of the outer high-voltage turns of the saddle antenna 30 function as triggers of the CCP discharge. Unlike the CCP discharge at low pressures, under atmospheric condition, such a discharge is initiated far from the center, i.e., near the outer turns, and then propagates from periphery to the center.

Therefore, by developing the breakdown for the CCP discharge, such triggering on the side of the outer turns needs to be protected from its own breakdown by providing a safe distance between the outer turns of the antenna that should be wider than the distance between the inner turns. It was experimentally found that this distance should be in the range of 4 to 2 mm.

Moreover, the low free path of electrons at the atmospheric pressure demands positioning of the saddle antenna much closer to the injector of the breakdown gas (sheath gas flow 34a) than the position of the saddle antenna in the case of operation under low-pressure conditions (see aforementioned patent reference of Y. Glukhoy, et al.).

Initiation of the CCP discharge through electrical breakdown in the atmospheric pressure can be developed in an area of high probability of ionization. Such an area is a zone of the highest strength of the electromagnetic field and the area of the highest density and the highest flow rate of the sheath gas 34a, which is fed through the port 34 (FIG. 1). The highest strength and highest density increase a total ionization caused by electron-molecule collision in argon, and the highest flow rate provides propagation of ions in the confinement tube. More specifically, such an area is organized near the top high-voltage wire under the gap F (FIG. 2) from where a flow of the swirling sheath gas 34a with a high flow rate is injected. In this area, breakdown arcs ARC1 and ARC2 (FIG. 2) generate a CCP discharge 90 that under the effect of a swirling action propagates further towards the bottom portion of the bottom confinement tube 41 and at the same time is spread from the periphery to the center. A distance J (FIG. 2) between the sheath gas injecting gap F and the tops 190a and 190b of the high-voltage wires (FIG. 7) is very critical and is experimentally chosen around 1.0 mm. Such a distance allows the sheath gas 34a to swirl and propagate the CCP discharge 90 down to the area with the high RF magnetic field for transition to the ICP discharge 40a. However, CCP discharge 90 can simultaneously propagate back into the gas communication system causing parasitic discharges and losses of the RF power. Therefore, three preventive actions were undertaken:

1) To prevent propagation of the CCP discharge inside the gap F (FIG. 2) and into the gas communication system, the gap F ejecting the swirling sheath gas was reduced down to 0.25 mm;
2) To prevent breakdown between the turns of the top wire of the outer turn and the nearest inner wire, the clearance between two turns was increased up to 3 mm; and
3) Flow rate of the sheath gas was twice the flow rate of the discharge gas; in contrast to the plasma beam generator of the aforementioned patent reference (US Patent Application Publication No. 20090284421, Y, Glukhoy, et al.), in the saddle antenna 30 of the invention, the clearance on the high-voltage potential side between the outer turns was greater than the clearance between the inner turns, i.e., 3 mm between the outer high-voltage turns and 2 mm between the inner turns.

For satisfying the aforementioned three conditions, the clearances between the turns of the saddle antenna 30 varied in the range of 3 mm to 1.6 mm. Such variation of the clearances was needed to prevent breakdown between the outer high-voltage turns and at the same time to provide a required RF magnetic field density defined by distribution of the inner turns, as well as to form the window W1 (FIG. 9) for cooling the confinement tube 41. To launch the CCP discharge in the plasma beam generator with diameter 20 mm, the high-voltage potential on the portions 190a and 190b of the wires of the outer high-voltage turns 30-1a and 30-2a that faces the gap F should exceed 10 kV.

However, the same CCP discharge in a plasma beam generator with the diameter of 100 mm can be launched with a high-voltage potential around 40 kV. Therefore, to prevent a breakdown between the turns, the distance between the high-voltage turns for 100 mm diameter plasma beam generator was chosen in the range of 5-6 mm.

As was mentioned above, because at low pressures free electrons have longer travel path, the process of launching of the ICP discharge occurs much easier, generation of the CCP discharge needs a lower electric field, and ignition of the discharge may take milliseconds. In other words, in the low-pressure plasma of the type mentioned above, the saddle antenna generates an ICP discharge very fast, and all turns participate in such a launching. This is because at a low pressure, the triggering function is fulfilled by the magnetic field that develops breakdown electric fields near the axis of the plasma beam generator. Under the atmospheric pressure, the opposite processes take place. Theoretically, a similar triggering in the large gas volume through the magnetic field is possible under the atmospheric pressure as well. In this case, however, the RF power applied to the antenna should be around 20 kW. Nevertheless, for the antenna 30 operating under atmospheric pressure, such triggering functions are provided by the high-voltage top wires 190a and 190b in the small volume of the gap F and at the RF power applied to the antenna 30 around 0.758 kW. Therefore, in the saddle antenna of the invention, the top wires serve as a trigger of the CCP discharge 90, and participation of the local gas pressure is needed to start such a discharge. Moreover, some operation conditions need to be observed for the flow rates of the discharge gas 80a and sheath 34a gases. These conditions are changed during transition of the CCP discharge 90 to the ICP discharge 40a and during transition of the ICP discharge 40a that occur in the plasma ball 40.

The height of the saddle antenna should be 3.5-4 times greater than its diameter to provide a two-dimensional distribution of the RF magnetic field and uniformity of density of this field in the axial direction. Otherwise, the edge effects from corners at the top to the bottom can approach to the center and create a turbulence, thus complicating generation of the plasma ball 40. Positioning of the saddle antenna 30 relative to the bottom plasma-confinement tube 41 is shown in FIG. 2. It depends on the gap F between the outer wall of the intermediate portion 39 and the inner wall, i.e., on the gap into which the swirling sheath gas 34a is injected. Distance J between the edge of the intermediate portion 39 and the top portions 190a and 190b of the wires 30-1a and 30-2a (FIG. 2) should be in the range of 1 to 1.5 mm. Increasing of this distance will increase the breakdown voltage on the top wires 30-1a and 30-2a and increase the time of transition from CCP discharge to the ICP one.

The CCP discharge 90 is destructive and its transition into the ICP discharge should proceed quickly. After transition, the high voltage potential on the turn needed to initiate the CCP discharge will be dropped because of decrease of the plasma impedance that occurs after the ICP discharge is sustained.

Deviation from the critical distance J (1 to 1.5 mm) will deteriorate the plasma generation process, for which the gas flow rate and high-voltage were chosen to provide optimal conditions for generation of the CCP discharge 90 and propagation thereof in the inner volume of the bottom plasma-confinement tube 41. A decrease in the aforementioned distance will initiate a parasitic discharge inside the gap F, while an increase thereof will delay transition of the CCP into ICP, will bring the high voltage to the critical value, and eventually will lead to destruction of the plasma beam generator.

Operation of the Plasma Beam Generator

As follows from the above, the inventors herein invented a 3D printer that consists of the following three main units:
1. A separator that breaks nanoparticle clusters into individual nanoparticle of the original size and pre-melts them for preparing to subsequent processes. The separator includes the top-stage plasma beam generator 38a with the coil inductor 28 and the bouncing tube 32;
2. A plasma vaporizer that provides phase transition of nanoparticles from a solid state to a vapor and arranges them in the vapor flow. This unit includes the bottom-stage plasma beam generator 38d, nozzle 54 and the saddle antenna 30;
3. The plasma beam generator that focuses the vapor flow and generates a vapor beam. This unit includes the plasma gun W with the extractor 58 and the tuning system with the movable workpiece WH;
4. A motion system that includes the workpiece holder WH with the object S; and
5. An auxiliary device (which will be described later) for use as a booster system in case of treatment of ultra-narrow gas holes of the showerhead. The system is arranged on the backside of the showerhead and is needed for enhancing the passage of the plasma beam B trough the ultra-narrow gas holes of the showerhead and acts as an auxiliary plasma bias generator for extraction of the plasma beam by the capacitive coupling of the beam B with this biasing discharge.

Let us assume that the plasma beam generator 20 of the 3D printer of the invention (FIG. 1) is in a state at which both the top and the bottom electromagnetic field inductors, i.e., the coil inductor 28 and the saddle antenna 30, are energized by an RF power applied from both RF generators through the respective impedance matching devices 28a and 30a; nanoparticles NP of YSZ, or $Y_2O_3$ carried by the carrier gas (argon) are injected into the carrier gas and nanoparticle supply port 44; the sheath gas (Ar) 34a is fed through the sheath gas supply insert 34; and the top discharge gas 43a (Ar) is injected through the opening 43b to the top plasma-confinement portion (top-stage plasma beam generator) 38a separated by the nozzle 42 from the bouncing tube 32.

As mentioned earlier, the top plasma torch T1 is intended for use as an auxiliary or duty torch, the first function of which is to continuously supply the bottom ICP discharge 40a with the charged seed species Q, especially during launching of the ICP discharge 40a, and to immediately restore the discharge after any short pausing in the production process. Besides this main function, the top plasma torch participates in the following three processes associated with delivery of nanoparticles:
1) maintaining the axial pressure gradient in the bouncing portion 38b of the bouncing tube 32;
2) bombarding the clusters CL with charged species Q for charging and de-aggregating the clusters CL; and
3) Pre-heating of the nanoparticles NP in order to provide the effect of melting point depression (MPD).

Description of the Process

The top inductively coupled plasma (ICP) discharge 37 (FIG. 2) is originated from the capacitive coupling plasma (CCP) discharge (not shown) in the top confinement tube 25 portion (top-stage plasma beam generator) 38a. This capacitive coupling plasma (CCP) discharge is generated by igniter 46 in the flow 43a of the top discharge gas Ar fed into the top confinement tube 25 of the portion 24a through the top opening 43b (FIGS. 1 and 2) from the gas reservoir (not shown) through a mass flow controller 36 (FIG. 1).

At an RF power around of 350 W applied to the top coil inductor 28, the CCP discharge in the top or confinement portion 24a is turned into an inductively coupled plasma (ICP) discharge 37, which under the effect of the axial component of the RF magnetic field generated by the coil inductor 28, functioning as a magnetic lens, in turn, is converted into a needle-like plasma torch T1 (FIG. 2), which propagates along the confinement tube 25 in the direction of the axis X-X.

However, an outlet orifice 42a (FIG. 2) of the separation nozzle 42, through which the plasma torch T1 tries to pass, cleaves the high temperature component of the top plasma torch T1 using the aerodynamic expansion and converts it into the aforementioned lower temperature top plasma flow B1 of the charged species Q propagated along the bouncing tube 32 (FIG. 3C). Because of a divergence of the plasma beam B1, at a distance from the outlet orifice 42a of the nozzle 42 the pressure of this beam B1 is dissipated, and its heat is dissipated along the bouncing tube 32. Moving further forward in the bouncing portion 38b of the bouncing tube 32, this plasma beam B1 encounters interaction (collision, charging, heating) with the nanoparticles NP and clusters CL of yttria stabilized zirconia (YSZ) or yttrium oxide ($Y_2O_3$) carried by the lateral flow 44a (FIG. 2) of the carrier gas (argon), injected through the port 44. However, such an injection of nanoparticles NP is not admitted until the bottom plasma torch 53 is not initiated, and no UV irradiation is detected by the UV sensor (as described below).

An anticipated melting of the shells of nanoparticles NP for the MPD is controlled by the RF power applied to the top coil inductor 28. The RF power applied to the top inductor 28 is optimized for controlling a temperature of the top torch T1 to maintain balance between the melting point of the shell and the melting point of entire nanoparticle NP to prevent overheating of the nanoparticles NP and premature deposition of the molten material on the inner wall of the bouncing tube 32. Finally, pre-melting of the nanoparticles NP is provided at a temperature of up to 600° C., at which the Melting Point Depression (MPD) conditions are maintained. The MPD phenomenon is shown in FIG. 12, which is a model view illustrating a conversion of a nanoparticle from a solid state to vaporization. First, a solid particle is pre-melted with the formation of a thin pre-melted shell. Nanoparticles with molten shells have lower enthalpy. After injection of such nanoparticles with molten shells into the high temperature bottom plasma ball 40 (FIG. 2), the molten shells acquire an additional thermal energy, which propagates inside the nanoparticle NP from the shell toward the nanoparticle core. Reinforced by the additional thermal energy, the shell consumes the core, thus converting the nanoparticle into a vaporized droplet. This leads to the total vaporization of the nanoparticle. Due to the MPD, it becomes possible to reduce the vaporization temperature of the pre-melted nanoparticles NP to the level 2.5 times lower than it may be needed for cold particles. Thus, such a pre-heating facilitates total conversion of the flow of nanoparticles NP, which being injected into the bottom plasma ball 40, into the vapor droplet flow VP (FIG. 1). The preheating also makes it possible to increase a feeding rate of the nanoparticles and, hence, the rate of the deposition at the same RF power applied to the saddle antenna 30.

The YSZ nanoparticles are used as a building material for elevation of the hair-like pins of the electrostatic chucks during the buildup operation performed by 3D printing. On the other hand, the yttrium oxide ($Y_2O_3$) nanoparticles are more suitable for building a plasma-chemical corrosion protection barrier on the inner surfaces of the showerhead gas holes with a high aspect ratio. In both applications, the quality of selection of nanoparticles NP by the bouncing tube and their admission to the bottom discharge is controlled by irradiation sensors (e.g., spectrophotometers of Ocean Optics) that measures spectra of vapors of $Y_2O_3$, or YSZ in the bottom torch 63. Simultaneously with treatment of the nanoparticles NP, the spices Q generated by the top torch 37 also pass through the bouncing tube 32 and then through the orifice 48a into the bottom plasma-confinement tube 41 as charged seed species, which initiate the CCP discharge 90 in this confinement tube 41.

Before considering the bouncing process that occurs in the bouncing tube 32, let us first consider the plasma-generation processes that occur in the interior of the bottom plasma-confinement tube 41.

As has been mentioned above, the end of the bouncing tube 32 protrudes into the cavity of the intermediate portion 39. A guarding ring 49a (FIG. 1 and FIG. 2) is welded to the protruding end of the bouncing tube 32. An outer diameter of the ring 49a is designed to be lesser than the inner diameter of the intermediate portion 39. As a result, an annular gap G having a thickness of about 0.25 mm is formed between the edge of the ring 49a and the inner wall of the intermediate portion 39. This gap G provides passage of the discharge gas 50a (e.g., Ar+Ha), which is injected into the interior compartment 33a of the intermediate portion 39 through discharge gas inlet ports 50 (only one of which is shown in the drawings), to the area of the intermediate portion 39, which is open to the bottom plasma-confinement tube 41. Controlling the flow of the vaporized nanoparticles NP from cooling the gap G restricts the flow of the discharge gas 50a from the space 33a to the interior of the intermediate portion 39 on the side of the bottom plasma-confinement tube 41. The size of the gap G is chosen to provide the initial swirling motion of the gas flow 80a into the compartment 33a and maintain the swirling motion in the bottom plasma-confinement tube 41. Proper selection of the gap G is important to prevent back penetration of stray electrons of a high energy, which are present in the plasma discharge 40a, into the compartment 33a. Stray electrons (not shown) may provoke parasitic discharges (not shown) in the gas communication system.

On the other hand, as mentioned above, swirling of the discharge gas 50a helps to spread the seed-charged species Q, which entered the intermediate portion 39 and further the confinement tube 41 by being entrapped with the swirling discharge gas 80a.

Thus, charged spices Q approach the area of the gap F to cause the breakdown in the sheath gas 34a. The breakdown, in turn, initiates generation of the arc ARC in the vicinity of the high voltage portions 190a and 190b of the antenna 30. The arc ARC initiates in this area the CCP discharge 90. However, such breakdown should be provided during a very short time to prevent its conversion into a dramatic breakdown at the high voltage portions 190a and 190b of the antenna 30 since this may damage the confinement tube 41. Such an event may happen if the gap F exceeds 0.25 mm. Another function of the swirling of the discharge gas 50a, as well as of the guarding ring 49a, is to divert the cold discharge gas flow 50a away in the outward radial direction from the central area of the confinement tube 41 to preserve the MPD effect of melting and evaporation of the shell-molten particles.

Instead, the cold discharge gas 50a that entered the bottom plasma-confinement tube 41 propagates through the interior of the intermediate portion from the area near the axis X-X toward the periphery of the confinement tube 41 for preheating prior to return to the radial inward area for sustaining the bottom discharge 40a (FIG. 2).

It should be recalled that the following components are delivered into the interior of the bottom plasma-confinement tube 41 for launching the bottom discharge 40a (FIG. 1): the sheath gas 34a, e.g., Ar, supplied through the sheath gas supply insert 34; the discharge gas $Ar+H_2$ fed through the port 50; and the seed-charged species fed through the bouncing tube 32. Only after launching of the ICP discharge and the subsequent generation of the bottom discharge 40a with the subsequent transition thereof into the plasma ball 40, the precursor nanoparticles, e.g., of YSZ or $Y_2O_3$ with the carrier gas, e.g., argon, are permitted to be injected through the lateral port 44 and the bouncing tube 32 into the bottom plasma-confinement tube 41.

The branched saddle antenna 30 is energized by the RF power delivered from the RF power generator 28a through the matching network 28b formed by the three variable vacuum capacitors C1, C2, and C3 (FIG. 6). In order to equalize the RF currents in both branches 30-1 and 30-2, the applicants use the bridge 80 of the capacitors connected to the high-voltage and ground terminals of the matching network 28b, respectively. Both middle points of the bridge 28c are connected to both high-voltage turns 30-1a and 30-2a, especially to the top wires 190a and 190b of the windings 92, respectively. Such a connection reduces the total impedance of the antenna 30. This allows to reduce the losses, especially of the RF reflected power, and to consume all of the RF power generated by the RF power generator 28, thus increasing the total RF current in both branches of the antenna and coordinating the RF magnetic fields. As a result, almost the entire RF power can be transferred to the plasma ball 40, thus increasing plasma density and enlarging the high-temperature area. Another advantage of such an antenna design is to bring both branches of the antenna into proximity with the outer wall of the lower plasma-confinement tube 41 and, hence, to improve inductive coupling and efficiency of the inductive heating of the plasma discharge.

Due to the parallel connection of the branches 30-1 and 30-2 and equalization of currents in each branch by the bridge, the high RF magnetic field responsible for the generation of the torch can be achieved with a lesser number of the turns in each branch. The number of the turns for each branch depends on the diameter of the plasma beam generator. Five turns for each branch were found to be optimal for the antenna, which circumferentially envelops the plasma-confinement tube 41 having a diameter of about 20 mm. Experiments showed that six turns might be suitable for the diameters of the lower confinement tube 41 in the range of 32 mm to 100 mm.

As was mentioned above, contrary to the known saddle antenna (designed for generation of a low pressure ICP discharge with soft two-phase transition of the CCP discharge to the ICP one where all turns participate in all plasma-generation processes equally: see aforementioned reference to US Patent Application Publication No. 20090284421, Y, Glukhoy, et al.), the saddle antenna 30 of the invention provides multi-phase transitions in processes from the ICP discharge to the formation of the plasma beam, and the antenna turns are specially designed to provide such transitions. For example, the high-voltage turns 30-1a and 30-2a, especially the top wires 190a and 190b (FIG. 7) of these outer turns connected to the high-voltage terminals such as terminal 82a and 82b (FIG. 6), generate a high electric field E (around of 20 kV/mm) (FIGS. 3B and 4). Such a field developed by the high-voltage wires 190a and 190b of the outer turns 30-1a and 30-2a, respectively, causes a breakdown and subsequent generation of CCP discharge 90 (FIG. 2). Thus, contrary to generation of plasma under conditions of low pressure (the case of the aforementioned reference) where the saddle antenna provides the breakdown near the axis X-X of the low-pressure plasma beam generator, in the 3D printing apparatus of the invention, the discharge occurs near the periphery of the bottom plasma-confinement tube 41. In fact, a delay in the development of the breakdown arc and a subsequent CCP discharge 90 near the periphery of the bottom plasma-confinement tube 41 are undesirable as this may lead to destruction of the confinement tube 41. On the other hand, the high RF voltage at the wires 190a and 190b that trigger the breakdown may cause parasitic breakdown between the outer high voltage turns 30-1a and 30-2a and the neighboring ones on the other side (not shown), respectively. Therefore, the distance between the wires of the saddle antenna 30, which are oriented perpendicular to the longitudinal axis X-X of the plasma beam generator 20, should be increased to prevent the damage of the confinement tube. This is shown in FIG. 7, where the wires 190a and 191a are oriented perpendicular to the axis X-X. It can be seen that the gap g1 provided between the wires of the outer turns 30-1a and 30-1b, is wider than the gap g2 provided between the wires of the turns 30-1b and 30-1c, which extend in a direction parallel to the axis X-X. Therefore, the wires 190a and 191a (FIG. 7) are distributed with a clearance of about 3 mm unlike the 2 mm clearance between the wires which are parallel to the axis X-X. Herein, the term "wires" is used conventionally, since in a real structure, these wires are copper tubes, and a cooling fluid flows through these tubes.

Winding of the inner turns 85a, 85b (FIG. 9) connected to the ground terminals is formed with wide inner windows W1 for access of the cooling air to the confinement tube 41 overheated by the plasma. The bottom wires 191a and 191b of the high-voltage turns provide the inductive coupling of the bottom part of the antenna 30 with the copper extractor 58 thus inducing in the extractor the inductive current Ii that causes the drop of the potential Vi at the edge of the opening 58a and hence increases the focusing force of the plasma gun W (FIG. 11).

The high-voltage outer turns 30-1a and 30-2a, the top wires 191a and 191b of which provide breakdown inside the confinement tube 41, should be protected from possible arcing during breakdown, generation of CCP discharge, or mismatching of the saddle antenna. The arcing between wires can occur through air, if the aforementioned clearance H (FIG. 2) is too small or through the glass surface of the confinement tube if the wires are too close to this surface. As has been mentioned above, the arcing can be prevented by increasing the distance between turns and the clearance between the wires and the outer wall of the confinement tube 41. Another problem is prevention of arcing and breakdown between the neighboring high-voltage turns of the antenna branches during the plasma launching process. For this purpose, the bottom plasma-confinement tube 41 is provided with the glass spacers 94a, 94b, . . . 94n and glass ribs 22a and 22b (see FIG. 8A), which are secured, e.g., welded, to the outer wall of the confinement tube 41 of the plasma beam generator 20.

Generation of AP ICP Discharge

A transversal method for generation of plasma in a plasma beam generator having axial symmetry and a saddle antenna that circumferentially envelopes the cylindrical body of the plasma beam generator and generates an RF field under conditions of low pressure was invented by the applicants of the present application (see US Patent Application Publication No. 20090284421). However, a method disclosed in the present disclosure was designed for generating an ICP discharge in the atmosphere for creating a plasma beam B (FIG. 1) focused on an object being treated. The transversal or saddle antenna 30 generates an electromagnetic field in a gaseous medium, and the AP-ICP discharge 40a occurs under conditions of optimized RF power applied to the antenna, gas pressure, geometry of plasma beam generator, and other factors taken into account for such an optimization.

Figure 13:
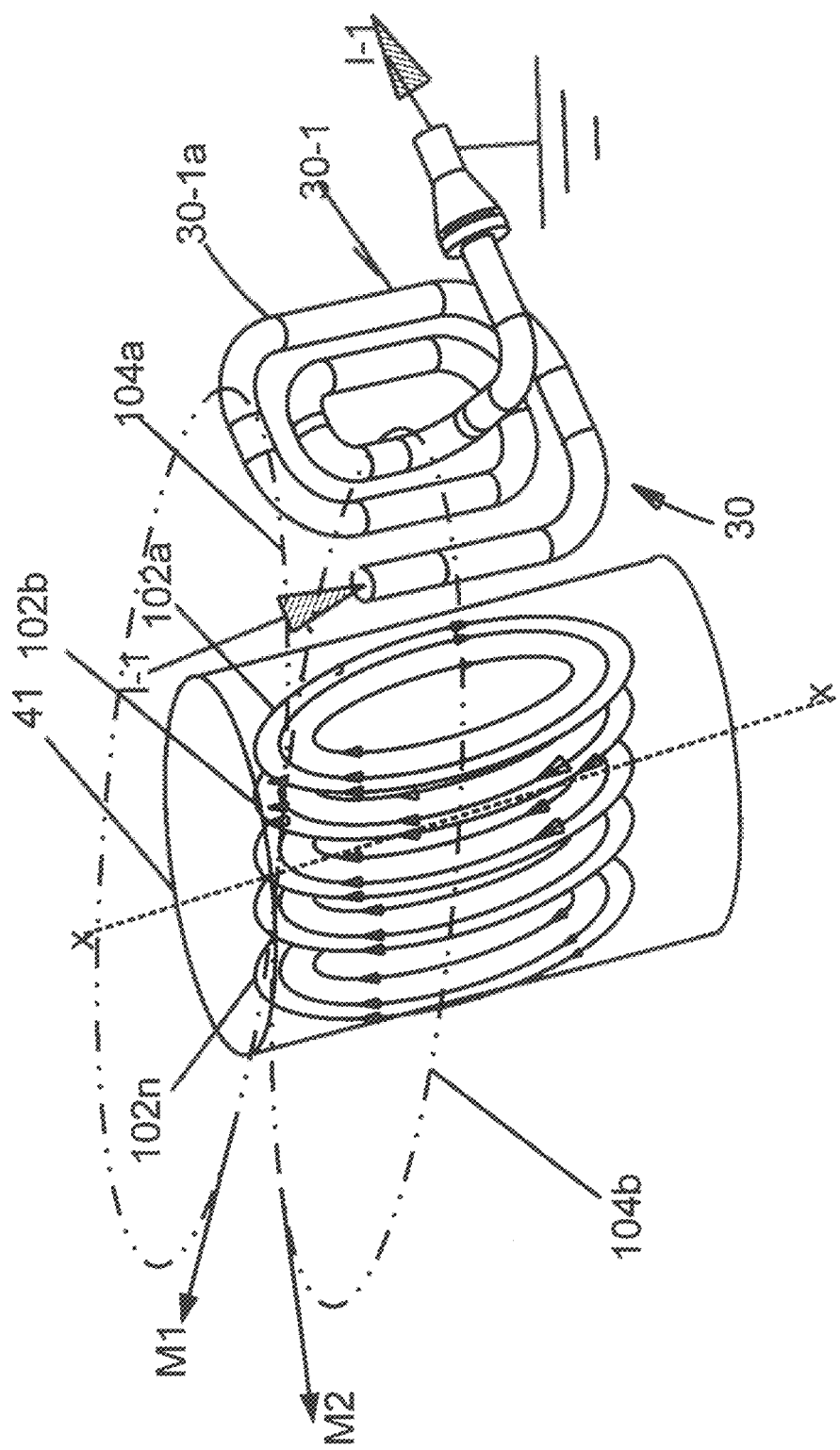
FIG. 13 is a three-dimensional view of electrical and magnetic fields developed in the bottom plasma-confinement tube by the current of an antenna branch.

A three-dimensional illustration of electrical and magnetic fields generated in the bottom plasma-confinement tube 41 by the current I-1 of the branch 30-1 of the saddle antenna 30 is depicted in FIG. 13.

For better clarification of this drawing, the branch 30-2 is not shown, but combined processes generated by both branches of the antenna 30 in the confinement tube 41 are shown and explained. Reference numerals 104a and 104b designate magnetic field lines of the magnetic fields M1 and M2 generated by the branches 30-1 and 30-2 (not shown), respectively. Reference numerals 102a, 102b, . . . 102n designate electric field lines in the bottom plasma-conferment tube 41 of the RF electric field generated by the magnetic fields M1 and M2, which are oriented parallel to the axis X-X of the plasma beam generator 20. Although the CCP discharge is not shown in this drawing, the electric field shown by lines 102a, 102b, . . . 102n is ready to accelerate the seed electrons if they would be injected in this area, up to some critical energy, needed for electric breakdowns in the argon of the confinement tube 41. These breakdowns are generated by the magnetic fields M1 and M2, which, in turn, are generated by the RF current I-1 of the branch 30-1 and current I-2 of the branch 30-2 (not shown). Processes of generation of the CCP discharges and transformation of the CCP discharges (not shown) into the ICP discharges 107a, 107b, . . . 107n after accumulation of the RF magnetic power generated by the saddle antenna 30, are shown in FIG. 8C.

The phenomenon that occurs during excitation of the plasma discharge by the saddle antenna 30 in atmosphere is quite different from generation of plasma by the coil inductor 28 (FIG. 1, FIG. 2). In the coil inductor 28, all the turns of the antenna windings participate in the generation of the total magnetic field equally. Therefore, the plasma discharge is originated near the axis X-X of the confinement tube. The axial magnetic field having property of the magnetic lens transforms these discharges into a plasma needle that is suitable for generation of the charged species and a divergent plasma beam with an axial gradient of pressure needed for the bouncing tube. Contrary to this, in the case of the saddle antenna 30 of the present invention, the wires 190a and 191a (FIG. 7) of the antenna turns arranged perpendicular to the axis X-X and located closer to wall of the confinement tube 41 participate in the generation of the periphery plasma discharges 105a, 105b, . . . 105n. These periphery plasma discharges 105a, 105b, . . . 105n propagate in the radial direction to the center of the confinement tube 41 providing the uniform plasma bulk inside this confinement tube 41 (FIG. 8C). (Since in the process of plasma conversion the local CCP discharges 105a, 105, . . . 105n are turned into local ICP charges 107a, 107b, . . . 107n and since in the positions of FIG. 8C the CCP and ICP discharge coincide, the ICP designations are shown in parentheses after the designation of the CCP charges).

While the purpose of the AP-ICP discharge is to develop a plasma beam, the purpose of the plasma gun W is to finalize such a development by focusing the beam on the object. In order to obtain the final focused plasma beam B (FIG. 1), several transition phases should be performed in the bottom plasma-confinement tube 41. On the way to the focused beam, the CCP discharge is a predecessor of these transitions, and, in order to generate the CCP discharge needed for the process, the gas pressure and strength of the electrical field should be concentrated in one place. The seed-charged species needed for the electric breakdown in the sheath gas 34a (FIG. 2) should also be delivered to the vicinity of the gap F. This place is an area near the high-voltage wires 190a and 190b of the outer turns 30-1a and 30-2a of the saddle antenna 30. The sheath gas 34a, which flows in a swirling mode, is injected into this area through the gap F positioned at a distance around of 1-1.5 mm from the wires 190a and 190b of the antenna 30, and the charged-seed species Q are delivered into the confinement tube 41 from the preliminarily launched torch 37. If such critical parameters as application of a proper RF power to the branches of the antenna 30, flow rate of the sheath gas 34a, etc., are not properly observed, such processes as development of high voltage, breakdown, and subsequent transition from CCP plasma discharge to ICP may be delayed to the extent that may lead to overheating and destruction of the confinement tube 41.

According to the results obtained by extrapolation of the Paschen curve data reported for the high-frequency breakdown of Ar (Brown S C 1993 Basic Data of Plasma Physics (New York: AIP Press) 336 p.), theoretically the breakdown electric field should have a value of $2 \times 10^5$ V/m. Due to swirling of the sheath gas, the CCP discharge also acquires the swirling state and propagates uniformly in the radial direction within the volume of the confinement tube 41 to the area of the vertical winding wires 192a and 193a (FIG. 9). Being distributed with high density, these wires generate RF magnetic fields of high density, which are directed from the periphery to the axis X-X of the confinement tube 41.

The RF magnetic fields irradiated by the antenna 30 near the periphery of the confinement tube 41 are directed radially inward and normally to the axis X-X of the plasma generator 20. As a result, the total transversal RF magnetic field penetrates each gas layer in the cross section of the plasma generator 20 and induces in each such layer an electrical field that accelerates the charged particles.

While observing the atmospheric ICP and phases of its transition into a high temperature plasma torch, the inventors herein proposed their own model of the process. According to this model, it is assumed that the inner volume of the confinement tube 41 is conventionally divided into a plurality of virtual slices that represent paraxial sections. Each slice represents a layer of the gas populated with electrons of the CCP discharge (FIG. 8C, which is a three-dimensional view illustrating formation of the bottom inductively coupled plasma (ICP) discharge in the bottom plasma-confinement tube of the plasma generator of FIG. 1.

FIG. 8C illustrates the processes in the confinement tube 41 provided by the antenna 30. Although the antenna 30 that embraces the confinement tube 41 is depicted here as a separate branch (only the branch 30-1 with the currents [−]

is shown), it is understood that the antenna has two symmetric branches and that two parallel currents (IC) are developed.

Magnetic fields M1 and M2 generated by currents I-1 and I-2 pierce the confinement tube 41 in the direction perpendicular to axis X-X so the inner gas volume in the interior of the bottom confinement tube 41 is conventionally chopped into the slices (FIG. 8C). In FIG. 8C, these slices are shown by the electric fields generated by these magnetic fields and shown by the lines 102a, 102b, . . . 102n. Generated by the RF magnetic fields M1 and M2, these electric fields are designed to rotate and accelerate the charged species Q in each layer of the gas volume (FIG. 8C).

In Phase 1 of the transition, charged species Q generated by the top plasma beam 37 (FIG. 1) propagate through the bouncing tube 32 and the intermediate portion 39 and, hence, are injected into bottom plasma-confinement tube 41, which is filled with the discharge gas 50a. Swirling discharge gas 34a carries the charged species Q away from the central axis to periphery along the trajectories Q1. If the RF electrical field 104a on the wire 190a and the electrical field 104b (not shown) on the wire 190b (not shown) exceed the critical values to energize these species for breakdown, the charged species Q initiate the breakdown arcs ARC1 and ARC2 near the high-voltage top wires 190a and 190b positioned at the distance about 1.0 mm from the gap F between the intermediate portion 39 and the confinement tube. Another parameter important for launching the plasma discharge is a flow rate of the swirling sheath gas 34a that passes through the gap F into this area. For example, the breakdown ARC1 initiated by the RF electrical field J-1 generated by the RF current I-1 and irradiated by the high voltage potential (not shown) on the wire 190a of the high voltage turn 30-1a of the branch 30-1 and the opposite breakdown ARC 2 initiated by the RF electrical field J-2 (not shown) generated by the RF current I-2 (not shown) and irradiated by the high voltage potential (not shown) on the wire 190b (not shown) of the high voltage turn 30-2a of the branch 30-2 (not shown) may appear at the RF power applied to the both branches of the antenna 30 around 1.3-1.6 kW for the bottom confinement tube with diameter 38 mm. Another condition for breakdown is a predetermined flow rate of the sheath gas, which should be around 6 to 7 SLM. ARC1 and ARC2 are shown in FIG. 2.

In Phase 2, the capacitively coupled plasma (CCP) discharge 90 is formed after breakdown (see FIG. 1). Breakdown arcs depicted as ARC1 and ARC2 (FIG. 2) generate electrons that initiate the CCP discharge 90 near the top high-voltage wires 190a and 190b (FIG. 7) of the high-voltage outer turns of the saddle antenna 30. In turn, the discharge 90 serves as a source of high energy electrons. Trajectories of these electrons originated from the discharge 90 are not shown. Being carried by the swirling sheath gas 34a, the high-energy electrons propagate along the inner wall of the confinement tube 41 down to the area of dense magnetic fields M1 and M2 generated by the dense winding of the wires in the central part of the antenna 30. Due to strong electric fields 102a, 102b . . . 102n (FIG. 13) generated by the magnetic fields M1 and M, which accelerate the electrons, the elementary CCP discharges 105a, 105b, 105c, . . . 106n (FIG. 8C) are formed in the volume of the confinement tube 41.

It should be noted that the transversal RF magnetic fields M1 and M2 generated by the branch 30-1 or 30-2 of the saddle antenna 30 and directed to the axis X-X of the confinement tube 41 penetrate the bulk CCP discharge 90 and accelerate the electrons of this discharge 90 moving them along circular force lines 105*a*, 105*b*, . . . 105*n* of the electric fields in the longitudinal cross sections of the volume inside the confinement tube 41 (FIG. 8C). The central transversal magnetic fields M1 and M2 create the electric field circuits 102*a*, 102*b*, . . . 102*n* (FIG. 13) in the longitudinal cross sections of the bottom plasma-confinement tube 41 where the CCP discharge 90 40*a* is located. Thus, it can be seen that the transversal magnetic field created at the peripheral area of the bottom confinement tube 41 have the same energy as in the central part of the confinement tube 41, and this manifests the uniformity of the plasma density distribution across the transversal section of the confinement tube.

According to the aforementioned model of uniformity shown in FIG. 8C, the entire CCP discharge 90 may be presented as a generator of a plurality of elementary CCP discharges 105*a*, 105*b*, . . . 105*n*, which are distributed in the part of the volume of the confinement tube 41, where this tube is encompassed by the saddle antenna 30. The plasma electrons circulated along the lines 102*a*, 102*b*, . . . 102*n* (FIG. 13) of the electric fields are accelerated by the RF electric fields, but their energy is not sufficient for generation of a plurality of the elementary ICP discharges.

Because at atmospheric pressure free paths of the electrons are too short, their energy is not sufficient for ionizing gas molecules in an amount needed to sustain the ICP discharge. Nevertheless, during the circulation, the electrons gain energy from the RF magnetic fields M1 and M2 of both antenna branches 30-1 and 30-2 (FIG. 6) as well as from the peripheral magnetic fields of the arrays of wires of the winding perpendicular to the axis X-X, such as wires 190*a* and 191*a* shown in FIG. 7. Being accelerated by the increased magnetic fields M1 and M2, the electrons ionize enough gas molecules in each aforementioned layer. Such circuits with high-energy electrons in combination with an optimized discharge-gas flow rate around 4 SLM, optimized RF power about P~1.0-1.5 kW, and a frequency f=13.56 MHz transform the CCP discharges 105*a*, 105*b*, 108*c*, . . . 105*n* (FIG. 8*a*) into a plurality of the ICP discharges 107*a*, 107*b* . . . 107*n* (FIG. 8C) near the axis X-X, as well as near the inner wall of the confinement tube 41.

Next, in Phase 3, at the same RF power, the electrical fields accelerate the electrons up to some energy, which can sustain the elementary ICP discharges 107*a*, 107*b* . . . 107*n* in each area of the confinement tube 41. All these mini-discharges 107*a*, 107*b*, . . . 107*n* are combined into a bulk ICP discharge 40*a* (FIGS. 1, 2, and 8) that is relatively uniform due to the transversal RF magnetic field M1 and M2 and the swirling injection of the discharge gas 50*a* that equalizes distribution of the plasma density across the cross-section of the bottom confinement tube 41.

In Phase 4 (FIG. 14), under some critical conditions that may occur at a certain RF power applied to the antenna 30 and at certain flow rates of the sheath gas 34*a* and discharge gas 60*a* (FIG. 1), respectively, plasma density can be increased, and a total impedance of plasma may drastically drop. Low plasma impedance leads to a phenomenon when resonance in the plasma may be achieved and under certain resonance conditions, the ICP discharge 40*a* gains a property of high consumption of the RF power from the antenna 30.

Figure 14:
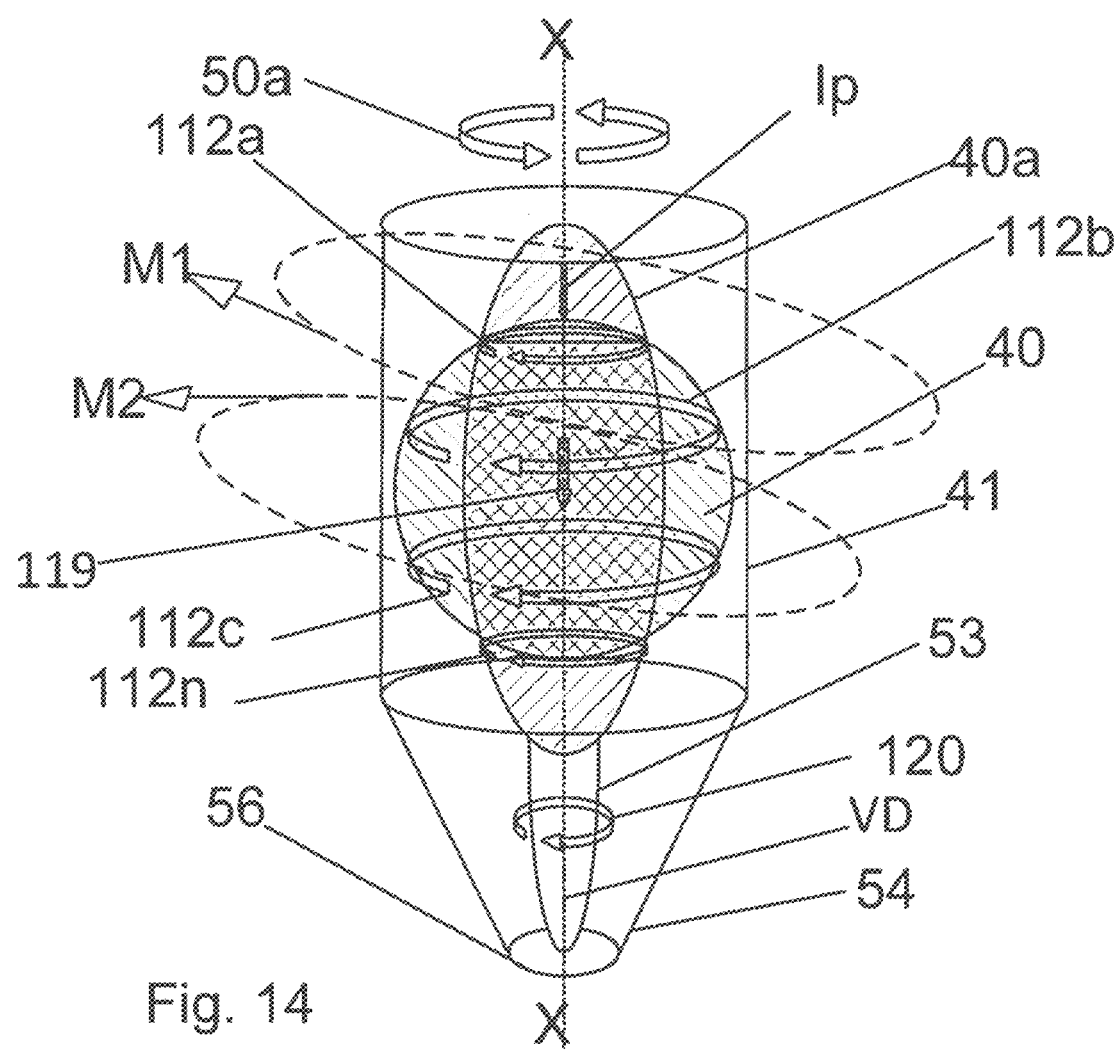
FIG. 14 illustrates conversions of plasma in the lower-stage plasma beam generator under the action of the antenna.

The outer RF magnetic field may saturate the discharge up to some critical plasma density, at which the ICP discharge 40*a* generates its own plasma current $I_p$ (FIG. 14). In turn, such own plasma current of the ICP discharge 40*a* generates its own RF magnetic fields 112*a*, 112*b*, 112*c* . . . 112*n* that try to squeeze the bulk ICP discharge 40*a* in the axial direction toward the lower outlet orifice 66 of the bottom plasma-confinement tube 41 (FIGS. 1 and 9). Such a state is achieved by high inductive heating of plasma bulk of the ICP discharge by the RF magnetic field and the swirling action of the discharge gas. High temperature and high pressure of the ionized gas in the confinement tube 41 lead to the formation of a high temperature plasma ball 40 shown in FIG. 14. FIG. 14 illustrates conversions of plasma in the lower-stage plasma beam generator under the action of the antenna.

Unlike a conventional coil inductor, the saddle antenna does not have an axial component of the RF magnetic field in the direction of the axis X-X of the confinement tube 41. Therefore, there are no restrictions on propagation of the magnetic fields in the radial direction. A rapid transition from the elongated bulk ICP torch 40*a* to the plasma ball 40 due to saturation of the pressure in the plasma discharge is shown in FIGS. 1 and 9. As can be seen from FIG. 14, the plasma ball 40 has its own magnetic fields 112*a*, 112*b*, . . . 112*n*. Due to the balance between the own magnetic fields of the ball 40, the outer magnetic fields M1 and M2 of the antenna branches 30-1 and 30-2, the swirling flow of the discharge gas 60*a*, and the axial motion of the high temperature species (not shown in FIG. 14), the bulk ICP discharge 40*a* is transformed into the aforementioned high temperature plasma ball 40, which has a temperature around 8,000° C. and is assumed to have a high pressure around of 10 Atm or more. The plasma ball 40 is stabilized by its own magnetic fields 112*a*, 112*b*, . . . 112*n* that facilitate sustaining of the plasma in the shape of a ball.

In Phase 5, the transition process is finalized by generation of a plasma torch 53 (FIG. 1 and FIG. 14). This transformation is achieved due to continuous consumption of the RF power from the antenna 30 and due to a drastic drop of the plasma impedance of the plasma ball 40. At some level of the RF power, the plasma ball 40 becomes over-saturated. Its pressure and temperature are drastically raised, and the impedance drops close to zero. However, the own magnetic fields 112*a*, 112*b*, . . . 112*n* of the plasma ball 40 are not enough to support further sustaining of the plasma ball 40 in a balanced state. For self-stabilization, the ball 40 releases extra-pressure and ejects a discharge as a plasma torch 53 (FIG. 1 and FIG. 14) in the downward direction towards the nozzle 54 (FIG. 1). This torch 53 is characterized by self-pinching having a high plasma current showed by the arrow 119. This current generates its own magnetic field 120 that converges the torch 53 in the plasma stream to a diameter around 2 mm.

Therefore, the nozzle 54, which is located at the lower end of the confinement tube 41, is employed to narrow the torch 53 and convert it into the supersonic plasma beam B in vicinity of the orifice 56.

However, precise additive manufacturing with high resolution and tolerances requests that the beam be focused to the diameter of the crossover CR within the sub-millimeter range, and as will be shown below, this is achieved in the 3D printer apparatus of the invention by using aerodynamic and electrical focusing.

It should be noted that the process of generation of the plasma torch 53 is not without challenges. Main challenge is a hot spot that constitutes a problem for the atmospheric plasma technology (FIG. 10). The generated plasma ball 40 achieves a high density, which is comparable with the density of a virtual graphite electrode. For many years the attempts to use the atmospheric plasma for commercial applications was hindered by the phenomenon of the formation of a virtual quasi electrode in the form of a plasma ball. In fact, due to high electron density, the plasma ball behaved not as a plasma but rather as a metal electrode. Since this problem was not solved until the present invention, further development and application of the atmospheric pressure ICP technology was delayed. Therefore, the existing 3D printer apparatuses using plasma beam under atmospheric pressure operate on the DC spray technique and therefore have low resolution.

Besides the inductive coupling established between the plasma ball 40 and the inductor (in this case, the antenna 30) as a means due to which the RF power applied to the inductor sustains the ICP discharge, especially the ball 40 after conversion into a high density plasma bulk, the same ball 40 develops a parasitic capacitive coupling with the high-voltage wires 190a and 190b of the antenna 30. FIG. 10 illustrates such interaction between the ball 40 and the branch 30-2 of the antenna 30. In Phase 1, the RF electrical field J-2 generated at the high-voltage portion 190a of the wire of the high voltage turn 30-2a was used for development of the arc ARC2 for breakdown and generation of the CCP discharge 90 (FIG. 8a). However, after formation of the ball in the Phase 5, the electric field J-2 becomes destructive because of extraction of plasma electrons from some areas of the plasma ball 40, which faces the high-voltage wires 190a and, 190b of the antenna. These plasma electrons are born because of recombination of the charged species that surround the ball 40 as an electron cloud outside the plasma ball 40. The electrons emitted from this area, which is known in the welding science as "a yellow spot" YS (FIG. 3B), are accelerated by the electrical field J toward the high-voltage wire 190b of the antenna winding of one of the branches 30-2. Being collided with the inner wall 41a of the confinement tube 41, the electrons charge the surface of the inner wall 41a of the bottom plasma-confinement tube 41 near the wire portion 190a. Such electron deposition spot is depicted as ES in FIG. 10.

The electron spot SP establishes a capacitive coupling between the antenna 30 and the plasma ball 40 providing a displacement current between the branch 30-2 of the antenna 30 and the plasma ball 40. Since the plasma ball 40 communicates with the ground (GND) through the plasma torch 53, now a part of the RF current I-2 that feeds the branch 30-1 connected to the GND2 leaks through the displacement current to the ground GND2 (FIG. 4). The displacement current from the antenna directly heats the plasma ball 40 and reduces its impedance up to zero. Such parasitic circuit includes the high-voltage wire 190b, electron spot ES, electron stream 300 between the plasma ball 40 and the spot ES, plasma ball 40, plasma torch 53, and the ground GND2. The drop of impedance of the plasma ball 40 would lead to branching of the sufficient part of the current I-2 through the plasma beam system and to total melting of the confinement tube 41 in the area of the spot ES. However, this destructive process is limited by a space charge of the electron stream 300. The space charge pinches the stream 300 and localizes the heating area of the electron spot ES down to about 1 mm in diameter. The spot of this kind is known in the art as a "hot spot" HP (FIG. 10) where the quartz wall of the confinement tube can be punched. The space volume, created by such a stream of the electrons provides self-focusing of the stream on a small surface area of the inner wall of the confinement tube 41 forming a small charged space known as an "electron spot" ES. The spot ES and the stream of the electrons create a shortage of the displacement current through the plasma ball 40, the torch 53, and the ground GND2. This shortage results in branching of the part of the RF current of the antenna 30. The electron spot ES provides passage of the branched displacement current to the ground through the plasma ball 40 and the torch 53. As a result, the electron spot ES is overheated by this displacement current and is turned into the aforementioned high-temperature spot (hot spot HP) that may punch the wall of the bottom confinement tube 41.

To reduce the parasitic coupling between the ball 40 and the inductor and avoid the hot spot HP, one of the manufacturers of the AP-ICP systems (Tekna) has reduced frequency of the RF power applied to the inductor down to 2 MHz. As a result, the requested RF power was increased to 100 kW, and the cost of the Tekna system grew up to $1M.

However, the inventors have found that the saddle antenna could provide self-annihilation of the aforementioned parasitic phenomenon. This is achieved by connecting the antenna branches 30-1 and 30-2 of the saddle antenna 30 in parallel through a bridge circuit 80 (See FIG. 6). By tuning the capacitance of the shoulders of this bridge, it becomes possible to equalize potential drop between the high-voltage portion 190a of the branch 30-1 and the plasma ball 40 and between the high-voltage portion 190b of the branch 31-2 and the same plasma ball 40. Thus, the hot spot HP caused by the parasitic capacitive coupling is self-eliminated.

According to one aspect of the invention, depending on the process, the ICP beam generator 20 was operated at a frequency f=13.56 MHz and at an RF power of about P~1.0-1.5 kW. Such parameters allowed obtaining an RF plasma ball 40 (FIG. 14) filling out 75% of the volume inside the confined tube 41 with a diameter around 20 mm.

Under such power conditions, it could be possible to provide a total vaporization of an YSZ or $Y_2O_3$ nanopowder with particle dimensions not exceeding 20 nm and to reach a deposition rate up to 1 μm/s.

The RF plasma employed in the jet operated at the frequency f=27.12 MHz made it possible to obtain a RF plasma ball 40 inside the confined tube 41 with a diameter d=20 mm at the atmospheric pressure. At a twice-higher frequency, the power transferred to the plasma was P~0.5 kW and the maximum electron temperature $T_e$ was in the range of 7,000 to 10,000K. The electron density ne was about ~$10^{19}$ $cm^{-3}$.

Aerodynamic Focusing of the Plasma Beam

As mentioned above, the plasma torch 63 (FIG. 14) propagating in the confinement tube 41 in the direction of the axis X-X (FIG. 1) with a supersonic speed has a high plasma current, shown in FIG. 14 by arrow 119, and generates its own magnetic field 120 that contributes to pinching of the bulk torch 63 into the beam B (FIG. 1). To further facilitate transition of the plasma torch 53 into a supersonic plasma beam B, the torch 53 is narrowed by the tapered shape of the nozzle 64, which has an angle of convergence around 50° to 60°, precisely 55° (in FIG. 1 the tapered shape of the nozzle 54 is exaggeratedly narrowed but is closer to actuality in FIG. 14).

Such convergence is chosen to provide smooth tapering from the diameter of the confinement tube 41 to the orifice 56 having small dimensions, e.g., about 1.5-2 mm. In this case, the following should be taken into account. First, although a long nozzle 54 can provide high supersonic speed, it may develop premature deposition of the YSZ or $Y_2O_3$ vapor on the inner wall. Second, the narrowed nozzle's throat may develop a reflected wave directed against propagation of the plasma torch 53. Such a wave can cause turbulence in the plasma torch. Third, taking in the account that the bottom part of the saddle antenna serves as source of energy for the plasma gun W located below in the down-stream direction of the beam, an increase of the distance between the bottom of the saddle antenna positioned close to the entrance of the nozzle 54 and the extractor 58 (FIG. 1) may weaken the inductive coupling between the bottom high voltage wires 191*a* and 191*b* of the antenna 30 and the extractor 58 and this weakens the focusing properties of the plasma gun W (FIG. 1).

By using the taper angle in the range of 50 to 60°, it becomes possible to overcome the aforementioned problems by selecting the aspect ratio of the nozzle 84 that maintains a smooth transition of the flow into a stream. The aerodynamic focusing of the supersonic plasma stream is controlled by the geometry of the nozzle and orifice. Initially, the convergent geometry of this nozzle has been chosen around 55° with the diameter of the orifice around 1.8 mm for ejection of droplets with a sonic speed. Experimentally, the aspect ratio of the nozzle was found around of 1:2.5 that can provide an optimal aerodynamic convergence angle $\gamma_a$ and the crossover $\delta_a$.

Electrical Focusing of the Plasma Beam

The applicants have found that a phenomenon that normally is not desirable for the performance of a plasma jet can be used for focusing the plasma beam B on the object S. More specifically, in a theory of the self-biased plasma gun W proposed and described by the applicants, some similarities with the conventional electron optics can be noticed. A key element of this theory is that a charged surface on the inner wall of the tip 54*a* of the converging nozzle 54, which ends with a lower outlet orifice 56 (FIG. 1), can be assumed as a metal electrode that in the Steigerwald electron gun (K. H. Steigerwald, Optik 6, 469 (1949)) is known as a Wehnelt electrode.

As was mentioned above, the conventional jet described in the Background of the Invention is equipped with the nozzle for fine focusing of the printing material on the object. Being equipped with the orifice, such a nozzle provides an aerodynamic focusing.

The 3D printer of the invention is also equipped with the nozzle to narrow the plasma torch for accelerating and focusing the vaporized droplets of $Y_2O_3$. However, in the case of the invention, the focusing property is reinforced employing the plasma-optical phenomena, particularly, interaction of the accelerated plasma species of the torch 53 with of spatial charges of the background plasma. The term "background plasma" is related to the immobilized charged species populating some surface, or the border layer near such surface. Usually this background plasma has a sufficient potential and hinders the passage of the charged particles, even with the supersonic speed. The delayed passage of the charged particles further increases the potential and its detrimental influence and leads to stagnation of the plasma beam.

Because the orifice 56 has a diameter just around 1 mm, it cannot provide the passage of the total plasma torch 53 into the atmosphere. Although the neutral species of the torch can pass through the orifice and focused aerodynamically, the charged ones constitute an overwhelming part of the torch 53 and are cutoff, hampered, immobilized, and accumulated behind the orifice as the background plasma. When the front of the torch 53 approaches the background plasma, which is accumulated behind the orifice in the tip 54*a* of the nozzle 54, the spatial charge forces provided by the potential of the background plasma expel a part of the charged species from the front of the incoming torch 53. When the plasma density of the background plasma becomes larger than the density of the torch 53, the plasma electrons will be completely expelled from the torch, and the background plasma will completely consume the torch 53. Losing the negative-positive balance, the front of the torch 53 will be swelled and dissipated in the background plasma, thus increasing its density.

Accumulated inside the glass tip 54*a*, the background plasma enclosed inside the glass tip 54*a* demarcates itself from the glass surface by a negatively charged layer 57. This layer, which is situated on the border with the inner glass surface of the tip 54*a*, consists of the electrons introduced by the plasma to secure a balance between the negative and positive species. Such balance is a main condition for the plasma sustainability. This dense electron layer 57 is called "Debye layer" between the plasma bulk and the glass surface and is characterized by a floating potential $V_f$ that clogs the orifice, finally, trapping the plasma torch inside the tip 54*a*. Even having supersonic speed, the charged plasma species, nevertheless, in reality obtain the equivalent energy that does not exceed 0.04 eV. It is sufficiently lower than is necessary to penetrate the floating potential $V_f$ that clogs the orifice. The value of the floating potential $V_f$ may be around of 24-42 V.

Thus, the aerodynamic focusing expected from the nozzle 54 is hindered as a result of the saturated plasma such as a negative Debye layer 57 and its floating potential $V_f$ blocking the orifice 56, as well as the ejection of the plasma beam B into atmosphere.

Figure 16:
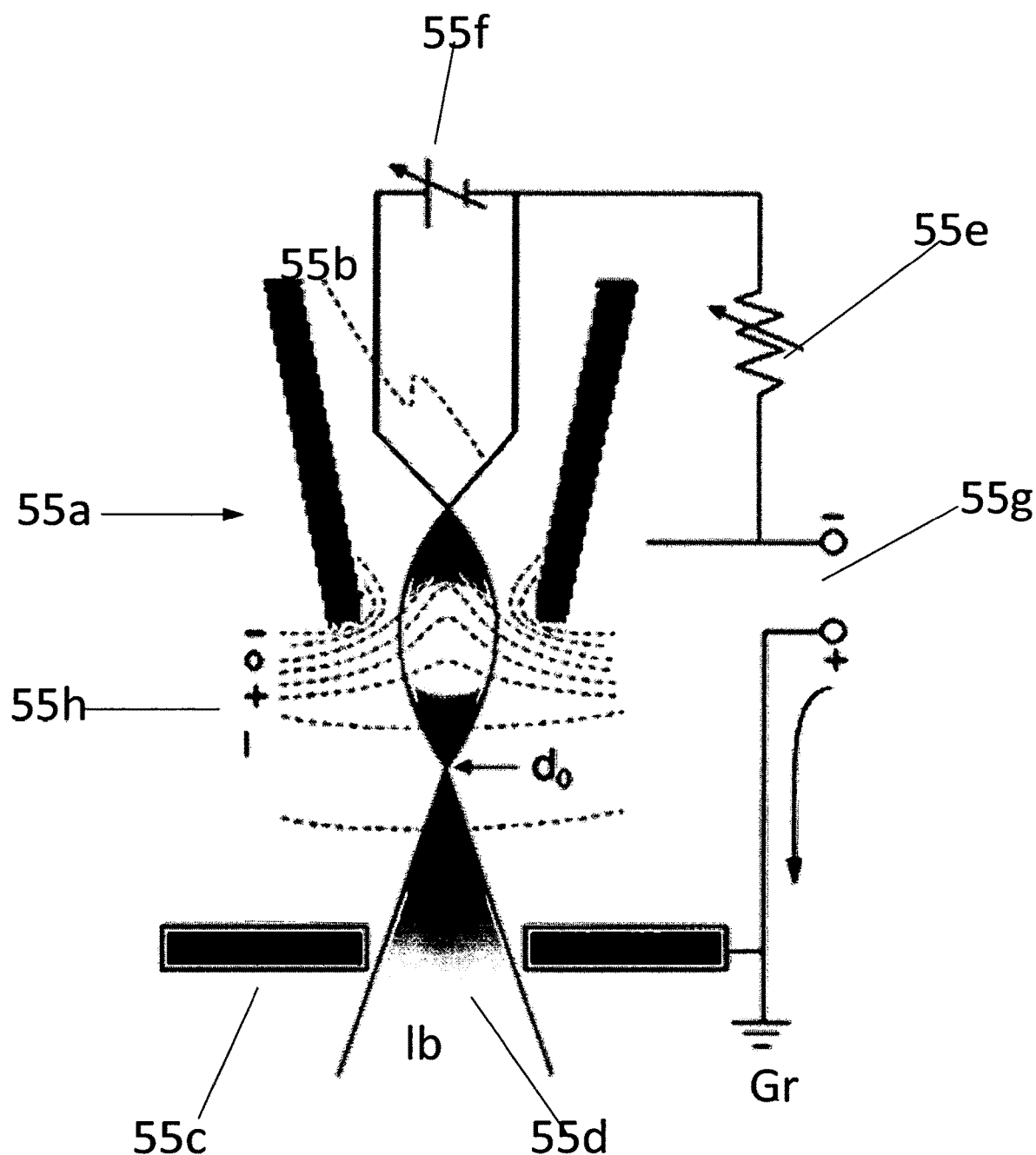
FIG. 16 illustrate similarities of the proposed self-biased plasma gun with the Steigerwald electron gun.

Similar problems with saturation by the spatial charge of the electron beam and following cutoff of the electron beam were successfully overcome in the well-known emission electron optics, especially, as described in the Steigerwald Type Electron Gun with Wehnelt electrode (also known as Wehnelt cap, grid cap or simply Wehnelt) (K. H., Optik 6, 469 (1949)). A cross-sectional view, showing how a Wehnelt cap 55*a* localizes emissions at the filament tip 55*b* and serves as a convergent electrostatic lens is shown in FIG. 16. Reference numeral 55*c* designates an anode plate that has an opening 55*d* for passing the electron beam current Ib. Reference numeral 85*e* designates a bias resistor, which is connected with a filament heating supply 55*f* and Wehnelt cap. The positive terminal of the high voltage supply 55*g* is connected to the anode plate 55*c* and to the ground Gr. Reference numeral 55*h* shows lines of equipotential. Moreover, a spatial charge was found to be valuable for focusing of an electron beam.

Acquaintance with the conception of the proposed invention allows better understanding functions of the key parts of the invented plasma beam generating system.

Thus, the self-biasing property borrowed from a conventional electron gun can be employed in the plasma gun if we find substitution for the Wehnelt electrode (FIG. 16) that is a negative electrode in the electron gun assembly of some thermionic devices. Such devices are used in welding electron guns and in other applications where thin, well-focused electron beams are required. The "Wehnelt cap" that focuses and controls the electron beam in the welding electron gun has a shape of a hollow elongated conical geometry. Like the Wehnelt's bottom portion of the known device, the nozzle of the 3D printer of the invention has a through hole (aperture) in the center with a diameter that typically ranges from 200 to 1200 μm. The Wehnelt cap, which is provided with an electron emitter in the form of a tungsten filament, is located directly above the Wehnelt aperture.

In order to accelerate electrons from the emitter towards the anode plate 55*c*, the power supply provides a high positive voltage (typically +1 to +30 kV) relative to the emitter, thus creating an electron beam passing through the Wehnelt's aperture. Having a low initial speed, the electrons are saturated and form an electron cloud near the emitter. As a result, a negative spatial electron charge is established. This negative spatial charge acting in the vicinity of the emitter blocks the electron beam from propagation and penetration through the aperture. A similar phenomenon occurs in the plasma nozzle that develops floating potential $V_f$. Nevertheless, one important phenomenon is found to be useful in the electron beam management and was used by the inventors in the plasma beam of the 3D printer of the invention. This is a leakage of the current through the aforementioned electron cloud that provides coupling between the emitter and Wehnelt cap (Steigerwald, Emission Optics of the Steigerwald Type Electron Gun, Chong-Yu Ruan, Manfred Fink Department of Physics, The University of Texas, Austin, Tex. 78712 arXiv:physics/9905031v1 [physics.optics]))

Connecting the emitter and Wehnelt cap through some resistor forces gives ability to develop from the leaking current a voltage drop $V_{bias}$ called "bias voltage". The Wehnelt bias voltage $V_{bias}$ controls the emission area of the cathode (filament 55b), which, in turn, determines both the electron beam current and effective size $d_0$ of the beam's electron source called an aperture. In other words, the Wehnelt cap with the bias voltage acts as a control grid and serves as an electrostatic lens.

In other words, the principle of focusing of the plasma beam B was borrowed from the Steigerwald's method of the bias voltage control.

The nozzle 54 (FIG. 11) having a tip 84a and an orifice 68 defines a plasma beam generation unit 86, which, in fact, constitutes a part of the virtual plasma gun W that focuses the plasma beam B (FIG. 1) on the surface of the object S. The beam generation unit 86 includes a grounded copper electrode 58, i.e., the extractor, which is positioned beneath the nozzle 54 through an opening 58a that is aligned with the nozzle orifice 56. During the operation, the inner surface 53 of the tip 54a of the nozzle 54 that terminates with the orifice 56 is covered with a sheath layer 57 (FIG. 11) that propagates along the aforementioned inner surface towards the orifice 56 and is saturated with electrons. The layer 57, which may be functionally considered "a frozen electron cone," serves as a negative electrode (cathode) capacitively coupled to the electrically positive copper electrode, i.e., the extractor 88. This blocking negative sheath layer 57 can serve as a quasi-conductive cathode of the plasma gun W under a floating potential $V_f$.

FIG. 16 illustrate similarities of the proposed self-biased plasma gun with the Steigerwald electron gun. In view of these similarities, it is important to understand the self-biased phenomenon found by Steigerwald. As the Wehnelt bias voltage increases, the emitting area of the cathode (and along with it, the beam diameter and beam current) will decrease until it becomes so small that the beam is cut off. In a normal operation, the bias voltage is typically set slightly more positive than the cutoff bias voltage to balance the beam quality and beam current. Besides control of the electron current, the Wehnelt bias also controls beam focusing and the effective size $d_0$ aperture) (FIG. 16) of the electron source, which is essential for creating an electron beam that is to be focused into a very small spot "crossover". Thus, the Wehnelt cap is set at a bias voltage slightly more negative than the filament to provide a focusing effect on the beam and forcing the electrons to be gathered in a crossover.

Due to a very small dispersion angle facilitated by the conical geometry, the Wehnelt cap demonstrates a superb ability of an electron gun to create a very narrow, well collimated, and intense electron beam with a convergent angle $\square_a$ that is long enough to provide welding at a distance safe from splashes.

The inventors found that by satisfying the above condition, the same focusing results might be obtained in a plasma gun as well. However, for the purposes of the invention, in order to further improve the overall performance of the plasma gun, it is necessary to provide the Wehnelt-like electrode with an inner conical surface for passing the plasma beam B therethrough. As mentioned above, the solid taped angle of the cone-shaped portion of the nozzle 54 should be in the range of 30° to 60°.

Thus, conically distributed and negatively charged boundary layer (the Debye layer) 57 may function in the gun W similarly to the metal Wehnelt cap of a conical geometry used in the self-biased electron gun. Analogically with electron gun, the Debye layer 57 that blocks the passage of the plasma torch 53 can be breached using the same method of biasing, as well as the same leaking current as in the Steigerwald electron gun. The metal-grounded electrode 58 with the opening 58a aligned with the orifice 56 and positioned beneath this orifice 56, which, in fact, is the aforementioned extractor, was chosen by the inventors as a recipient of the aforementioned leaking current.

Authors proposed to replace the biasing Ohmic resistor 55e (FIG. 16) used by Steigerwald with the virtual parasitic capacitor Car (FIG. 11) which represents a parasitic capacitance between the Debye layer 57 and the extractor 58. Displacement current between the Debye layer 87 and the extractor 58 is used as the leaking current loading this capacitor $C_{par}$. The drop of the biasing potential $V_{par}$ on the capacitor $C_{par}$ designated by the reference numeral 99 in FIG. 11 (which in this case acts as a resistor) depends on the parasitic capacitance, which, in turn, depends on the distance L between the orifice 56 and the grounded electrode 58 (FIG. 1). Steigerwald resistive tuning of the gun can be replaced by adjusting the distance L between the grounded electrode 58 and the orifice 56. The third key electrode of the Steigerwald electron gun is the anode plate 55c (FIG. 16) connected to the Wehnelt cap 56a through the high voltage power supply 55f. In the device of FIG. 16, the Wehnelt cap 55a together with the biasing resistor 85e functions as a throttle controlled by the bias resistor 55e and responsible for the electron beam propagation and size of the electron emitting spot. The anode plate 55c acts as a long-focusing lens converging the electron beam and developing an image of the electron emitting aperture $d_o$ on the object S.

However, the concept of the Steigerwald electron gun of FIG. 16 is applicable for operations in vacuum and is not applicable for use in open air since the high voltage power supply would cause breakdown and destroy the plasma beam-generation system as a whole. However, the applicants have found that the inductive coupling of the bottom portions 191a and 191b of the high voltage turns 30-1a and 30-2a of the branches 30-1 and 30-2 in the antenna 30 with the grounded electrode 58v can be used as a source of energy to replace the high voltage power supply of the device shown in FIG. 16.

Thus, besides the parasitic capacitive coupling with the Debye layer 57, the extractor 58 located in the vicinity of the orifice 56 (FIG. 11) collects the energy through inductive coupling with the bottom wires 191a and 191b of the antenna 30 and acts as the anode of the electron gun.

Besides the electromagnetic fields M1 and M2 generated by branches 30-1 and 30-2 of the antenna 30, each bottom portion of the branches 30-1 and 30-2 of the antenna 30 irradiates the electromagnetic fields Mb1 and Mb2 (FIG. 8)

toward the extractor 88 and induces in the exposed surface of this extractor 58 the inductive current Ii that, in turn, generates the electric field $E_i$ that is necessary for the strong focusing function of the proposed plasma gun W. One end of the extractor 58 is attached to the grounded X, Y, Z alignment system (FIG. 1). The opposite end of the extractor 88 is pendent and has the opening 58a aligned with the orifice 56 of the nozzle 58. Therefore, the extractor 58 is designed as a resistor, resistance $R_e$ of which depends on the thickness and length of the strip. Thus, the inductive current L develops a voltage drop $V_i$ that, in turn, is accumulated at the edges of the opening 58a and provides inside the opening 58a the electrical field $E_i$, which is coaxial to the opening 8a and, correspondingly to the orifice 56. This electrical field $E_i$, interacts mostly between the extractor 58 and the grounded object S positioned beneath the extractor 58. Conventionally, the extractor 58 has top and bottom functions, which are described below.

a) The top function is a breach of the Debye layer 87 for partial de-blocking of the plasma beam B by controlling the effective size of a virtual aperture $d_a$ inside the orifice 56 clogged by the Debye layer 57 (FIG. 11). This function is achieved by controlling the parasitic capacitive coupling and the biasing voltage drop $v_{par}$ in the gap between the orifice 56 and the extractor 8 through the Z-motion of the extractor 58 provided by extractor motion mechanism 58c (FIG. 1). This motion acting as a throttle is essential for controlling density of the plasma beam B and the rate of deposition.

b) The bottom function is the focusing-lens-effect of the opening 58a having a strong inductively induced electric field Ei, which converges the plasma beam B toward the axis X-X, passes through the extractor opening 58a, and focuses the plasma B on the focal plane FOC. Acting as a converging lens, the plasma gun W is characterized by the focal length Lf (FIG. 11) that is the distance from the center of the extractor opening 58a to the focal plane FOC, on which the beam B will be focused to a single spot called "crossover CR". The deposition spot provided by this crossover CR has approximately the same size □□□The crossover is a projection of the virtual aperture on the workpiece.

If size □□of the crossover depends on the gap L between the orifice 56 and the extractor 58 controlling the bias voltage $V_{bias}$, and, as a result, the aperture 56a, the focal length Lf and convergence angle □ depend on the RF power applied to the antenna 30, the distance Lb between the bottom portions 191a and 191b of the antenna 30 and the extractor 58 (FIG. 5), which also is a critical dimensions, the diameter $d_0$ of the opening 58a in the extractor 58, and the length Lr of the portion of the extractor 58 from the center of the opening 58a to the grounded terminal GND 2, (FIG. 11) where the extractor 58 is fixed to the extractor motion mechanism 58c for moving the extractor plate in the direction of axis Z for tuning the virtual aperture (FIG. 1) and thus for minimizing the crossover CR.

If the Steigerwald electron gun (FIG. 16) is able to align the focal plane and the surface of the workpiece by controlling the voltage of the power supply 55f between the anode plate 55c and the Wehnelt cap 58a, the plasma gun W of the apparatus 20 of the invention does not have such an option. The saddle antenna 30, which shares a part of the RF magnetic fields M1 and M2, i.e., the fields Mb1 and Mb2, to induce an electrical current L and thus the electrical field $E_i$ in the opening 58a of the extractor 58, cannot be tuned for this auxiliary function to control the focus length Lf. It is tuned to generate the plasma torch 53 only. Therefore, the workpiece S (3D object) should be elevated by the workpiece holder WH with the drive motor 69b in the Z-axis direction for superposition of the focal plane FOC onto the surface to be treated (FIG. 11).

Having described the functions of the components used in the 3D printer 20 of the invention, let us further consider these components and their interaction during operation of the 3D printer in details.

As mentioned above, FIG. 5 and FIG. 11 illustrate the plasma gun W with the extractor 58, having an opening 58a aligned with the orifice 56. Established through this orifice is the capacitive coupling with the negative Debye layer 57 that is characterized by the parasitic capacitance $C_{par}$ (FIG. 11). Attenuating the blockage of the plasma beam B caused by the Debye layer 57 is possible due to the electric field $E_a$ developed by the leaking displacement current (not shown) between the negatively charged Debye layer 57 and the ground terminal GND 2 to which the extractor 58 is connected. By tuning the distance L between the extractor 8 and the orifice 56 it becomes possible to change the parasitic capacitance $C_{par}$, and thus to control the electrical field E and potential drop $V_{par}$ on the virtual parasitic capacitor 99 (FIG. 11).

In other words, the orifice 56, the extractor 58, and the object S form a self-biased plasma gun W. (FIG. 11). If the plasma torch 53 supplying this gun W with the charged species serves as the cathode (filament) (FIG. 16), the orifice 56 and the negative layer 57 behind the orifice 56 having the tapered shape resulting from the shape of the nozzle 84 serve as a Wehnelt cap. The grounded extractor 8 serves as the anode of such gun W. Finally, the parasitic capacitor 99 between the negative tapered layer and extractor with the variable distance L serves as the biasing resistor.

The distance Lf between the extractor 58 and the focal plane FOC (called "working distance") play an important role in focusing. The distance may be chosen in the range of 3 mm to 10 mm.

The extractor 58 is moveable with respect to the tip 54a of the lower outlet orifice 56. This is needed for adjusting the gap L between the orifice 56 and the facing side of the extractor 58 (FIG. 1). The object S is also movable. All devices for focusing the plasma beam B on the object S are shown in FIG. 1. The object S moves not only in the Z-axis direction but also in the X-Y plane. All motions are controlled by a program that defines the shape of the 3D printing.

As mentioned above, the plasma beam 53 carrying the vaporized droplets VP is narrowed by the nozzle 53 that ended by the orifice 56. This orifice 56 can be clogged near the inner surface of the tip 54a of the nozzle 53. Such clogging of the orifice 56 may be caused by an abovementioned Debye layer 87 that propagates along the inner surface towards the orifice 56 and is saturated with electrons. Such a layer 57, which might be functionally called "frozen electron cone" (FIG. 5), may serve as a negative electrode of the plasma gun W. Being capacitively coupled to the grounded extractor 58, the layer 857 can serve as a control component of the plasma gun W under a floating potential Vf. The capacitive coupling between the sheath layer 57 under the floating potential $V_f$ and the grounded anode (adjoined to the opening surface of the extractor 58) is provided through a parasitic capacitor $C_{par}$ that creates a bias resistance between the sheath layer 57 and the extractor 58 with a voltage drop of $V_{par}$. The voltage drop $V_{par}$, in turn, creates an electric electrostatic field $E_a$ between the "frozen electron cone" and the extractor 58. At the critical value of the voltage drop $V_{par}$, this field commensurable with the floating potential $V_f$ is capable of breaching the sheath layer 87 and opening a virtual hole in this sheath-clogged orifice 56 called a sheath aperture 56a (FIG. 11).

A diameter of the aperture 56a depends on the distance L between the orifice 56 and the extractor 58. The plasma beam B carrying the vapor droplets VP after breaching the Debye layer 57 and is injected into atmosphere through the aperture 66a to provide nanocoating onto flat surfaces of the object S. However, for 3D printing, the highest possible resolution is needed. Therefore, the plasma beam B is subjected to strong focusing on the object S using the focusing effect of the plasma gun W. As was mentioned above, high energy is required to achieve strong focusing properties. Such energy can be introduced through the electromagnetic coupling of the bottom parts 191a and 191b of the saddle antenna 30 and the extractor 58. Therefore, the surface of the extractor 58 is exposed to the RF magnetic fields M1a and M1b induced by the high-voltage outer turns of the branches 30-1 and 30-2 of the saddle antenna 30, especially by their bottom wires 191a and 191b (FIG. 7).

The RF magnetic fields M1a and M1b induce the inductive currents Ii. Being concentrated near the edges of the opening 58a of the extractor 58, the inductive currents Ii cause an electrical potential drop $V_i$ on the resistor $R_i$ (FIG. 11). This potential drop $V_i$ is controlled by resistivity of the resistor IL that, in turn, is determined by the length of the portion of the extractor 58, especially by the variable length from the opening 58a to a sliding grounding terminal GND2 on the plate 22d moveable together with the extractor 8. The tuned highest potential drop $Vi_{max}$ provides the electric field $E_i$ near the opening 58a. Thus, this opening serves as a lens focusing the plasma beam spot (crossover CR) on the object S. The crossover CR is an image of this aperture positioned in the focal plane FOC at the distance Lf from the extractor 58. The aforementioned siding motion of the plate 22d boosts the optical power of the plasma gun W.

In other words, the sliding grounded terminal 22d is moveable with respect to the selected opening of the extractor plate 58 for changing the inductive coupling for regulating an inductive current induced by said inductive coupling and thus for fine tuning of the focal length.

The extractor 88 is a platform moved by a ball screw mechanism 58f relative to the orifice 56 of the nozzle 54 (FIG. 1, FIG. 5). The motion of the extractor 58 is shown by the two-directional arrow A.

As was mentioned above, the virtual sheath aperture 56a, which is formed by the electric field generated by the extractor 58 within the outlet orifice 56 of the nozzle, is responsible for the minimal size □ of the plasma beam B, called crossover CR (FIG. 11).

The mechanism described above provides the plasma beam B with a minimal convergence angle□□, as well as the optimal size □□of the crossover CR, or deposition spot. At the distance Lf, this spot can be considered as a focal point of the beam, and, simultaneously, the focal plane FOC (FIG. 11), where the object S should be positioned.

3D Printing with the Plasma Gun W

Because the plasma gun W constitutes a key unit of the 3D printing apparatus of the invention, for applicability in various applications of the additive manufacturing, this unit should be universal and possess versatility. In other words, the plasma gun W should have adjustable parameters that may change the properties, including the focal length Lf of the plasma B. Such an adjustment may be needed, e.g., for 3D printing of the vertically oriented structures like elevation of the pins on the 3D electrostatic chuck for which a short focal length and the smallest aperture 56al on the extractor is required (FIG. 4). Contrary to that, in case of a negative elevation, which is required for printing a plasma-chemical corrosion protection barrier inside deep gas holes of the showerhead (FIGS. 1 and 3C-1), a large opening 58a is required for providing a long focal length. The longer length (working distance) should provide access of the focused $Y_2O_3$ vapor to the inner surface of the showerhead gas hole from the inlet to outlet. In other words, by selecting one of said at least two openings of different diameters in the extractor plate, it is possible to provide a course regulation of the focal length.

In addition, the long focus length is required for the 3D printing of the non-flat structures where the oblique deposition is used, for example, for printing the impermeable thin films like an YSZ electrolyte on a porous permeable structure, e.g., a Ni—YSZ anode for Solid Oxide Fuel Cells. Another application of the oblique deposition technique where the plasma gun with the long focus length is required is manufacturing of the hetero-junction tandem (HJT) solar cells on the textured silicon wafer. The light-trapping pyramidically textured surface of the wafer should be conformally coated by the uniform amorphous silicon film to achieve high efficiency of solar cells. For access to the sharp peaks and steep slopes of such surface, the oblique deposition with the permanent or oscillating tilt is controlled by the size of the opening 58a in the extractor 58 (FIG. 4).

Two openings 58a and 58a1 selected to match the application are used, e.g., for the elevation of the Ni—YSZ porous anode above the porous stainless steel interconnect to inherit its topology to provide the 100% passage of fuel through the anode. The requested high resolution for such elevation is provided due to the short focal length Lf by using the opening 58a. However, impermeability of the YSZ electrolyte deposited on the porous object requests the use of the opening 58al for obtaining the long focal length to provide the oblique deposition for overlapping the pores of the anode. As was mentioned above, the focal length Lf depends on the inductive coupling between the saddle antenna 30 and the extractor 88. The focal length Lf is proportional to (a) the diameter of opening 58a of the extractor 88, (b) the distance Lb between the lowermost turns 191a and 191b of this antenna and the copper extractor, (c) resistance of the working portion (a distance Lr from the used opening 58a or 58a1 of the extractor 58 and the sliding ground terminal (FIG. 4), of the extractor), and (d) the RF power of the saddle antenna 30. The distance Lb is an important factor and should have a given value.

Figure 18:
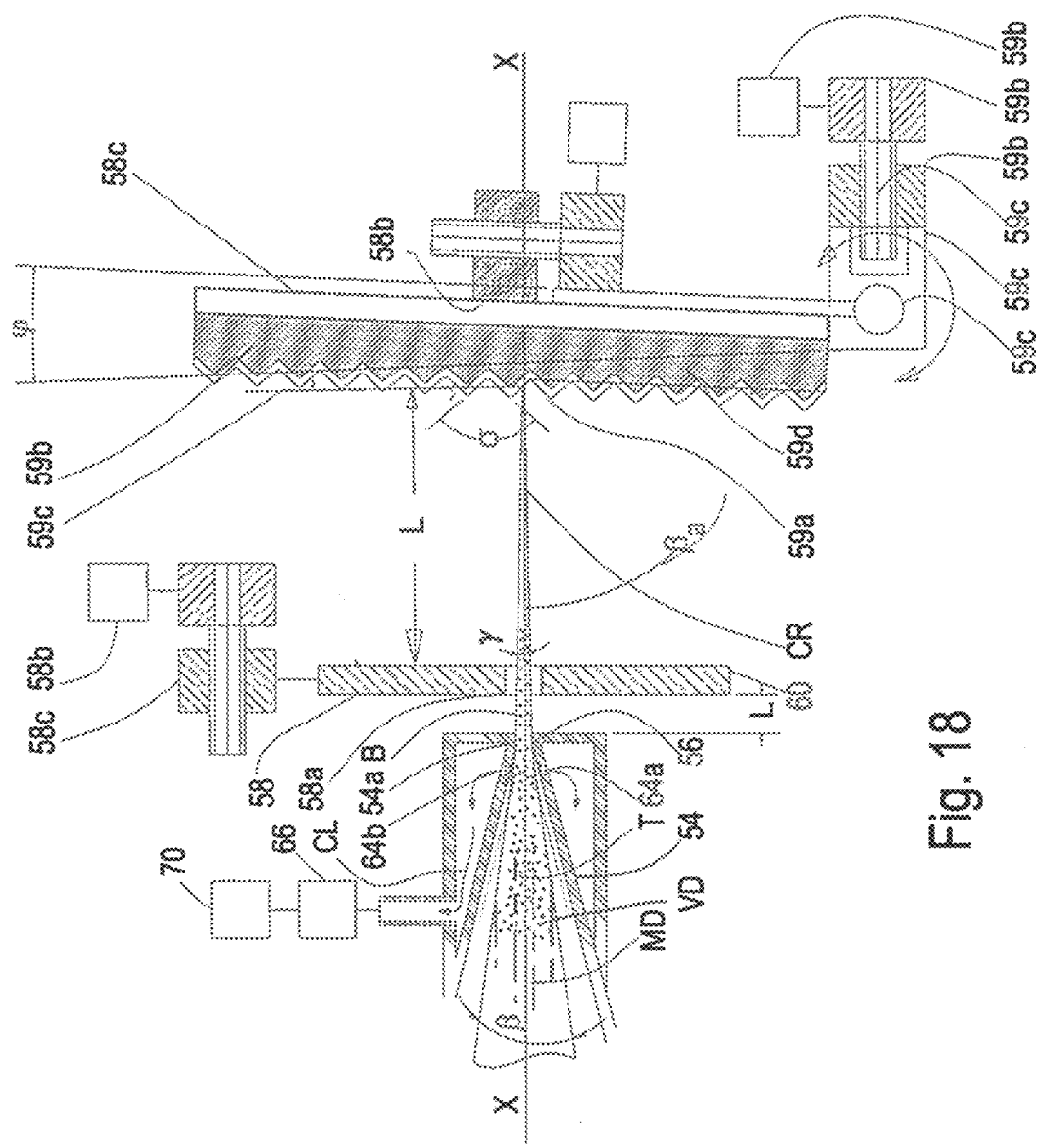
FIG. 18 is a view illustrating the process of the oblique deposition of YSZ on the left edges the pores of the Ni—YSZ anode with growth of the nanocrystalline on these edges with a slanted angle and overlapping the pores of the Ni—YSZ electrolyte from both edges of the pores.

FIG. 5, FIG. 11, FIG. 16, illustrate the operation with the plasma gun W for several types of the 3D printing processes like (is a view similar to FIG. 5 but illustrating 3D printer coating of inner walls in the shower head holes):

a) elevation of the pins of the 3D electrostatic chuck (FIG. 5);
b) building a plasma-chemical corrosion protection barrier inside the showerhead gas holes 59d with a high aspect ratio (FIG. 1 and FIG. 16);
c) fabrication of a porous anode and an impermeable electrolyte of solid oxide fuel cells (SOFC) (see FIG. 19);
d) conformal deposition of the amorphous silicon layers for fabrication of the HJT solar cells (FIG. 18).

FIG. 5 illustrates a layer-by-layer elevation of the 3D object such as, e.g., pins 59p of the 3D electrostatic chuck S (elevation up). Besides the movement in the X-Y directions, the chuck S should be lowered in the Z-direction for keeping the focal length Lf constant. For the same purpose, during deposition of the $Y_2O_3$ protection layer on the inner surface of the gas holes of the showerhead S, the latter should be elevated down (FIG. 11). The distance $L_f$ is a tuning variable adjusted by the motions in the Z-direction of the workpiece holder WH with the workpiece S relative to the extractor 58, where the workpiece S may be the electrostatic chuck with elevated pins 59p (FIG. 5), or the showerhead with the gas holes 59d (FIG. 11).

Alignment of gas holes 59d (FIG. 1) of the showerhead S in a plane perpendicular to the direction of the beam B is carried out by moving the workpiece holder WH in the X-Y plane (FIG. 1).

The plasma beam B is focused down to the size that is smaller than the diameter of the gas holes that is less than 0.5 mm. The $Y_2O_3$ vapor carried by the plasma beam B penetrates the gas holes and propagates along the gas holes depositing an amorphous $Y_2O_3$ layer on the inner walls of these holes. In addition, serving as a source of the direct energy, this beam B heats the walls and provides a high temperature for transition of the amorphous $Y_2O_3$ coating into the nanocrystalline one. Besides the deposition and crystallization, the beam B provides fusion of nanocoating into the walls.

Cross section of the hole with the 3D printed $Y_2O_3$ protecting barrier built by the plasma beam B on the inner walls of the hole of the showerhead is shown on the FIG. 11. Although such barrier is designed to prevent erosion of the material of a showerhead caused by the highly corrosive gases such as CF4 and S2F6 injected into the process plasma chamber through these holes for wafer processing, it is subjected to destruction under the effect of thermal and mechanical stresses that are developed after such wafer treatment processes as etching or deposition. Therefore, in order the showerhead could withstand thermal and mechanical stresses, a ceramic-metal interphase, called "cermet" is demanded for the 3D barrier for coalescing with the inner wall.

The quality of a semiconductor product depends on uniformity of plasma-chemical etching and thin-film deposition. Uniformity of the aforementioned processes, in turn, requests uniformity of the processing plasma bulk that requests reducing the size of the gas holes of the showerhead, which is one of key components of the plasma chemical processing equipment. From this point of view, the diameter of the gas holes in the showerhead may have limited sizes. This is because uniformity of the plasma in the processing chamber depends on the uniformity of the process gas that is delivered through the gas holes of the showerhead. Technically, the minimal diameter of such holes cannot be less than 0.35-0.4 mm. On the other hand, the smaller the diameter of a gas hole, the more difficult to coat the inner surface of the hole with a corrosion protection layer, e.g., of $Y_2O_3$.

However, when gas holes are too small in diameter, they become impermeable for the plasma beam B that delivers droplets of vaporized nanoparticles. The abovementioned Debye layer 57 (FIG. 11) clogging the orifice of the plasma gun W and blocking the plasma beam from ejection into the atmosphere, provides the same phenomenon of clogging of the gas holes and hence blocking entrance of the plasma beam B into the gas hole. If in the case of the plasma gun W the layer 57 is maintained and sustained by the electrons shared by the blocked plasma torch 53, in the case of the showerhead this layer is formed because of interaction of the plasma beam B with the surface S, especially with the surface electric field. This field may percolate into the front of the plasma beam B and destroy an equilibrium of the charged species in the plasma beam. In order to resist such influence, the plasma beam B introduces into the Debye layer its own electrons and unfortunately blocks admission of the vaporized particle droplets into the gas holes.

If in the case of the plasma gun such Debye layer is breached by the electric field generated by the bias voltage, especially by the leaking current that results from the parasitic coupling of the Debye layer 57 with the extractor 58, in the case of treatment of the showerhead the same bias concept is used to drag the plasma beam B through the gas holes of a high aspect ratio. To breach this Debye layer, an auxiliary plasma discharge maintained close to the outlet of a gas hole on the backside of the showerhead. The inventors herein called this auxiliary plasma beam dragging mechanism "a booster" and the process "boosting" (see FIG. 11).

Figure 11A:
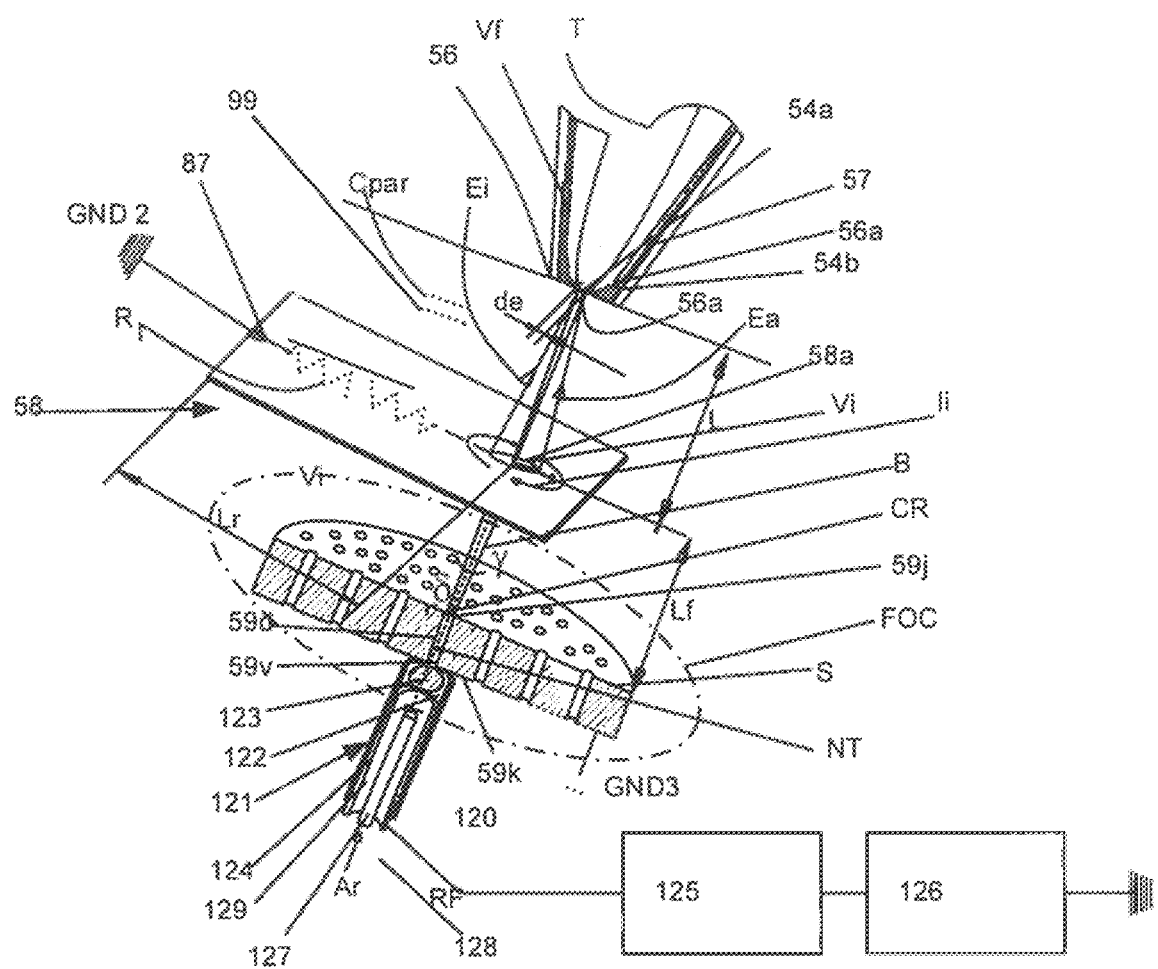
FIG. 11A is a view similar to FIG. 11 but illustrating the position and operation of a booster for enhancing the passage of the plasma beam trough the ultra-narrow gas holes.

In other words, in the case of the gas hole protection coating such a booster positioned under the showerhead serves to enhance the plasma beam penetration into and passing through ultra-narrow gas holes for plasma-chemical corrosion protection of their inner walls, e.g., by the $Y_2O_3$ layer. This booster is shown in FIG. 1 and FIG. 11A, where it is designated by reference numeral 120. FIG. 11A is a view similar to FIG. 11 but showing a booster 120 for enhancing the passage of the plasma beam B trough the ultra-narrow gas holes. As can be seen from these drawings, the plasma-dragging booster 120 is formed by three coaxial tubes. The booster mechanism 120 is pressed against the backside of the showerhead 59k. An outer quartz tube 121 of the mechanism defines a confined space 122 for an auxiliary CCP discharge 123 between the grounded surface 59k of the showerhead S and an intermediate copper tube 124 connected through a matching network 125 to an auxiliary RF generator 126 that powers discharge 123. The discharge gas (argon) 128 is delivered to the space 122 through a central quartz tube 127. The pressure inside the space 122 needed to sustain the discharge 123 is controlled by the mass flow controller (not shown) that provides a flow rate of the discharge gas 123 around 0.6 SLM. The exhausted argon flow 128 is evacuated by the pump (not shown) through the gap 129 between the space 122 and the intermediate copper tube 124.

Although a Debye layer 59l maintained in the vicinity of the inlet 59j of the gas hole 59d blocks all charged species of the plasma beam B from passage through the gas hole 59d, the neutral species NT of the plasma beam B percolate through this layer 59l and propagate through the gas hole 59d approaching to the outlet 89v, as well as to the bias discharge 123 located behind this outlet. The auxiliary discharge 123 sucks the neutral species NT and ionizes them. Thus, the ionized neutral species NT reduce resistance of the inner space and serve as a bridge between the auxiliary discharge 123 and the Debye layer 59l providing the parasitic capacitance inside the gas hole 59d similar to the parasitic capacitor Cpar 99 in the plasma gun W (FIG. 11). Thus, the Debye layer 59l becomes capacitively coupled with the bias discharge 123. Since the bias discharge 123 is powered by the discharge RF generator 126, this generator becomes coupled to the Debye layer 59l.

In other words, n case when the workpiece is a showerhead having gas holes with high-aspect ratio, the capacitive coupling plasma discharge generated by the plasma beam dragging mechanism is aligned with the focusing beam through the gas holes and has a capacitive coupling with the focusing beam, thus assisting penetration of the focusing beam into the high-aspect ratio openings during 3D printing.

If in the beginning of the discharge process the RF generator 126 was discharged to the backside of the showerhead through the auxiliary discharge 123, now it can be discharged to the top side of the showerhead through a displacement current (not shown) which is attracted by the negatively charged Debye layer 59*l*. Thus, the Debye layer 59*l* is compensated by the displacement current similarly to the weakening the Debye layer in the plasma gun W. Such de-blocking of the Debye layer by the bias discharge 123 allows to the plasma beam B to propagate into the gas hole 58*d* and deposit the $Y_2O_3$ layer on its inner wall. Such propagation of the plasma beam B is sustained by the bias RF generator to which the plasma beam B becomes connected after the Debye layer 59*l* disappears. In other words, the booster mechanism 120 (FIG. 11A) at first breaches the Debye layer and then maintains sustaining of the continuity of protective layer deposition on the gas hole walls.

The booster 120 is aligned with the plasma beam B and is maintained beneath the backside of the showerhead S with some clearance between the outer quartz tube 121 and the backside surface of the showerhead S giving an ability to shift the showerhead sidewise for deposition of the coating into the next gas hole. The bias RF generator 126 is turned off during such a relocation. However, after the next hole is aligned with the position of the plasma beam B, the booster is again pressed to the surface of the backside of the showerhead S. The bias generator is turned on for launching a new bias discharge and assume the deposition of $Y_2O_3$ into the new hole.

Figure 20A:
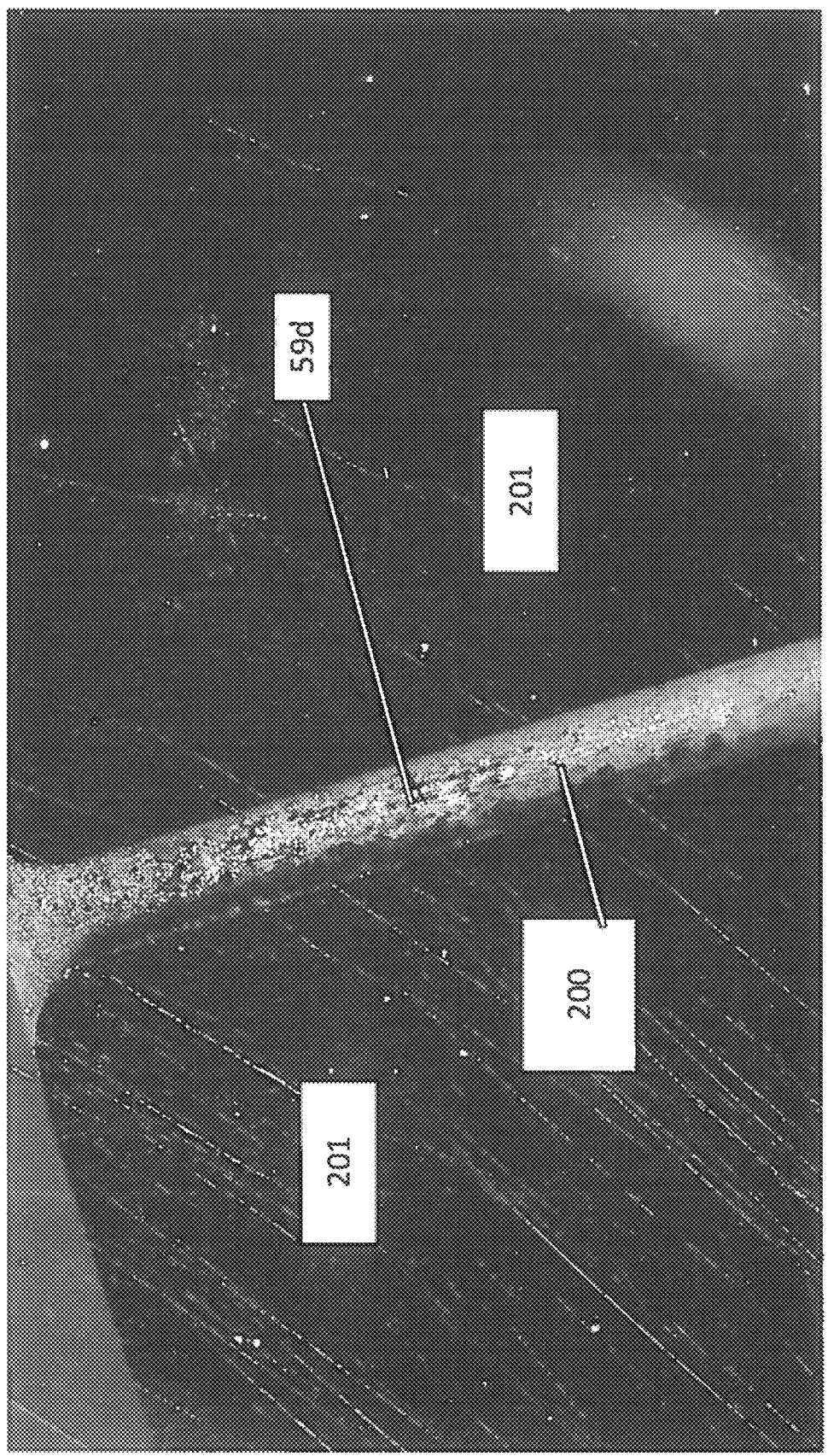
FIG. 20A is a microphotograph of a cross-section through a showerhead gas hole taken with some magnification.
Figure 20B:
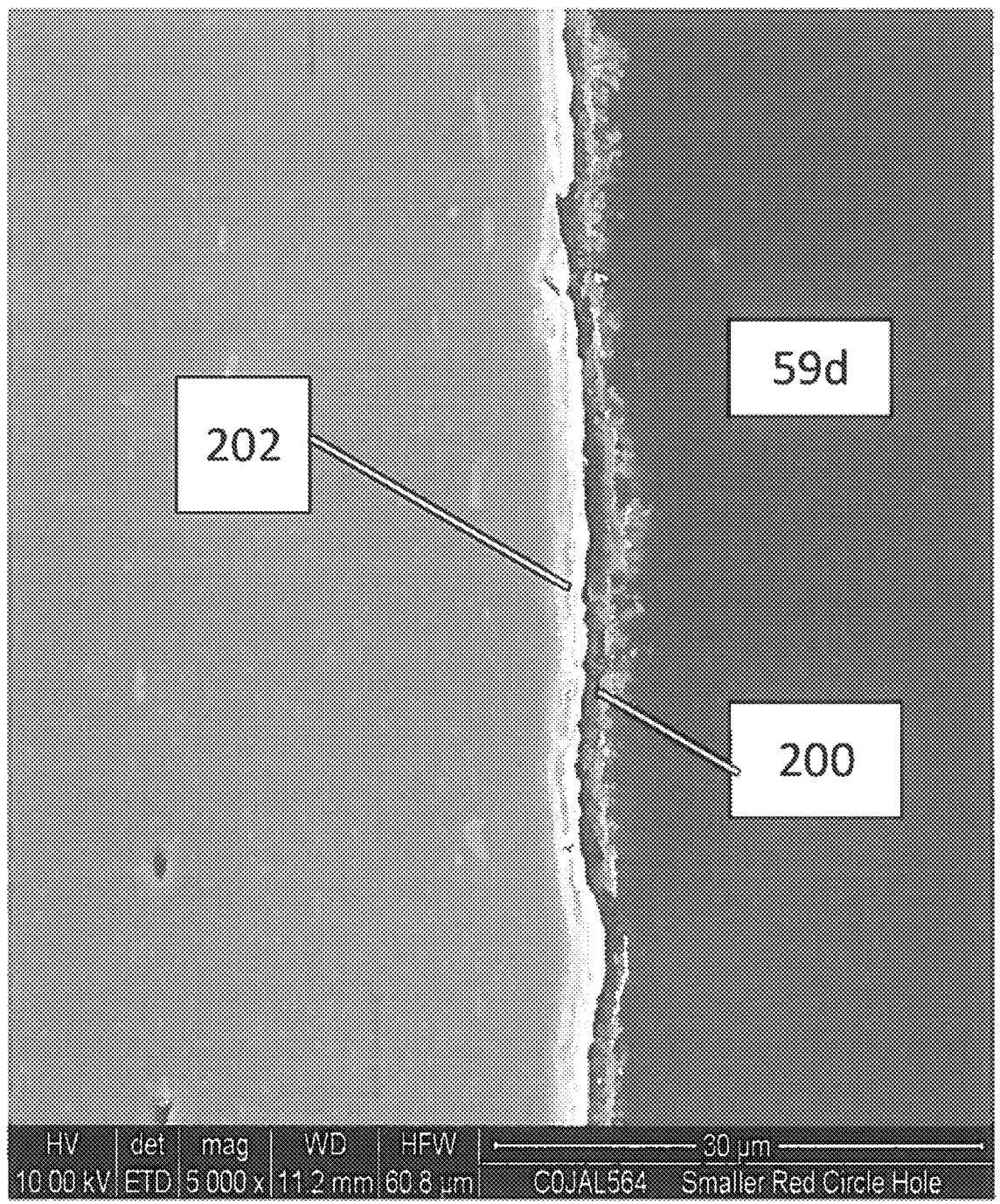
FIG. 20B is a microphotograph, which is similar to one shown in FIG. 20A but taken with a greater magnification.
Figure 20C:
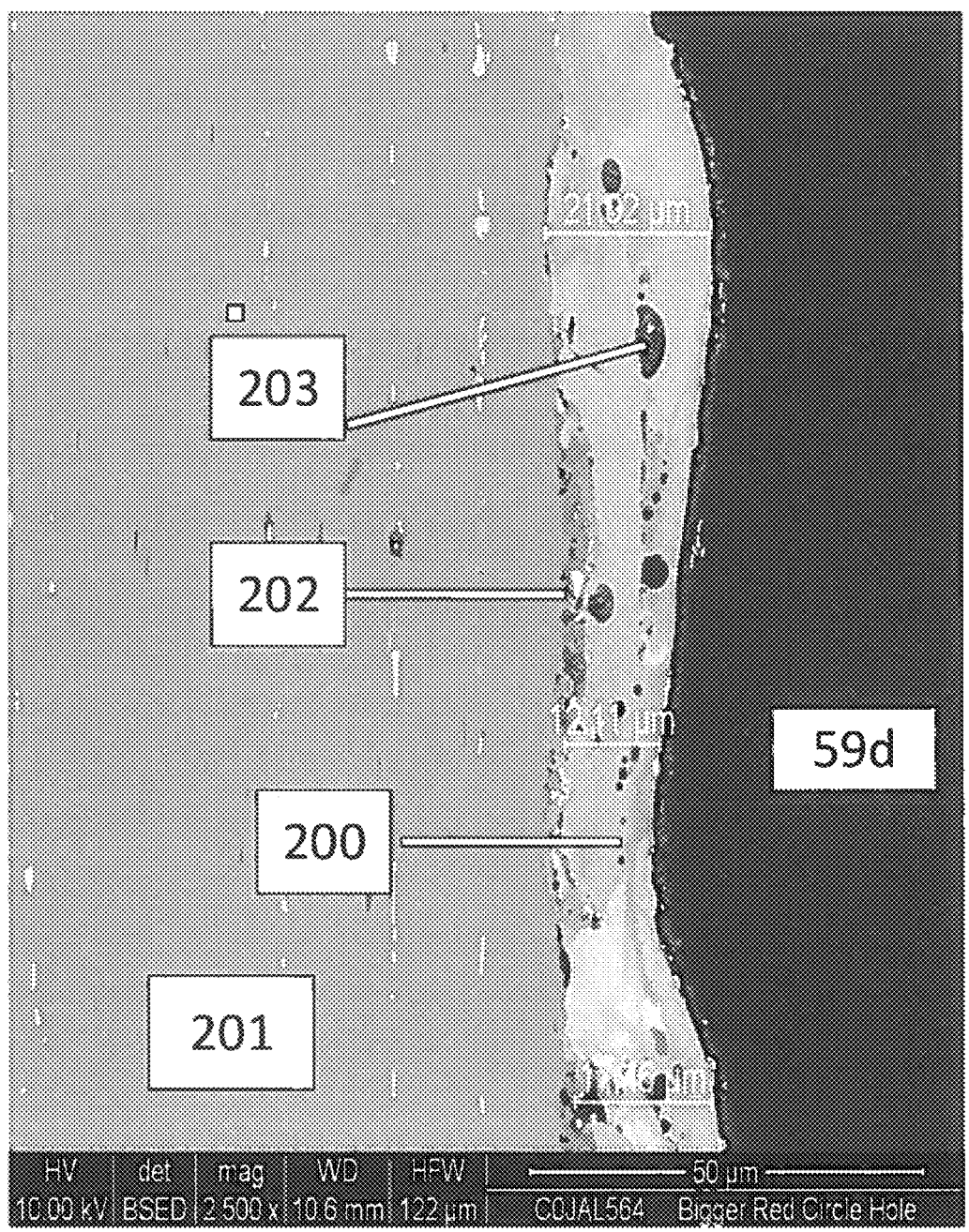
FIG. 20C is a microphotograph, which is similar to one shown in FIG. 20B but taken with further magnification.

FIG. 20A is a microphotograph of a cross-section through a showerhead gas hole 69*d* taken with some magnification, FIG. 20B is a microphotograph, which is similar to one shown in FIG. 20A but taken with a greater magnification, and FIG. 20C is a similar microphotograph but taken with further magnification. In these drawings, reference numeral 59*d* shows a gas hole, reference numeral 200 shows a $Y_2O_3$ coating on the surface of the gas hole 59*d*, reference numeral 201 shows a showerhead material (in this case, aluminum), reference numeral 202 shows cermet, reference numeral 203 shows a blister in the material of the coating 200. The $Y_2O_3$ coating, which can achieve a thickness above 20 μm, is deposited on and fused into the aluminum wall of the gas hole from a $Y_2O_3$ vapor that is carried by the beam B. Without the fusion into the aluminum wall of the hole that follows the deposition, the $Y_2O_3$ coating could be exfoliated under the effect of thermal stresses caused by high-temperature of plasma processes. However, the exfoliation is prevented due to the fact that besides the delivery of the nanomaterials, the same plasma beam B delivers heat with the temperature of up to 1100° C., which is sufficient to provide fusion and develop a cermet layer (Cermet) on the border of the coating with the aluminum wall.

Besides coalescing of the ceramic coating with the metal wall, the 3D plasma-chemical corrosion protection barrier is supposed to have a porosity of less than 1%. It should also be resistant to exfoliation that may contaminate microchip manufacturing. Such exfoliation may be caused by loosed aggregates introduced in the $Y_2O_3$ coating with the beam B contaminated by clusters.

Building the 3D objects like pins on the electrostatic chuck demands from the 3D printer a very high resolution that is achieved with a short focus length. However, some applications request a long focus length.

3D plasma jet may be used for fabrication, e.g., of Solid Oxide Fuel Cells (SOFC) that contain a Ni—YSZ anode of high porosity (up to 50%) and an YSZ deposition layer coated with an electrolyte of high impermeability deposited on the top of the porous anode. Such a process requires the use of the short focal length for 3D building of the anode and the long focal length for deposition of electrolyte. Switching between operations with the short focal length and the long focal length by transferring from one opening of the extractor to another was described above.

Figure 19:
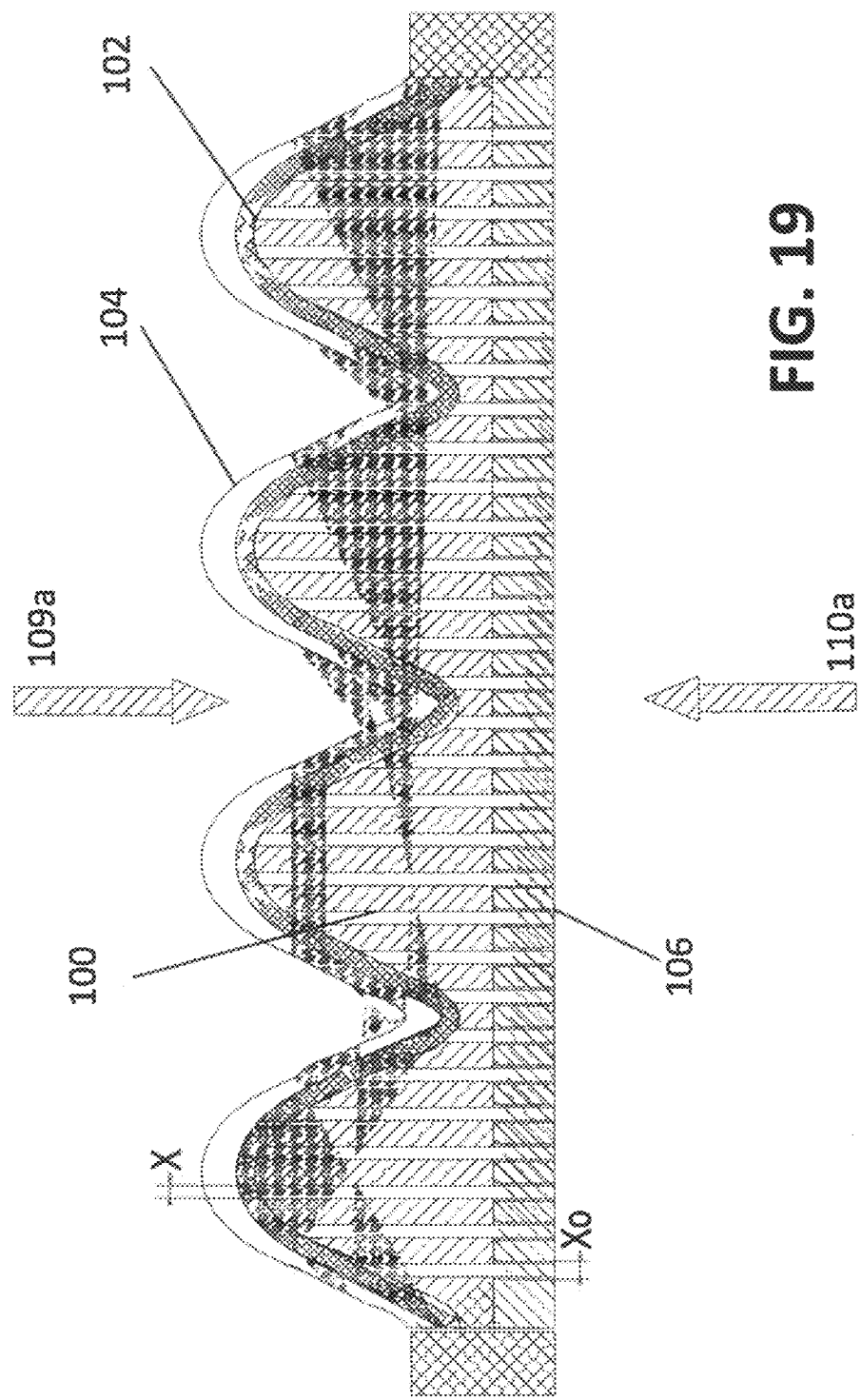
FIG. 19 illustrates fabrication of a porous anode and an impermeable electrolyte of solid oxide fuel cells (SOFCs)

The 3D printing apparatus of the invention using a plasma jet opens a new avenue for many new applications. For example, the key barrier to commercialization of the SOFCs (Solid Oxide Fuel Cells) is a high operation temperature, low specific power density (W/kg), and a volumetric power density (a ratio of the active surface of the SOFCs producing electricity to footprint, $W/cm^3$), which are inherent in the conventional SOFC. A low operation temperature can be achieved by reducing the thickness of an YSZ electrolyte but this is in a contradiction with the porous structure of the Ni—YSZ anode. The above problem can be solved by the 3D apparatus of the invention that can provide 3D printing of the anode with a highly developed surface like surfaces with concentric ridges, or with a honeycomb cells, etc., as well as an oblique deposition of the YSZ electrolyte on the top of such anode. 3D printing of cells with concentric ridges for intermediate temperature operation may increase a volumetric power density above 1 $W/cm^3$ at 660° C. Such large active area per unit volume may be achieved with deposition of the porous anode having a thickness of the ridges about 150 μm that is enough to maintain its mechanical strength and at the same time to provide resistance to a thermal shock and acceptable pressure drop between the fuel and air. Such an architecture is shown in FIG. 19, which illustrates fabrication of a porous anode and an impermeable electrolyte of solid oxide fuel cells (SOFCs), where anode ridges 100 are coated with the YSX electrolyte 102, which in turn, is coated with a sprayed layer of the LSM cathode 104. The anode ridges are built up on the flat surface of a meshed interconnect 106. The crossover CR should be commensurable with the ridges of the anode 111*a*. The upper arrow 109*a* shows a flow of air, and the lower arrow 110*a* shows a flow of fuel. In FIG. 19, diameter $X_0$ shows pore diameter in the meshed interconnect, and diameter X shows pore diameter pore in the anode 111*a*.

The pores in the anode are designed to deliver the fuel to the anode-electrolyte interface where the electro-chemical reactions producing electricity occur. Nickel grains are used as a catalyst for the reactions. The grains should be incorporated in the 3D printing YSZ object near the pores and close to the first layer of the YSZ electrolyte where other participants of the electro-chemical reactions like ions of oxygen are delivered through the electrolyte film from the cathode.

Figure 21:
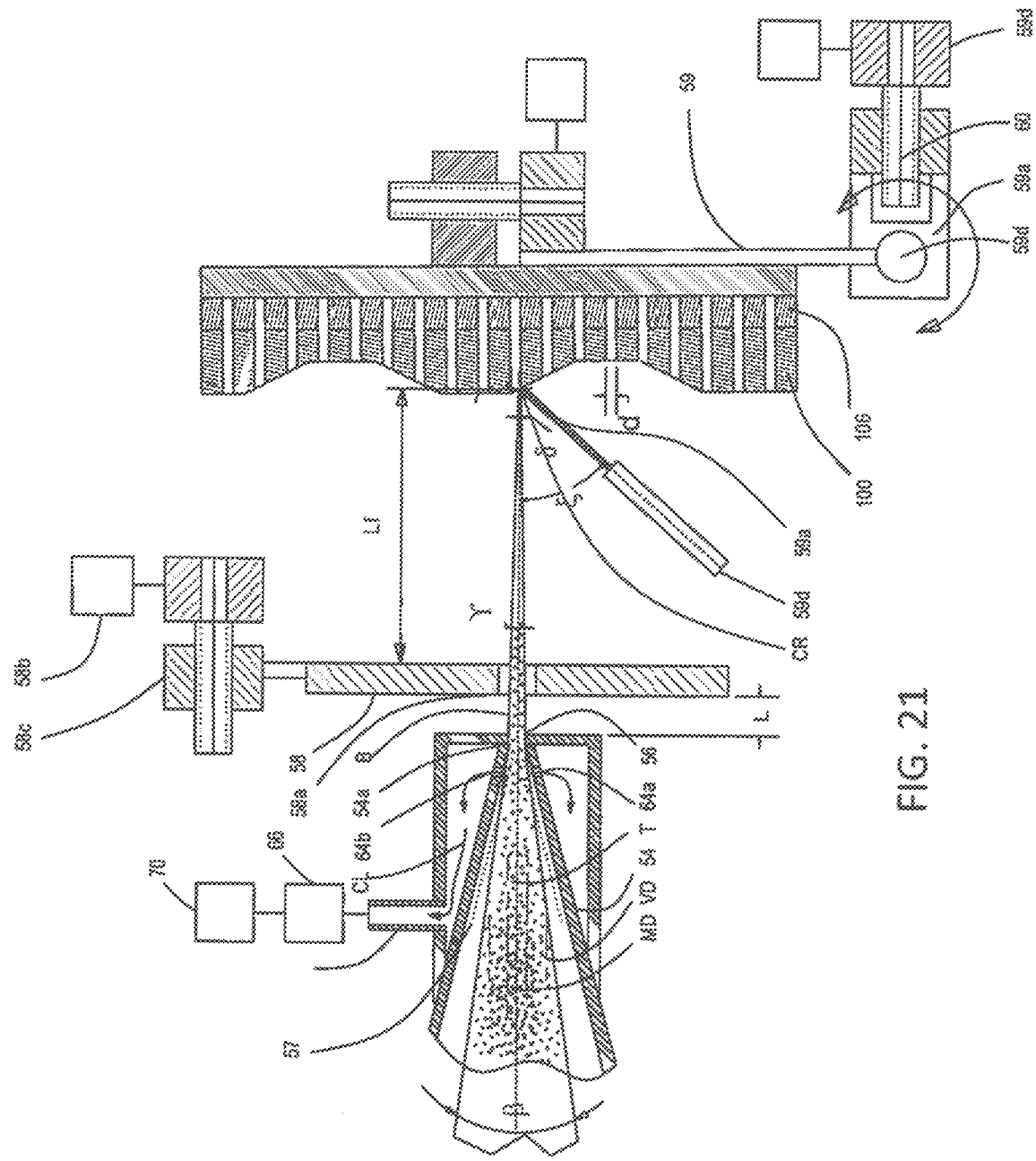
FIG. 21 is a view illustrating a process of 3D printing of ridges of a Ni—YSZ anode on a porous stainless steel interconnect with the apparatus of the invention where the short focal length of the plasma gun W is used.

FIG. 21 is a view illustrating the process of printing of ridges 100 of a Ni—YSZ anode on a porous stainless steel interconnect 106 with the apparatus of the invention where the short focal length of the plasma gun W is used with the 2 mm diameter opening 8*a* in the extractor 58. The pores with diameter X are elevated together with elevation of the 3D object (S) following the distribution of the pores with diameter $\chi_o$ (FIG. 25) in the interconnect 106. These pores should pass through the 3D Ni—YSZ anode 106 and should not be blocked to allow fuel diffusion through the anode.

In order to prevent deposition onto areas of the object S that correspond to positions of the pores of the interconnect 106 (FIG. 19), which should remain unclogged, it is necessary to skip deposition onto a pore by increasing the speed of the workpiece-carrying platform when position of the plasma beam coincides with the position of the pore. In other words, the speed of the work-carrying platform that carries the object S with the aforementioned pores under the beam should be increased. Because the size of pores is around 80-100 μm, high resolution is needed, i.e., in this case it is necessary to use the opening 58*a*1 for short focal length. The structure of the aforementioned anode requires that Ni nanoparticles be embedded in the anode material to serve as centers of the catalytic activity of the cell. Therefore, the flow of Ni nanoparticles with the size in the range of 200 to 300 µm carried by argon are delivered in the area where the 3D YSZ buildup is formed.

Figure 25:
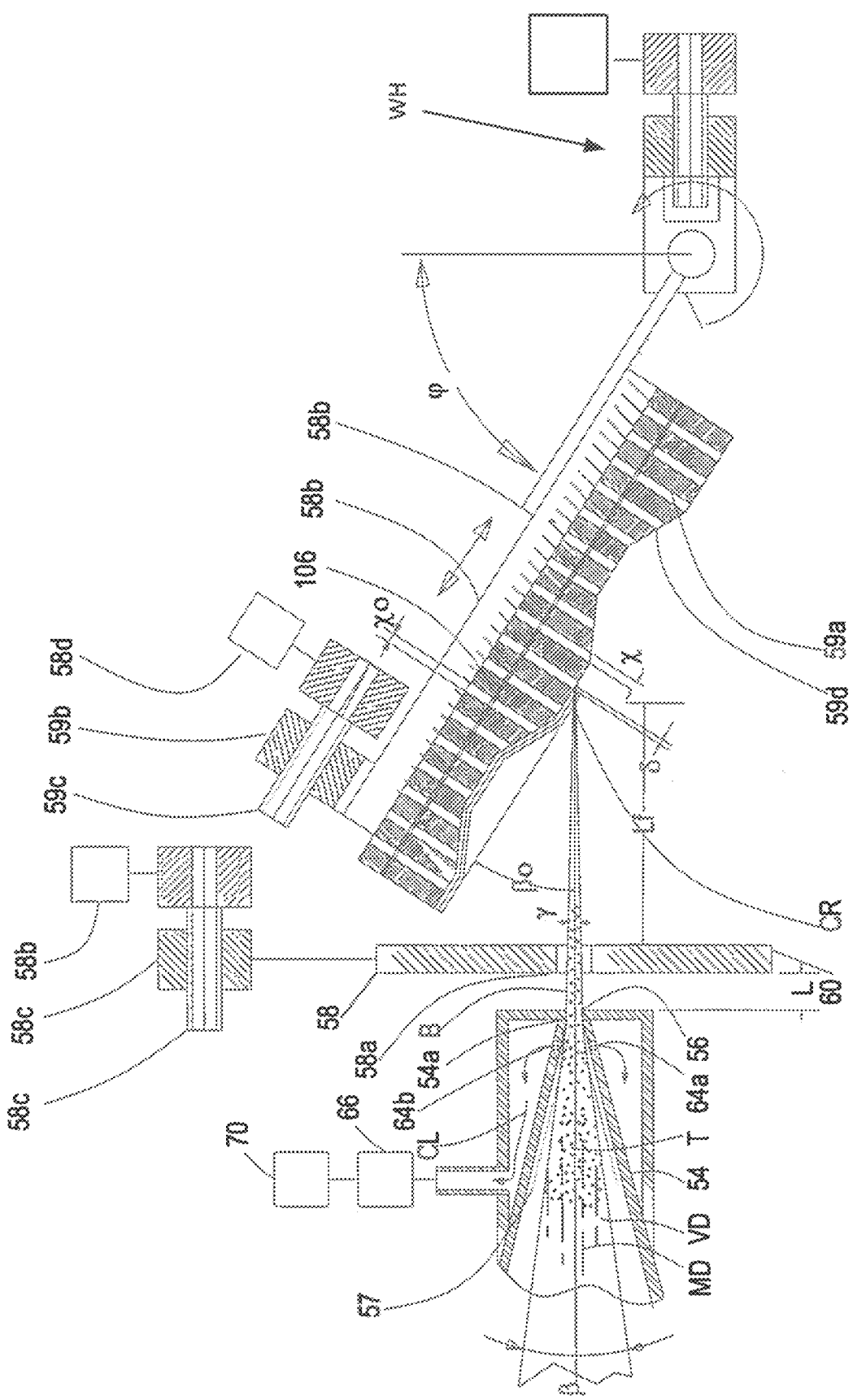
FIG. 25 is a view illustrating the system for 3D printing of the Ni—YSZ anode, where a short focused length is used, and the deposition of the impermeable YSZ electrolyte on the porous Ni—YSZ anode, where the oblique deposition and the long focal length are used.

The process of 3D printing of the YSZ electrolyte is shown in FIG. 25, where the long focal length of the plasma gun W provided by the large opening 58*a* of the extractor 58 is used for the oblique deposition of the impermeable YSZ electrolyte 102 (FIG. 19) in the fabrication of Solid Oxide Fuel Cells.

Figure 24:
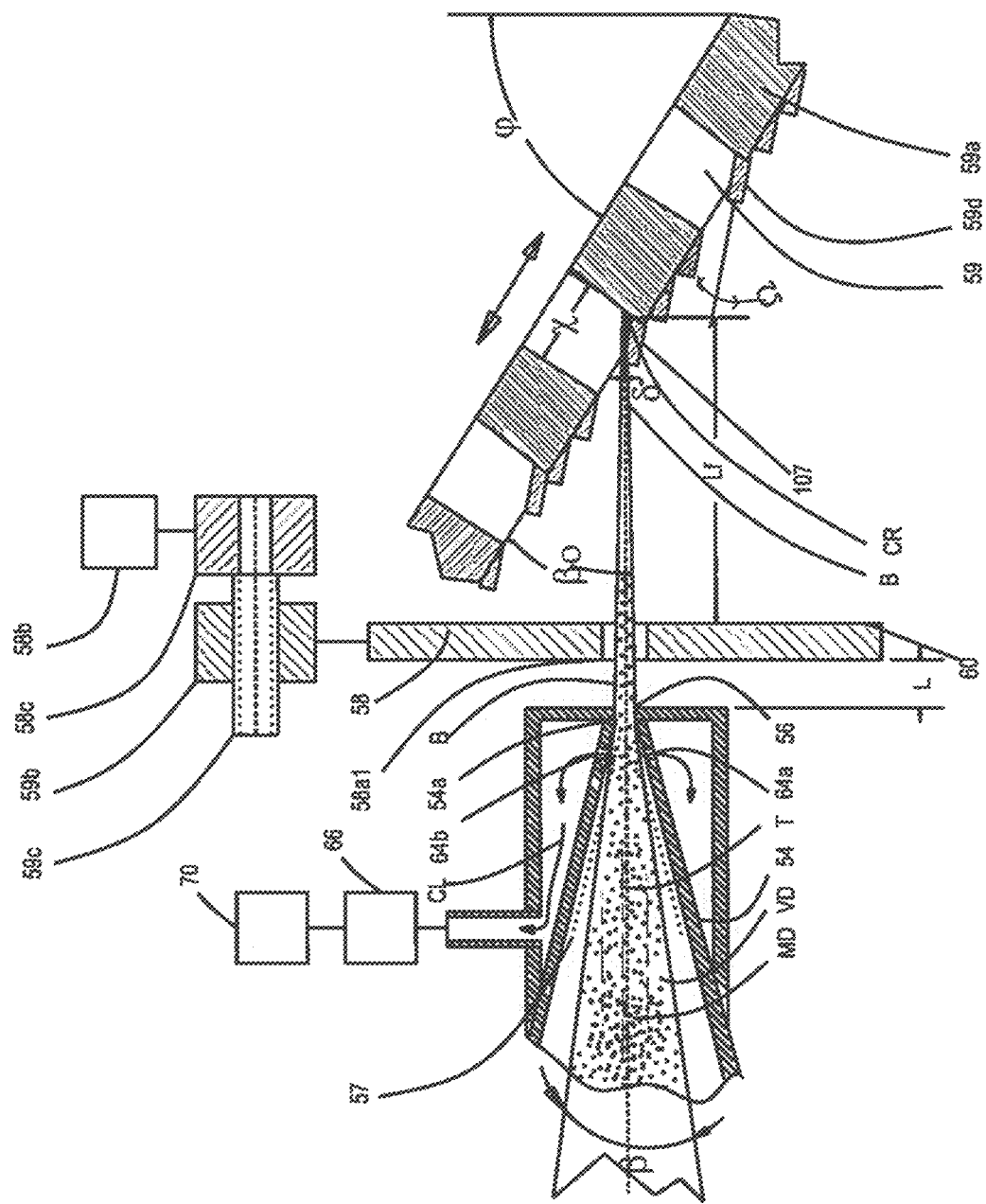
FIG. 24 is a view illustrating a process of an oblique deposition of YSZ with a slanted angle of pores of a Ni—YSZ anode with growing of nanocrystalline layers on these edges.

FIG. 24 is a side view illustrating a process of oblique deposition of YSZ on the right edges of the pores of the Ni—YSZ anode. At the same time, the same beam B performs annealing of the amorphous $Y_2O_3$ layer and building up of the nanocrystalline layer 107 on the edges of the pore at inclination angle Ω. Angle $\beta_0$ shown in FIG. 24 is a critical angle that allows the beam crossover CR to hit the edge of the hole to start growing a microcrystal in the hole bridging direction.

Figure 15:
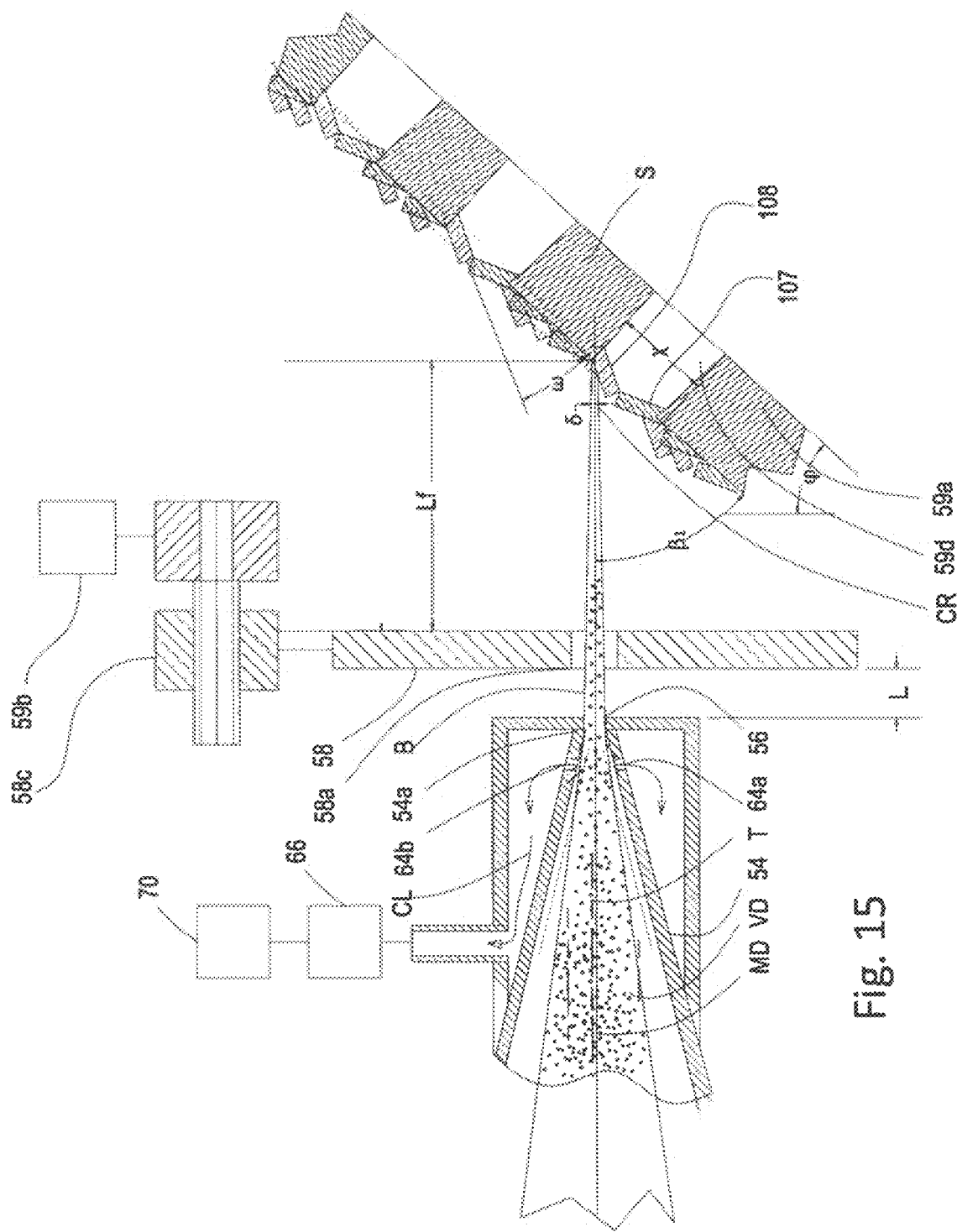
Figure 22:
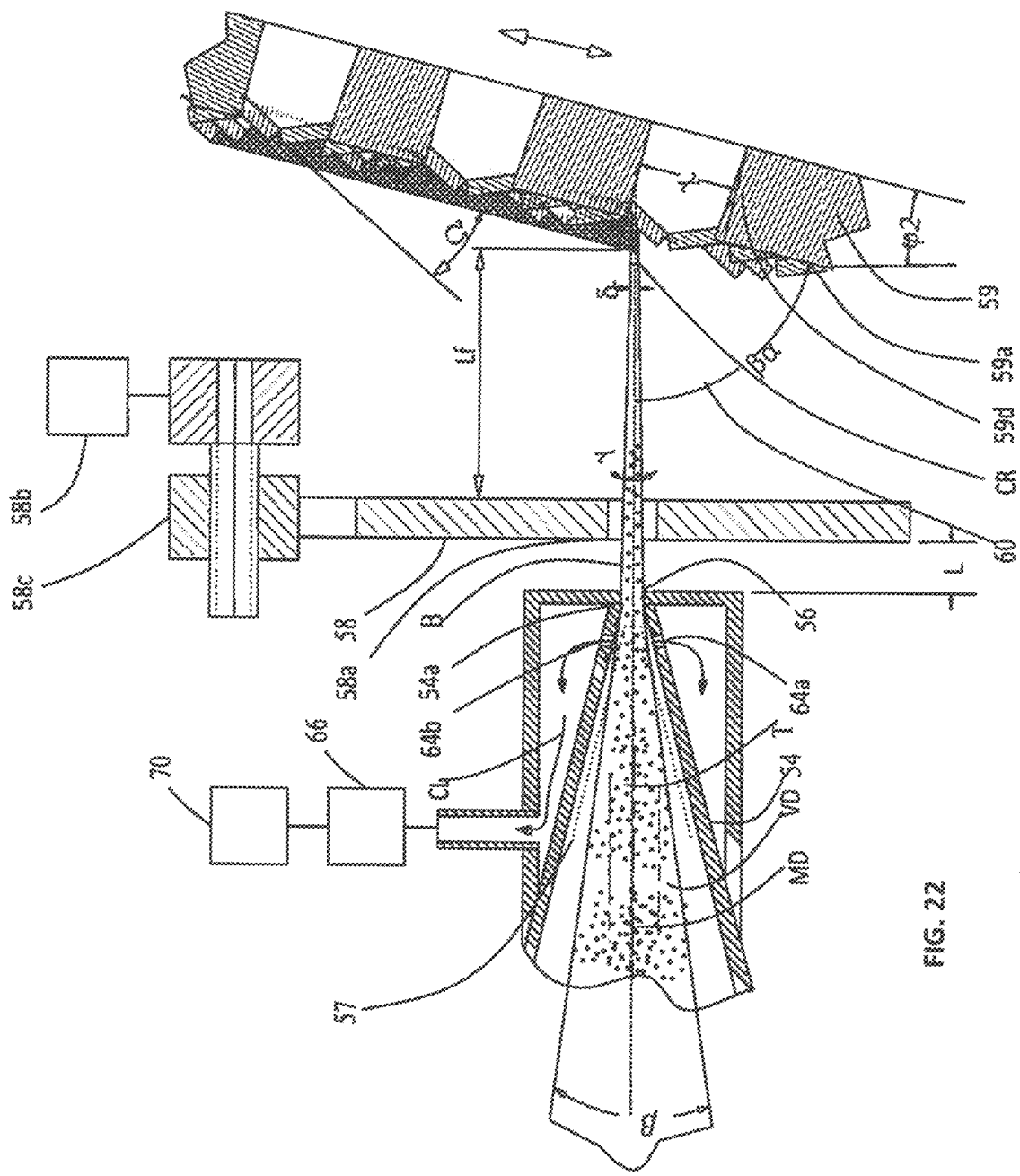
FIG. 22 illustrate a process of the 3D printing continued by forming a reinforcement layer of YSZ, which is deposited on the previous overlapping layer.

Upon completion of the deposition of the YSZ onto the right edges, the next step is deposition onto the left edges of the pores. For this purpose, the workpiece-carrying platform (not shown in this drawing) is turned by 180° together with object S and the procedure is repeated for the deposition onto the left edge (FIG. 15). As a result, a buildup 108 that is inclined in the direction opposite to the inclination of the buildup 107 is formed. As shown in FIG. 15, both buildups for forming a bridge that closes the respective pore are grown. It is understood that although the pore bridging procedure was described only for one pore, it is assumed that during movement of the workpiece all pores are closed in the same manner. In order to utilize universality of the 3D printer of the invention to full extent, it is necessary to use a workpiece-carrying device that is able to orient the treated surfaces of the object S at different angles and in different positions. As has been mentioned above, such a device should possess at least five degrees of freedom, i.e., movement in the Z-axis direction, movement in the X- and Y-axes directions, tilting at different angles, and rotation around axis Z. The process of the 3D printing shown in FIG. 22 is continued by forming a reinforcement layer of YSZ, which is deposited on the previous overlapping layer 110. This can be done at an angle normal to the plasma beam, i.e., without inclination of the workpiece S.

The process of manufacturing of SOFCs is finalized by coating the product with a $Li_2MnSiO_4$ (LMS) cathode material by a spinning process (which is not shown and performed on a different apparatus).

Thickness of the deposited ion-conductive YSZ electrolyte 102 (FIG. 16) should be around several microns to provide a low-temperature (less than 600° C.) diffusion of the oxygen ions through this electrolyte. Overlapping the pores of the anode without their blocking in order to reach impermeability of electrolyte and, simultaneously, maintaining the high rate of fuel (methane) can be achieved using oblique deposition of the YSZ vapor on the surface of the anode. The plasma beam B should be directed to the anode surface at an angle ν of 16° or less.

Figure 23:
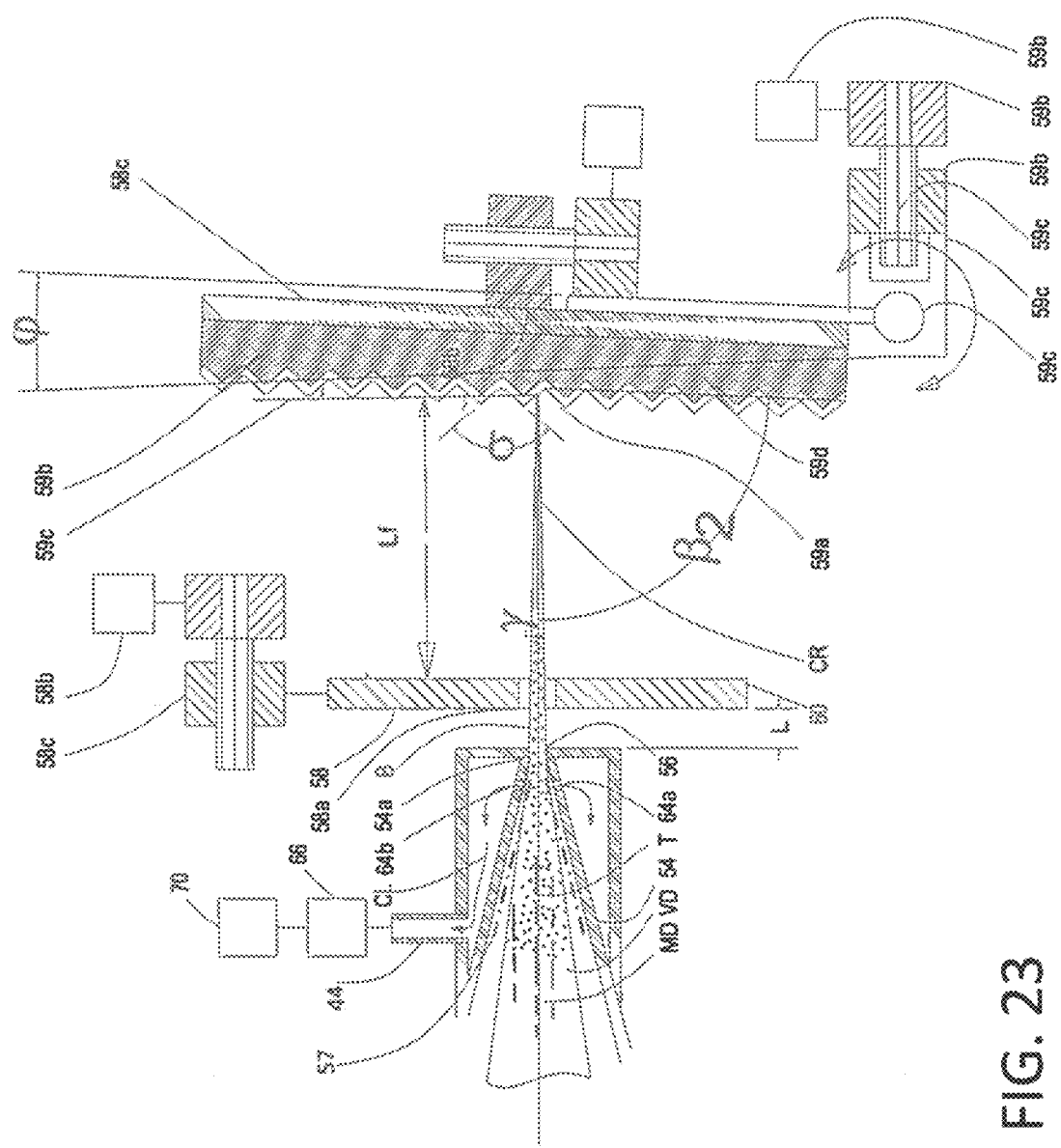
FIG. 23 is a view illustrating tilting of a workpiece platform for slanting orientation of the object relative to the direction of the plasma beam B by the tilting mechanism of the workpiece holder.

Tilting of the workpiece platform for slanting orientation of the object S relative to the direction of the plasma beam B is provided by the tilting mechanism 109 (FIG. 23).

The opening 58*a* for the high-resolution 3D printer should be around 1.5 mm to provide the 1.5-2 mm-long focus length. However, such a specific application as 3D printing of the YSZ electrolytes of the SOFCs requires the use of a wider opening of the extractor 58. Reducing the opening 58*a* to less than 1 mm will lead to melting of the coper extractor 58 by the plasma beam and to contamination of the 3D object. On the other hand, increasing of the opening 58*a* will lead to the losses of the extracting function of the extractor 58 and to locking of the plasma beam B.

The next objective is to find a critical oblique angle for overlapping the pores by redirecting the growth of the YSZ crystals from the normal to the inclined one. Thus, the deposition and the subsequent post-deposition annealing by the scanning plasma beam B will provide impermeability of the YSZ electrolyte. Growth of the crystals of YSZ in a lateral direction is provided by the plasma beam with a low convergent angle □□□and a tilt mechanism 109 of a workpiece-carrying mechanism with a controlled inclination angle β1 for overlapping the pores. The YSZ layers are grown on the nuclei at the pore edges up to the columnar structures.

If the fabrication of the SOFCs requests the use of the short and long focal lengths of the plasma gun W with the tilts, the fabrication of the hetero-junction tandem (HJT) solar cells requests the use of long focal length only but with the variable tilts.

The HJT solar cells have a potential to outperform traditional technologies in terms of electricity cost due to a light-management architecture based on the established pyramidal texturing of crystalline silicon wafers. Such light-trapping architecture allows achieving high efficiency that typically reach 23-24% and more. However, such three-dimensional structures as the textured wafers hinder deposition of the highly conformal and uniform amorphous silicon thin films requested for such high performance. Nowadays, an appropriate step coverage ("conformal coverage") and complete filling of spaces can be achieved by employing a high-vacuum Pulsed Laser Deposition (PLD) where a wafer is exposed to the silicon vapor flow formed from material of a silicon target subjected to the laser beam. This allows delivering the vapor of silicon to different areas of the shape such as peeks, slops, and valleys by controlling uniformity of layer thickness by changing the angle of the laser beam relative to the surface being coated and frequency of laser pulsing.

Figure 17:
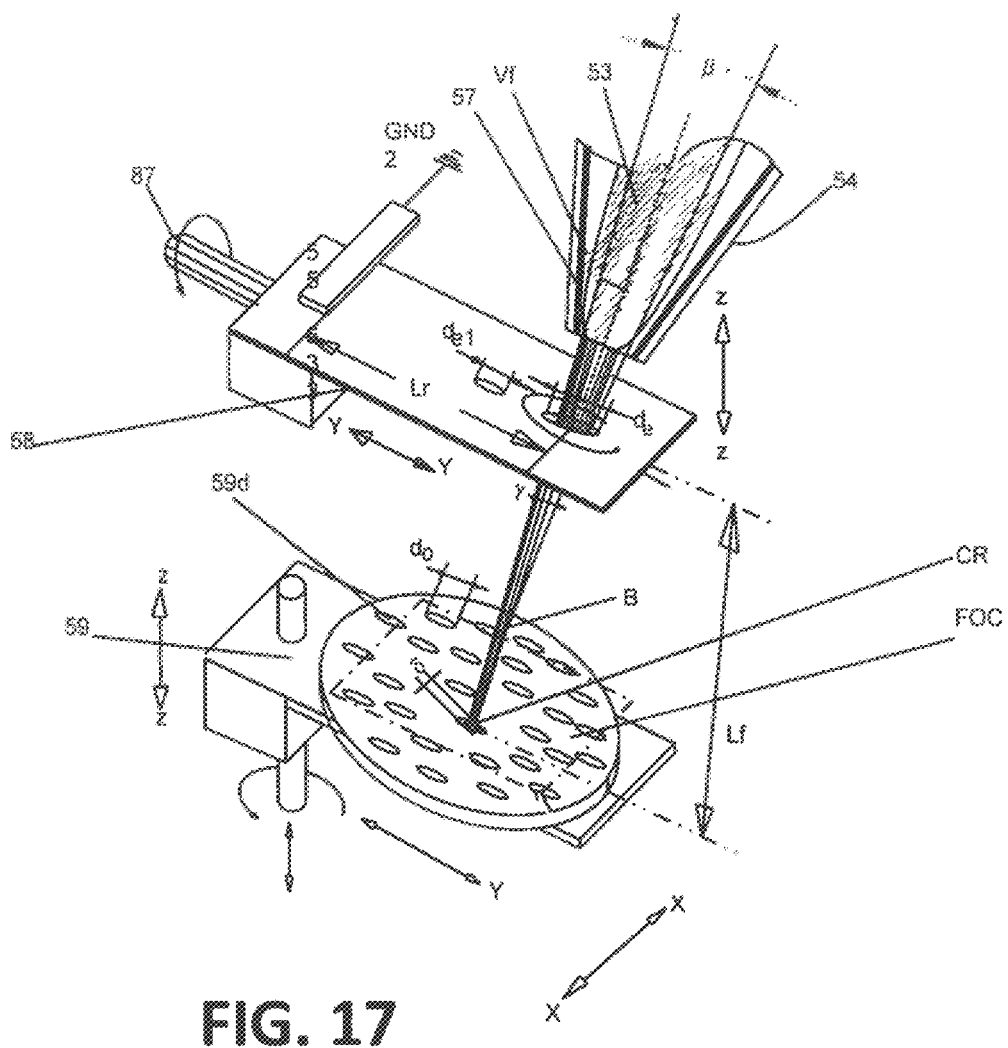
FIG. 17 is a view similar to FIG. 5 but illustrating 3D printer coating of inner walls in the showerhead holes.
Figure 17A:
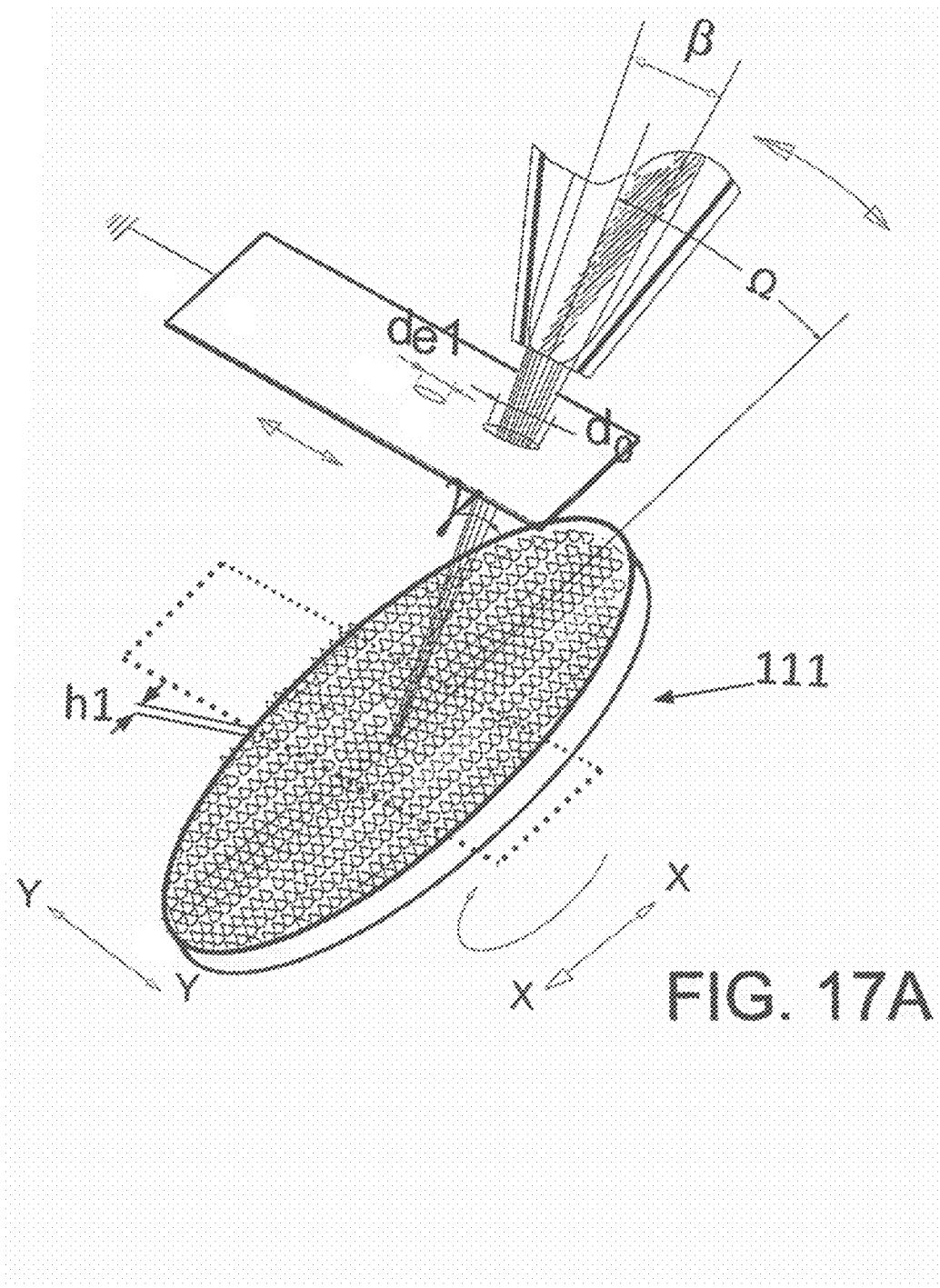
FIG. 17A illustrates a silicon wafer with a textured surface textured with pyramids.

FIG. 17A illustrates a silicon wafer S with a textured surface 111 textured with pyramids having prior to treatment the size hl of around 10 µm.

The above-described conventional low-productive and expensive high-vacuum method increases the manufacturing cost of solar cells. The authors propose to replace the PLD method with the laser vaporizing system of the invention by using the focused plasma beam B that delivers a silicon vapor generated by vaporization of the silicon nanoparticles on the surfaces of the pyramidal parts of the product surface. The uniformity of thickness of the silicon films is controlled by changing the tilting angle of the plasma beam relative to the treated surface and controlling the speed of the mechanical motion of the wafer.

FIG. 17 is a view similar to FIG. 5 but illustrating 3D printer coating of inner walls in the showerhead holes. FIG. 15 is a view illustrating the process of the oblique deposition of YSZ on the left edges the pores of the Ni—YSZ anode with growth of the nanocrystalline on these edges with a slanted angle and overlapping the pores of the Ni—YSZ electrolyte from both edges of the pores.

FIG. 24 is a view illustrating a process of an oblique deposition of YSZ with a slanted angle of pores of a Ni—YSZ anode with growing of nanocrystalline layers on these edges.

To provide the same deposition onto the textures surface of the hetero-junction tandem (HJT) solar cells (FIG. 18), it is advantageous to use the 3D printer of the invention, which operates at atmospheric pressure. In this case, the silicon nanopowder is chosen as a precursor, and the short-focusing opening 58*al* of the extractor 58 is chosen for a high resolution. The oscillation angle φ (FIG. 18) of the plasma beam delivering the silicon vapor is chosen in range −5 to +5 degree.

The tilting oscillation of the workpiece-carrying platform synchronized with the topology of the pyramidally textured object S exposed to the plasma beam B is needed to deposit conformably the uniform amorphous silicon layer on this highly textured surface avoiding melting of the sharp peaks by the high-temperature plasma beam B. Therefore, 3D printing of the amorphous silicon layer by the plasma beam B with the tilting oscillation of the platform is a cost-effective alternative to the expensive Atomic Layer Deposition (ALD) and PLD methods that are inferior to the method of the invention that allows accommodating the complicated profiles of the light-trapping surface of the silicon wafer.

As mentioned above, admission of commercial nanoparticles into the bottom plasma-confinement tube 41 should be carried out at some preconditions, and one of these preconditions is the size of the commercial nanoparticles. The certified nanoparticles produced by the sol-gel technology have an original size of 20 nm. However, during storage, shipping and delivery to the high temperature plasma for vaporization some of the particles stick together and form clusters. Vaporization of clusters requires a sufficient amount of RF energy and the use of expensive high-power RF power generators that are not affordable for 3D printing.

Figure 3:
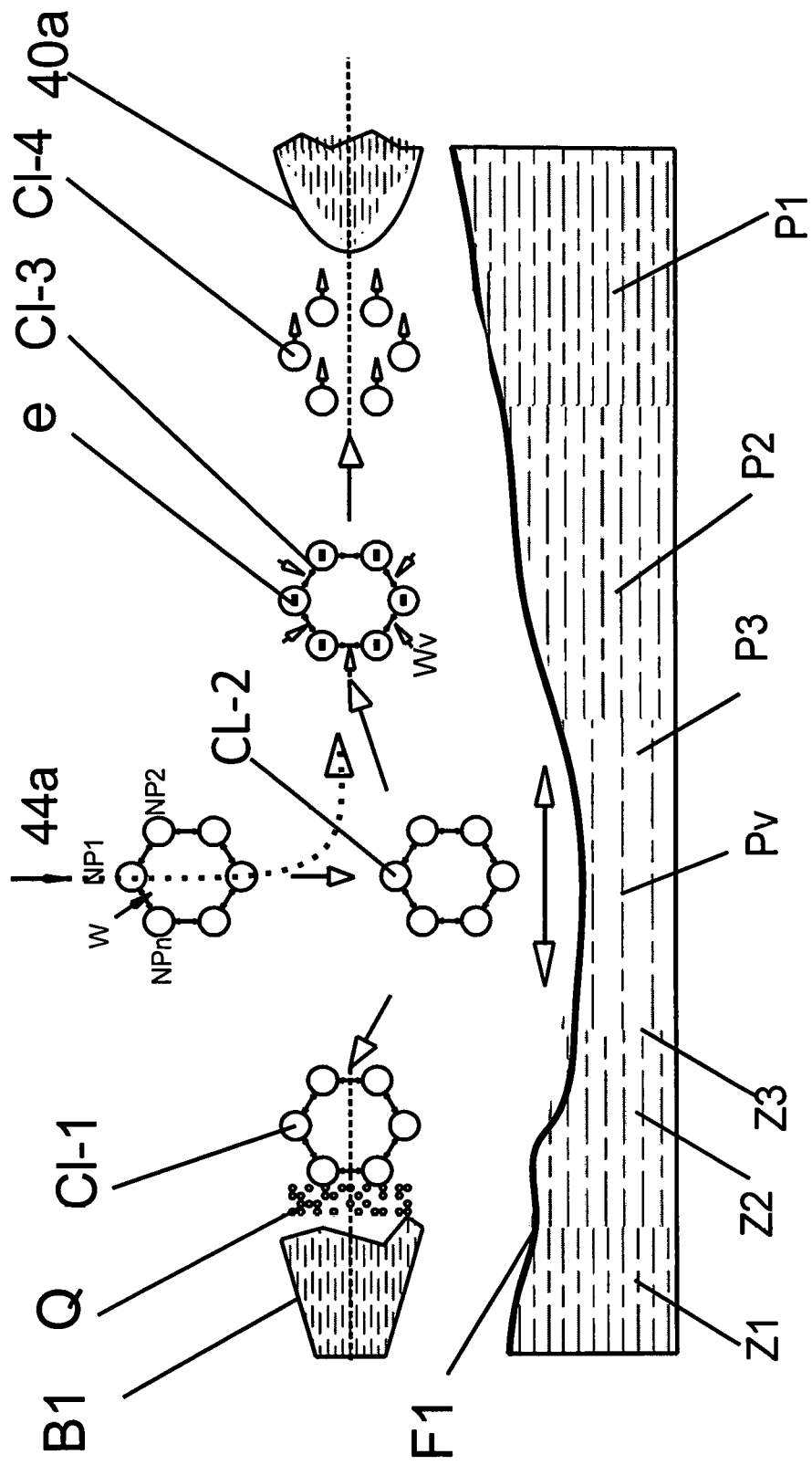
FIG. 3 is a model view illustrating a cluster deterioration process that occurs in the bouncing portion of a bouncing tube used in the atmospheric-pressure ICP generator of FIG. 1.

Given below is a description of the cluster breaking process that occurs inside the bouncing portion 38*b* of the bouncing tube 32 (see FIG. 3, which is a longitudinal model view of the bouncing process).

A cluster CL is an assembly with a few members of nanoparticles NP1, NP2, . . . NPn held together by Van der Waals forces VW (FIG. 13). As was mentioned above, such assemblies jeopardize nanocoating because of their exfoliation. The 3D printer of the invention solves this problem by breaking the clusters in the bouncing tube. Breaching of the Van der Waals forces combining nanoparticles in clusters should be provided before their injection into the high temperature plasma. Electric forces capable of annihilating the Van der Waals forces and breaching the relations between the members of the assembly should be generated by the charged members of the assembly. The clusters CL should be bombarded by the negative species Q of the plasma beam B1 and obtain multiple charges during such bombardment. After distribution of charges inside the assembly, each charged member of the assembly can break such relations with other members and liberate itself.

A complete multiple charging of clusters can be achieved during a multi-pass movement such as bouncing of these clusters in the flow of the charging species Q. Due to bouncing, the cluster CL can be many times exposed to the stream of the charged species Q. The bouncing is provided by provision of a pressure gradient near the axis of the bouncing tube 32. This gradient results from the natural dissipation caused by divergence of the plasma beam B1 (FIG. 2). Conventionally, the axial distribution of the pressure along the axis of the bouncing tube can be divided into a zone Z1 with high pressure, zone with a moderate pressure Z2, and a zone Z3 with the lowest pressure (FIG. 3A).

Such a pressure drop developed by dissipation of the top plasma beam B1 is counteracted by the gradient of the backpressure developed by the highly pressurized bottom plasma discharge 40*a* in the confinement tube 41, especially by the natural dissipation of the backpressure in the opposite direction controlled by the size of orifice 48*a* in the insert 48 (FIG. 2). As mentioned above, the backpressure distribution is produced by the backpressure of the bottom discharge 40*a* penetrating the orifice 48*a* of the insert 48 in the exit of the bouncing tube 32. Serving as a diaphragm, this hole controls dissipation of the backpressure along the bouncing tube 32. Such dissipation can be conventionally divided into the high-pressure zone P1 in the vicinity of the orifice 48*a*, a moderate backpressure zone P2 at some distance from the orifice 48*a*, which is equal to 3 dd, and a low-pressure zone P3 at a certain distance from the opening 48*a* equal to about ten diameters of the opening 48*a* (FIG. 3).

Superposition of the two pressure drops generated by the natural pressure dissipation of the beam B1 and the backpressure of the bottom discharge 40*a* develops a pressure valley PV (shown in FIG. 3) in the axial direction of the bouncing tube 32. Injection of nanoparticles NP and clusters CL is provided exactly into the lowest pressure zone at the pressure valley PV between the zones Z3 and P3. The initial speed of the clusters CL and nanoparticles NP is controlled by the flow rate of the carrier gas 44*a*. This rate is adjusted for nanoparticles NP with a size less than 20 nm and with a relatively low aerodynamic resistance. The aerodynamic resistance allows them to overcome the backpressure in the zones P2 and P1 and penetrate the orifice 48*a* for injection into the bottom plasma discharge 40*a*. Pre-selected clusters CL labeled as CL1 are delivered by the carrier gas also into the selecting area PV. However, their high aerodynamic resistance slows down their motion to the orifice 48*a* for entering the bottom discharge 40*a*. Moving against the backpressure and losing their speed down to zero, the clusters are pushed back by the backpressure. Receiving such momentum in the opposite direction, the clusters pass the valley PV. Moreover, the backpressure accelerates the clusters to continue their motion against the plasma beam B1. Pushed forward again by the pressure from the side of the plasma beam B1, they are organized in the packets of the bouncing clusters CL. At some equilibrium, the pressure gradients are established to provide admission of the light nanoparticles NP with size of 20 nm or less and passage thereof through the opening 48*a* into the bottom confinement tube, while the pre-selected clusters CL1 are returned back into the cavity of the bouncing tube 32. Conditions for such automatic selection are provided by tuning several variables such as the RF power of the coil inductor 28 (FIG. 2) responsible for the top discharge 37, the RF power applied to the saddle antenna 30 responsible for the bottom discharge 40*a* pressure, and the size of the hole 48*a* of the insert 48. The flow rate of the carrier gas 44*a* also has to be adjusted to tune the aforementioned equilibrium. If this rate is lower than some threshold, the backpressure of the bottom discharge 40*a* will block the passage of the light nanoparticles NP. On other hand, the supply of the carrier gas in the direction of arrow 44*a* (FIG. 2) with a flow rate that exceeds the threshold may cool and extinguish the bottom plasma discharge 40*a*. The clusters CL that are not admitted to pass the orifice 48*a* of the insert 48 (FIG. 2) should be subject to multiple bouncing or oscillations. The clusters CL bouncing between both pressure drops near the pressure valley PV move against the stream of the species Q of the plasma beam B1. They are subjected to bombardment by the negatively charged species Q that charge them negatively. Large clusters, repelled by the backpressure of the bottom discharge and by the forward pressure of the plasma stream, oscillate in the area of the pressure valley PV and intercept electrons carried by the plasma stream B1. These electrons are deposited onto the surface of each member of the bouncing cluster. The negative charge is immediately shared between all members of the cluster assembly. (Negatively charged clusters are labeled CL2). Each member of the assembly receiving the individual negative charge repels the neighboring member due to the electric forces EF. The electric forces EF annihilate the Van der Walls bonds. As a result, the cluster CL can be broken into a plurality of single nanoparticles NP having a low aerodynamic resistance (broken clusters are labeled CL3). Such aerodynamic resistance together with the force of the carrier gas provides separation according to the size and allows to the new-born nanoparticles with the size lesser then 20 nm to exit the bouncing tube 32 and pass through the zones P1, P2 and P3 on their way to the high-temperature area of the bottom torch 40a and eventually to enter the bottom confinement tube 41 (FIGS. 1 and 2).

Melting Point Depression (MPD)

As was mentioned above, the MPD phenomenon is used in this plasma beam to minimize the RF power required for functioning of the beam, improve cost-efficiency, and increase lifetime of the apparatus by reducing thermal loads. Therefore, besides other functions, the top plasma beam B1 serves as a source of thermal energy, a provider of the pressure gradient in the bouncing tube 32 for the cluster bouncing, and a source of the negatively charged species that bombard clusters CL to charge them and break into nanoparticles with the size less than 20 nm. Thus, during oscillation in the bouncing tube 32 (FIG. 2) and penetration into the aforementioned zones, each nanoparticle NP receives from the top torch B1 a thermal energy needed for melting in the fly and sufficient for the preheating up to the temperature of 600° C. At such temperature, the shells SH of the individual nanoparticles NP are liquefied in the fly (FIG. 12). Nanoparticles NP are characterized by specific surface energy SF directed to its core. If the size of the particle NP is less than 20 nm, decrease in the nanoparticle size due to liquefaction of the shell SH leads to increase of the surface energy in each nanoparticle NP above the critical value, and this further facilitates particle melting. Such facilitation is explained by the increase of enthalpy of the nanoparticle NP, which becomes susceptible to total melting under conditions of the phenomenon of Melting Point Depression (MPD) in the subsequent high temperature plasma. The melted shell SH helps to propagate heat in the high temperature area of the bottom plasma discharge 40a and to reduce the size of the solid core until such core can be totally consumed by the heat facilitated by the inner surface energy SF. Such a phenomenon of the Melting Pressure Depression explains the complete melting and conversion of the solid nanoparticle NP into a melted droplet MD at a reduced RF power and the reduced resident time in the high-temperature area of the bottom plasma discharge 40a. Therefore, the less-expensive low-power RF generators as well as the air-cooling of the total plasma beam generator can be used. However, some surplus of the RF power is still needed in order to convert the melted droplets MD originated from the pre-melted nanoparticles in the vaporized droplets VD.

The plasma beam B which is extracted from the nozzle 54 is then focused on the surface of the object being treated (object S) by the extractor mechanism as has been described above with respective motions of the extractor and the object. Finally, in an attempt to minimize the deposition spot, it is important to provide a flow rate of argon around 4 SLM and the RF power of up to 1.3 kW at frequency 13.586 MHz. Exceeding these values leads to diffusion of the crossover.

Thus, it has been shown that the present invention provides a plasma beam jet for use in the additive technology to manufacture and process various parts and devices with application of plasma technology in open air. Such above-mentioned processes as elevation of the pins of the 3D electrostatic chucks, deep elevation of the plasma-chemical corrosion barrier for the gas holes of the showerheads, and building thin impermeable electrolyte films on the porous structures for SOFCs can be suitable for other applications as well. The proposed vacuum-less technology allows 3D printing of large objects. The 3D printer of the invention that utilizes a plasma beam may find use in 3D printing manufacturing of such object as, e.g., ceramic parts, surgery implants, and solid oxide fuel cells, etc.

Although the invention has been described in various specific embodiments shown in the attached drawings, it is understood that these embodiments were given only as examples and that various changes and modifications are possible within the scope of the attached claims. For example, the apparatus of the invention may be used in fields other than those mentioned in the specification. The nozzle shape and geometry may be different from those shown in the drawings. Gases other than argon and hydrogen can be used in the system for the same function. Nanoparticles also can be selected in a wide range depending on a specific purpose of the coatings. The plasma beam B generated by the device of the invention may also be used for the precise thermal treatment like fine annealing, sintering, etc.

What we claim is:

1. A 3D printing apparatus using a beam of an atmospheric pressure inductively coupled plasma beam generator, the apparatus being intended for building up a precursor material on a surface of a workpiece being treated, the apparatus comprising:

a first plasma beam generator operating on a first AC frequency and generating a first plasma beam, the first plasma beam generator comprising: a first housing having a first end and a second end; a first coil inductor wound around the first housing and connected to a first power generator operating on the first AC frequency: the first housing having a first supply port for admission of a carrier gas into the first end of the first housing;

a second plasma beam generator generating a second plasma beam from a plasma discharge; the second plasma generator comprising: a second housing that has a surface; a second coil inductor, which operates on a second frequency and comprises a saddle antenna consisting of a first semi-cylindrical antenna branch and a second semi-cylindrical antenna branch that encompass the second housing, the first semi-cylindrical antenna branch and the second semi-cylindrical antenna branch being connected in parallel to each other through a bridge circuit for reducing/eliminating a potential drop between the first branch and the second branch and the second discharge;

a bouncing tube having one end communicating with the first housing for receiving the first plasma beam and a second end, which communicates with the second housing, the bouncing tube having a second supply port for supplying precursor nanoparticles into the bouncing tube together with a second carrier gas, the bouncing tube being intended for sorting the precursor nanoparticles and for admitting the precursor nanoparticles only of a size, which is smaller than a predetermined size into the plasma discharge, which occurs in the second housing;

an intermediate housing that has an interior, sealingly embraces the bouncing tube and is encompassed by the first end of the second housing with a first gap;

a third supply port for supplying a plasma discharge gas into the second housing via the interior of the intermediate housing for generating the plasma discharge;

a tapered nozzle formed on the second end of the second housing for emitting the second plasma beam formed in the second housing, the tapered nozzle having a nozzle outlet orifice;

a workpiece holder for holding a workpiece during treatment, the workpiece holder having five degrees of freedom for orientation of the workpiece relative to a plasma beam that exits from the nozzle outlet orifice; and a self-biased plasma gun for generating a focusing plasma beam that forms a crossover on the workpiece, the self-biased plasma gun being located between the nozzle outlet orifice and a workpiece when during processing the workpiece is held by the workpiece holder, the self-biasing plasma gun comprising: the nozzle outlet orifice; and an extractor plate with at least two openings of different diameters for extracting the second plasma beam from the nozzle outlet orifice and for generating the second plasma beam into a focusing plasma beam which is focused onto the workpiece with a focal distance.

2. The 3D printing apparatus according to claim 1, wherein the first semi-cylindrical antenna branch and the second semi-cylindrical antenna branch each having inner turns with innermost ones connected to the ground through a ground terminal, and high voltage outer turns with outermost ones connected to the bridge circuit.

3. The 3D printing apparatus according to claim 2, wherein the turns of the first semi-cylindrical antenna branch and the second semi-cylindrical antenna branch form in a developed state rectangular configurations, encompass the second housing and have rounded corners, and wherein a distance between the inner turns is smaller than a distance between the outer turns.

4. The 3D printing apparatus according to claim 3, wherein for preventing an electrical breakdown and for providing a given density of a magnetic field generated by the saddle antenna, the distance between the inner turns is at least 2 mm and the distance between the outer turns is at least 4 mm, the first gap being located at a first given distance from the uppermost turns of the first semi-cylindrical antenna branch and the second semi-cylindrical antenna branch, the extractor plate being located at a second given distance from portions of the saddle antenna lowermost relative to the extractor plate.

5. The 3D printing apparatus according to claim 4, wherein the saddle antenna further comprises first spacers located between the saddle antenna and the second housing for providing a second gap between the saddle antenna and the second housing, the second gap having a given value for preventing a breakdown between the inner turns and the outer turns of the saddle antenna through the surface of the second housing.

6. The 3D printing apparatus according to claim 5, further provided with second spacers, which separate neighboring turns of the first antenna branch and the second antenna branch from each other, the first semi-cylindrical antenna branch and the second semi-cylindrical antenna branch each having a diameter and a height, where a ratio of the diameter to the height ranging from 0.3 to 0.4.

7. The 3D printing apparatus according to claim 1, wherein the self-biasing plasma gun further comprising a sheath electron layer formed on an inner surface of the second end of the second housing near the nozzle outlet orifice of the tapered nozzle for forming a virtual aperture inside the nozzle outlet orifice.

8. The 3D printing apparatus according to claim 7, wherein the extractor plate is located at the focal distance from the workpiece and has an inductive coupled with said portions of the saddle antenna lowermost relative to the extractor plate for a coarse regulation of a focal length by selecting one of said at least two openings of different diameters in the extractor plate for defining a selected opening.

9. The 3D printing apparatus according to claim 8, wherein the extractor plate is further provided with a sliding grounded terminal, which is moveable with respect to the selected opening for changing the inductive coupling for regulating an inductive current induced by said inductive coupling and thus for fine tuning of the focal length.

10. The 3D printing apparatus according to claim 9, wherein said second end of the bouncing tube has a throttling insert with an outlet orifice for admitting a backpressure, which is developed by the plasma discharge in the second housing, into the bouncing tube and wherein the first plasma beam is supplied into the bouncing tube through said one end of the bouncing tube with a predetermined pressure, whereby said predetermined pressure and the backpressure dissipate and form a pressure drop that causes bouncing of clusters of the nanoparticles as a result of exposure to said first plasma beam which charges said clusters and break them down into nanoparticles which are characterized by a low aerodynamic resistance that allows the nanoparticles to pass through the throttling insert into the second housing, simultaneously with breaking down the nanoparticles being pre-melted.

11. The 3D printing apparatus according to claim 4, wherein the self-biasing plasma gun further comprising a sheath electron layer formed on an inner surface of the second end of the second housing near the nozzle outlet orifice of the tapered nozzle for forming a virtual aperture inside the nozzle outlet orifice.

12. The 3D printing apparatus according to claim 11, wherein the extractor plate is located at the focal distance from the workpiece and has an inductive coupled with said portions of the saddle antenna lowermost relative to the extractor plate for a coarse regulation of a focal length by selecting one of said at least two openings of different diameters in the extractor plate for defining a selected opening.

13. The 3D printing apparatus according to claim 12, wherein the extractor plate is further provided with a sliding grounded terminal, which is moveable with respect to the selected opening for changing the inductive coupling for regulating an inductive current induced by said inductive coupling and thus for fine tuning of the focal length.

14. The 3D printing apparatus according to claim 13, wherein said second end of the bouncing tube has a throttling insert with an outlet orifice for admitting a backpressure, which is developed by the plasma discharge in the second housing, into the bouncing tube and wherein the first plasma beam is supplied into the bouncing tube through said one end of the bouncing tube with a predetermined pressure, whereby said predetermined pressure and the backpressure dissipate and form a pressure drop that causes bouncing of clusters of the nanoparticles as a result of exposure to said first plasma beam which charges said clusters and break them down into nanoparticles which are characterized by a low aerodynamic resistance that allows the nanoparticles to pass through the throttling insert into the second housing, and simultaneously with breaking down the nanoparticles being pre-melted, said second end of the bouncing tube has an outer surface that supports a guarding ring which forms a third gap of a given value with the intermediate housing for restricting a passage of the discharge gas into the interior of the intermediate housing for protecting the nanoparticles from cooling.

15. The 3D printing apparatus according to claim 7, wherein the extractor plate further comprises an extractor motion mechanism for moving the extractor plate relative to the focusing plasma beam for tuning the virtual aperture and thus for minimizing a crossover, wherein the crossover is a projection of the virtual aperture on the workpiece.

16. The 3D printing apparatus according to claim 14, wherein the workpiece Holder has drive mechanisms that provide the workpiece with motions in the directions of axes X, Y, and Z, a rotation around the Z axis and tilting in Z-X or Z-Y planes, where axes X, Y and Z are axes in an orthogonal coordinal system.

17. The 3D printing apparatus according to claim 1, further provided with a plasma beam dragging mechanism for dragging the focusing beam into high-aspect ratio openings of a workpiece, in case when the workpiece is a showerhead and the high-aspect ratio openings are gas holes of the shower head, said plasma beam dragging mechanism having a device for generating a capacitive coupling plasma discharge, which is aligned with the focusing beam through the gas holes and has a capacitive coupling with the focusing beam, thus assisting penetration of the focusing beam into the high-aspect ratio openings during 3D printing.

18. The 3D printing apparatus according to claim 17, wherein the plasma beam dragging mechanism comprises: an outer tube; an intermediate tube installed coaxially in the outer tube with a confined space therebetween; a central tube installed inside the intermediate tube tub; and an RF generator connected to the intermediate tube via a matching network, whereby during treatment of the showerhead, said capacitive coupling plasma discharge is generated in the confined space.

19. The 3D printing apparatus according to claim 8, wherein in case of treating hetero-junction tandem solar cells, an opening of the extractor plate that provides a longer focusing length is selected, and the workpiece is oriented relative to the focusing beam by tiling in said Z-X plane for conformal deposition of an amorphous silicon.

20. The 3D printing apparatus according to claim 8, wherein in case of treating of a solid oxide fuel cell having an nickel-yittria stabilized zirconia anode and an yittria-stabilized zirconia electrolyte, an opening of the extractor plate that provides a shorter focusing length is selected for elevation of the anode with a porous deposition, and a longer focusing focal length is selected for treating the anode when the workpiece is tilted in said Z-Y plane for impermeable deposition of said yittria-stabilized zirconia electrolyte.

* * * * *